United States Patent
Sakaguchi et al.

(10) Patent No.: US 12,534,706 B2
(45) Date of Patent: Jan. 27, 2026

(54) METHOD FOR MATURATION OF RETINAL TISSUE CONTAINING CONTINUOUS EPITHELIUM

(71) Applicants: RIKEN, Wako (JP); RACTHERA CO., LTD., Tokyo (JP)

(72) Inventors: Hideya Sakaguchi, Wako (JP); Yoshiki Sasai, Wako (JP); Mototsugu Eiraku, Wako (JP); Daiki Nukaya, Tokyo (JP); Atsushi Kuwahara, Hyogo (JP)

(73) Assignees: RIKEN, Wako (JP); RACTHERA CO., LTD., Tokyo (JP)

( * ) Notice: Subject to any disclaimer, the term of this patent is extended or adjusted under 35 U.S.C. 154(b) by 772 days.

(21) Appl. No.: 16/632,362

(22) PCT Filed: Jul. 20, 2018

(86) PCT No.: PCT/JP2018/027378
§ 371 (c)(1),
(2) Date: Jan. 19, 2020

(87) PCT Pub. No.: WO2019/017492
PCT Pub. Date: Jan. 24, 2019

(65) Prior Publication Data
US 2020/0208103 A1     Jul. 2, 2020

(30) Foreign Application Priority Data
Jul. 20, 2017 (JP) ................. 2017-141381

(51) Int. Cl.
*C12N 5/0793*     (2010.01)

(52) U.S. Cl.
CPC .......... *C12N 5/062* (2013.01); *C12N 2500/00* (2013.01); *C12N 2500/32* (2013.01); *C12N 2500/38* (2013.01); *C12N 2501/39* (2013.01); *C12N 2501/392* (2013.01); *C12N 2501/71* (2013.01); *C12N 2501/998* (2013.01); *C12N 2501/999* (2013.01); *C12N 2506/02* (2013.01)

(58) Field of Classification Search
CPC ............ C12N 2500/00; C12N 2500/32; C12N 2500/38; C12N 2501/39; C12N 2501/392; C12N 2501/71; C12N 2501/998; C12N 2501/999; C12N 2506/02
See application file for complete search history.

(56) References Cited

U.S. PATENT DOCUMENTS

| | | |
|---|---|---|
| 10,501,724 B2 | 12/2019 | Nakano et al. |
| 2006/0182771 A1 | 8/2006 | Dor et al. |
| 2006/0258698 A1 | 11/2006 | Mudumba et al. |
| 2006/0264453 A1 | 11/2006 | Mudumba et al. |
| 2009/0074786 A1 | 3/2009 | Dor et al. |
| 2010/0227879 A1 | 9/2010 | Mudumba et al. |
| 2013/0040330 A1 | 2/2013 | Sasai et al. |
| 2014/0341864 A1 | 11/2014 | Nakano et al. |
| 2016/0237403 A1 | 8/2016 | Sawada et al. |
| 2016/0244721 A1 | 8/2016 | Sawada et al. |
| 2016/0251616 A1 | 9/2016 | Nakano et al. |
| 2016/0333312 A1* | 11/2016 | Canto-Soler ......... C12N 5/0793 |
| 2018/0349672 A1 | 12/2018 | Okuda et al. |
| 2019/0127690 A1 | 5/2019 | Kuwahara et al. |
| 2020/0010801 A1 | 1/2020 | Kuroda |
| 2020/0102535 A1 | 4/2020 | Nakano et al. |
| 2020/0277571 A1 | 9/2020 | Nukaya et al. |

FOREIGN PATENT DOCUMENTS

| | | |
|---|---|---|
| JP | 2008-530127 A | 8/2008 |
| WO | WO 2011/055855 A1 | 5/2011 |
| WO | WO 2013/077425 A1 | 5/2013 |
| WO | WO 2015/025967 A1 | 2/2015 |
| WO | WO 2015/053375 A1 | 4/2015 |
| WO | WO 2017/090741 A1 | 6/2017 |
| WO | WO 2017/183732 A1 | 10/2017 |
| WO | WO 2018/164240 A1 | 9/2018 |
| WO | WO 2019/054515 A1 | 3/2019 |

OTHER PUBLICATIONS

Cole et al., Identification of novel neural- and neural retina-specific antigens with a monoclonal antibody, PNAS 881: 2260-2264. (Year: 1984).*
Thermofisher, Gibco Media Formulation Tool, DMEM/F12, retrieved from internet Dec. 12, 2022 (Year: 2022).*
Millipore Sigma, Nutrient Mixture F-12 Ham Formulation, retrieved from internet Jun. 8, 2023. (Year: 2023).*
Chen et al., NS21: Re-defined and Modified Supplement B27 for Neuronal Cultures, J Neurosci Methods, 171(2): 239-247. (Year: 2008).*
Hana, B27 Supplement protocol. (Year: 2016).*
Sigma-Aldrich, DMEM/F12m retrieved from internet Apr. 23, 2025. (Year: 2025).*
Zhu et al., Accelerated Three-Dimensional Neuroepithelium Formation from Human Embryonic Stem Cells and Its Use for Quantitative Differentiation to Human Retinal Pigment Epithelium, Methods in Molecular Biology, 1307: 345-355. (Year: 2015).*
Caffé et al., "Histotypic differentiation of neonatal mouse retina in organ culture," *Curr. Eye Res.*, 8(10): 1083-1092 (1989).

(Continued)

*Primary Examiner* — Arthur S Leonard
*Assistant Examiner* — Joseph Paul Miano
(74) *Attorney, Agent, or Firm* — Leydig, Voit & Mayer, Ltd.

(57) ABSTRACT

The present invention provides a method for maintaining a continuous epithelial structure of a retinal tissue including culturing the retinal tissue in a medium comprising a methyl group donor or a substrate of the methyl group donor at a concentration at which cell differentiation of a neural retinal progenitor cell is suppressed, and a neurite extension inhibitor at a concentration at which neurite extension is suppressed.

12 Claims, 8 Drawing Sheets

(56) References Cited

OTHER PUBLICATIONS

Eiraku et al., "Self-organizing optic-cup morphogenesis in three-dimensional culture," *Nature*, 472(7341): 51-56 and Methods (2011).
Ikeda et al., "Neuronal differentiation induction in vitro using ES cells—telencephalic precursor cells and neural retinal precursor cells," *Experimental Medicine (Special Issue)* 24(2): 68-74 (2006).
Ikeda, "Induction of differentiation of neural retinal precursor cells and visual cells from ES cells—for treating retinal disease," *Journal of Clinical and Experimental Medicine*, 216(7): 548-550 (2006).
Kuwahara et al., "Generation of a ciliary margin-like stem cell niche from self- organizing human retinal tissue," *Nat. Commun.*, 6: 6286 (2015).
Nakano et al., "Self-Formation of Optic Cups and Storable Stratified Neural Retina from Human ESCs," *Cell Stem Cell*, 10(6): 771-785 (2015).
Sakaguchi et al., "Generation of functional hippocampal neurons from self-organizing human embryonic stem cell-derived dorsomedial telencephalic tissue," *Nat. Commun.*, 6: 8896 (2015).
Zhong et al., "Generation of three-dimensional retinal tissue with functional photoreceptors from human iPSCs," *Nat. Commun.*, 5: 4047 (2014).
Japanese Patent Office, International Preliminary Report on Patentability in International Patent Application No. PCT/JP2018/027378 (Jan. 21, 2020).
Japanese Patent Office, International Search Report in International Patent Application No. PCT/JP2018/027378 (Oct. 23, 2018).
Brewer et al., "Optimized Survival of Hippocampal Neurons in B27-Supplemented Neurobasal™, a New Serum-free Medium Combination," *J. Neurosci. Res.*, 35(5): 567-576 (1993).
Lancaster et al., "Generation of cerebral organoids from human pluripotent stem cells," *Nat. Protoc.*, 9(10): 2329-2340 (2014).
Subrizi et al., "Generation of hESC-derived retinal pigment epithelium on biopolymer coated polyimide membranes," *Biomaterials*, 33(32): 8047-8054 (2012).
Zeisel, "Choline, Other Methyl-Donors and Epigenetics," *Nutrients*, 9(5): 445 (2017).
European Patent Office, Extended European Search Report in European Patent Application No. 18836139.8 (Mar. 22, 2021).

* cited by examiner

METHOD FOR MATURATION OF RETINAL TISSUE CONTAINING CONTINUOUS EPITHELIUM

CROSS-REFERENCE TO RELATED APPLICATIONS

This patent application is the U.S. national phase of International Patent Application No. PCT/JP2018/027378, filed Jul. 20, 2018, which claims the benefit of Japanese Patent Application No. 2017-141381, filed Jul. 20, 2017, which are incorporated by reference in their entireties herein.

TECHNICAL FIELD

The present invention relates to a method for culturing retinal tissues that are capable of maintaining a continuous epithelial structure.

BACKGROUND ART

Retinal tissue is a neural tissue having a multi-layered epithelial structure that develops from the diencephalon, converts light stimuli into electrical signals, and transmits the signals into the brain. In recent years, a method for obtaining a multi-layered retinal tissue from pluripotent stem cells has been reported (patent document 1 and non-patent document 1). Also, a method for obtaining a multi-layered retinal tissue which comprises forming uniformed aggregates of pluripotent stem cells in a serum-free medium containing a Wnt signal transduction pathway inhibitor, culturing them in suspension in the presence of a basement membrane preparation, and culturing them in suspension in a serum-containing medium (patent document 2 and non-patent document 2), a method for forming a multi-layered retinal tissue by forming uniform aggregates of pluripotent stem cells in a medium containing a BMP4 signaling pathway activator (patent document 3 and non-patent document 3), and a method for obtaining a multi-layered retinal tissue by naturally differentiating pluripotent stem cells that have been adhered and separating a retinal tissue contained in a part thereof (non-patent document 4) are known.

The retinal tissue in vivo and the pluripotent stem cell-derived retinal tissue produced by the above-mentioned method have a multi-layered epithelial structure. The both retinal tissues are reported to form dysplastic rosette-like structures, which are different from the structure of normal retinal tissues in vivo, when cultured in vitro for a long time (non-patent documents 3, 4 and 5).

On the other hand, as a long-term culture method capable of culturing retinal tissues while maintaining a continuous epithelial structure, a method of culturing in the presence of Wnt2b (also referred to as Wnt13) reported to be expressed in cells located around the ciliary marginal zone (CMZ) can be used. However, it is known that the extent to which a continuous epithelial structure can be maintained in the pluripotent stem cell-derived retinal tissue including CMZ is limited to the vicinity of CMZ (non-patent document 3). Therefore, a long-term culture method capable of stably culturing retinal tissues while maintaining a continuous epithelial structure has been desired.

DOCUMENT LIST

Patent Documents patent document 1: WO 2011/055855
patent document 2: WO 2013/077425
patent document 3: WO 2015/025967

Non-Patent Documents non-patent document 1: Nature, 472, 51-56 (2011)
non-patent document 2: Cell Stem Cell, 10(6), 771-775 (2012)
non-patent document 3: Nature Communications, 6, 6286-6300 (2015)
non-patent document 4: Nature Communications, 5, 4047-4060 (2014)
non-patent document 5: Curr Eye Res, 8(10), 1083-92 (1989)

SUMMARY OF THE INVENTION

Problems to be Solved by the Invention

The problem to be solved by the present invention is provision of a method for culturing a retinal tissue for a long term while maintaining a continuous epithelial structure, and a culture medium therefor.

Means of Solving the Problems

The present inventors have conducted studies in an attempt to solve the above-mentioned problem and found that a continuous epithelial structure is maintained and formation of a rossete-like structure can be suppressed by culturing a retinal tissue in a medium having at least one of the following characteristics (1) and (2):

(1) a methyl group donor, a substrate of the methyl group donor, or a neurite extension inhibitor is contained at not less than a given concentration,
(2) concentrations of acidic amino acid, antioxidant (glutathione, catalase, Superoxide dismutase, alpha-tocopherol, cysteine etc.), and retinal neuron protecting substance other than antioxidant (progesterone etc.) are decreased, which resulted in the completion of the present invention.

That is, the present invention relates to the following.

[1] A method for maintaining a continuous epithelial structure of a retinal tissue comprising culturing the retinal tissue in a medium comprising a methyl group donor or a substrate of the methyl group donor at a concentration at which cell differentiation of a neural retinal progenitor cell is suppressed, and a neurite extension inhibitor at a concentration at which neurite extension is suppressed.
[2] The method of [1], wherein the methyl group donor or the substrate of the methyl group donor is methionine.
[3] The method of [2], wherein a concentration of the methionine in the medium is not less than 25 mg/L.
[4] The method of any of [1] to [3], wherein the neurite extension inhibitor is glucocorticoid.
[5] The method of [4], wherein the glucocorticoid is corticosterone.
[6] The method of [5], wherein a concentration of the corticosterone in the medium is not less than 1 nM.
[7] The method of any of [1] to [6], wherein a concentration of the L-glutamic acid in the medium is less than 50 μM.
[8] The method of [7], wherein a concentration of the L-aspartic acid in the medium is less than 50 μM.
[9] The method of any of [1] to [8], wherein the medium comprises at least one kind of antioxidant selected from the group consisting of glutathione, catalase, Superoxide dismutase, alpha-tocopherol, and L-cysteine at a concentration within the following concentration ranges:
glutathione: not more than 100 ng/mL
catalase: not more than 100 U/mL
Superoxide dismutase: not more than 100 U/mL
alpha-tocopherol: not more than 50 nM
cysteine: not more than 0.26 mM.

[10] The method of any of [1] to [9], wherein the medium comprises progesterone at a concentration of not more than 100 nM.

[11] The method of any of [1] to [10], wherein the medium comprises at least one kind of nucleic acid synthesis promoter selected from the group consisting of hypoxanthine, thymidine and vitamin B12 at the following concentration range:
hypoxanthine: less than 15 μM,
thymidine: less than 1.5 μM,
vitamin B12: less than 0.68 mg/L (0.5 μM).

[12] The method of any of [1] to [11], wherein the medium comprises a Neurobasal medium blended with B27 supplement at a volume ratio of not less than 50%.

[13] The method of any of [1] to [12], wherein the aforementioned retinal tissue is a retinal tissue having a continuous epithelial structure.

[14] The method of any of [1] to [13], wherein the aforementioned retinal tissue at the time of start of culture is in an initial stage of development or at a stage thereafter.

[15] The method of [14], wherein the retinal tissue is cultured for a period up to emergence of a rod photoreceptor progenitor cell.

[16] A method for maintaining a continuous epithelial structure of a retinal tissue comprising the following steps:
(1) a step of culturing a retinal tissue comprising a retinal progenitor cell and in a differentiation stage without emergence of a ganglion cell in a basal medium for cell proliferation for a period until emergence of a photoreceptor progenitor cell at the longest,
(2) a step of culturing the retinal tissue obtained in (1) in a mixed medium of a basal medium for cell proliferation and a medium for maintaining a continuous epithelial tissue at a volume ratio of 1:1-1:3 until an emergence rate of a cone photoreceptor progenitor cell reaches the maximum at the longest, and
(3) a step of culturing the retinal tissue obtained in (2) in a medium for maintaining a continuous epithelial tissue at least for a period up to emergence of a rod photoreceptor progenitor cell.

[17] A medium for maintaining a continuous epithelial tissue comprising a methyl group donor or a substrate of the methyl group donor at a concentration at which cell differentiation of a neural retinal progenitor cell is suppressed, and a neurite extension inhibitor at a concentration at which neurite extension is suppressed.

[18] The medium of [17], wherein the medium comprises at least one kind of nucleic acid synthesis promoter selected from the group consisting of hypoxanthine, thymidine and vitamin B12 at the following concentration range:
hypoxanthine: less than 15 μM,
thymidine: less than 1.5 μM,
vitamin B12: less than 0.68 mg/L (0.5 μM).

[19] A mixed medium for maintaining a continuous epithelial tissue of a retinal tissue comprising a Neurobasal medium and a basal medium for cell proliferation and comprising not less than 50% (e.g., over 50%) in a volume of the Neurobasal medium blended with B27 supplement.

[20] The medium of [19], wherein the Neurobasal medium blended with B27 supplement is contained at not less than 75% in a volume.

[21] The medium of [19] or [20], wherein the basal medium for cell proliferation is one medium selected from the group consisting of BME medium, BGJb medium, CMRL 1066 medium, Glasgow MEM (GMEM) medium, Improved MEM Zinc Option medium, IMDM medium, Medium 199 medium, MEM medium, Eagle MEM medium, aMEM medium, DMEM medium, F-12 medium, DMEM/F12 medium, IMDM/F12 medium, ham medium, RPMI 1640 medium, Fischer's medium, Leibovitz's L-15 medium, and a mixed medium of these.

[22] The medium of [19] or [20], wherein the basal medium for cell proliferation is a DMEM/F12 medium, or a mixed medium of a DMEM/F12 medium and other basal medium for cell proliferation.

[23] A method for maintaining a continuous epithelial structure of a retinal tissue comprising the following steps:
(1) a step of culturing a retinal tissue which contains a retinal progenitor cell and is in a differentiation stage without emergence of a ganglion cell in a basal medium for cell proliferation for not more than 30 days (preferably 3-20 days, more preferably 3-15 days),
(2) a step of culturing the retinal tissue obtained in (1) in a mixed medium of a basal medium for cell proliferation and a medium for maintaining a continuous epithelial tissue at a volume ratio of 1:1-1:3 for not more than 50 days (preferably 10-50 days, more preferably 10-40 days, further preferably 20-30 days), and
(3) a step of culturing the retinal tissue obtained in (2) in a medium for maintaining a continuous epithelial tissue for preferably 10-80 days.

[24] A method for maintaining a continuous epithelial structure of a retinal tissue comprising the following steps:
(1) a step of culturing a retinal tissue which contains a retinal progenitor cell and is in a differentiation stage without emergence of a ganglion cell in a basal medium for cell proliferation for a period until expression of CRX is observed,
(2) a step of culturing the retinal tissue obtained in (1) in a mixed medium of a basal medium for cell proliferation and a mixed medium for maintaining a continuous epithelial tissue at a volume ratio of 1:1-1:3 until an emergence rate of a CRX positive and RXR-γ positive cell in proliferated cells reaches the maximum, and
(3) a step of culturing the retinal tissue obtained in (2) in a medium for maintaining a continuous epithelial tissue at least for a period up to emergence of an NRL.

[25] A preparation of an aggregate comprising a retinal tissue derived from a pluripotent stem cell, comprising an aggregate comprising a retinal tissue having a photoreceptor or a progenitor cell thereof continuously present in at least 80% of a surface of the retinal tissue, and the medium of any of [17]-[22] for maintaining a continuous epithelial tissue.

[26] The preparation of [25], wherein an area of an apical surface present on the surface of the aforementioned retinal tissue is at least 80% of the area of the surface of the retinal tissue.

[27] The preparation of [25] or [26], wherein a diameter in the major axis direction of the aforementioned retinal tissue is not less than 0.6 mm.

Effect of the Invention

According to the present invention, a retinal tissue maintaining a continuous epithelial structure can be produced.

BRIEF DESCRIPTION OF THE DRAWINGS

FIG. 1-2 shows a comparison of epithelial structures in retinal tissues cultured by culture methods [A]-[C]. (a), (e) and (i): aPKC, (b) and (f): RX, (c), (g) and (k): CRX::Venus, (j): CHX10, (d), (h) and (l): DAPI.

FIG. 2 shows a comparison of continuous epithelium rates when cultured under respective conditions. The added substance is indicated by "+" below the bar in the graph.

FIG. 3-1 shows a comparison of continuous epithelium rates when cultured under respective conditions. The added substance is indicated by "+" below the bar in the graph.

FIG. 3-2 shows a comparison of continuous epithelium rates when cultured under respective conditions. The added substance is indicated by "+" below the bar in the graph.

FIG. 5-1 is a photograph of an aggregate containing a retinal tissue on day 42, day 72, day 100, and day 130 after the start of suspension culture.

FIG. 5-2 is a photograph of an aggregate containing a retinal tissue on day 73 after the start of suspension culture.

FIG. 5-3 shows an average value of the diameter in the major axis direction of retinal tissues measured using Image J for the images of aggregates containing retinal tissues after respective days of culture.

DESCRIPTION OF EMBODIMENTS

1. Definition

Figure 1:
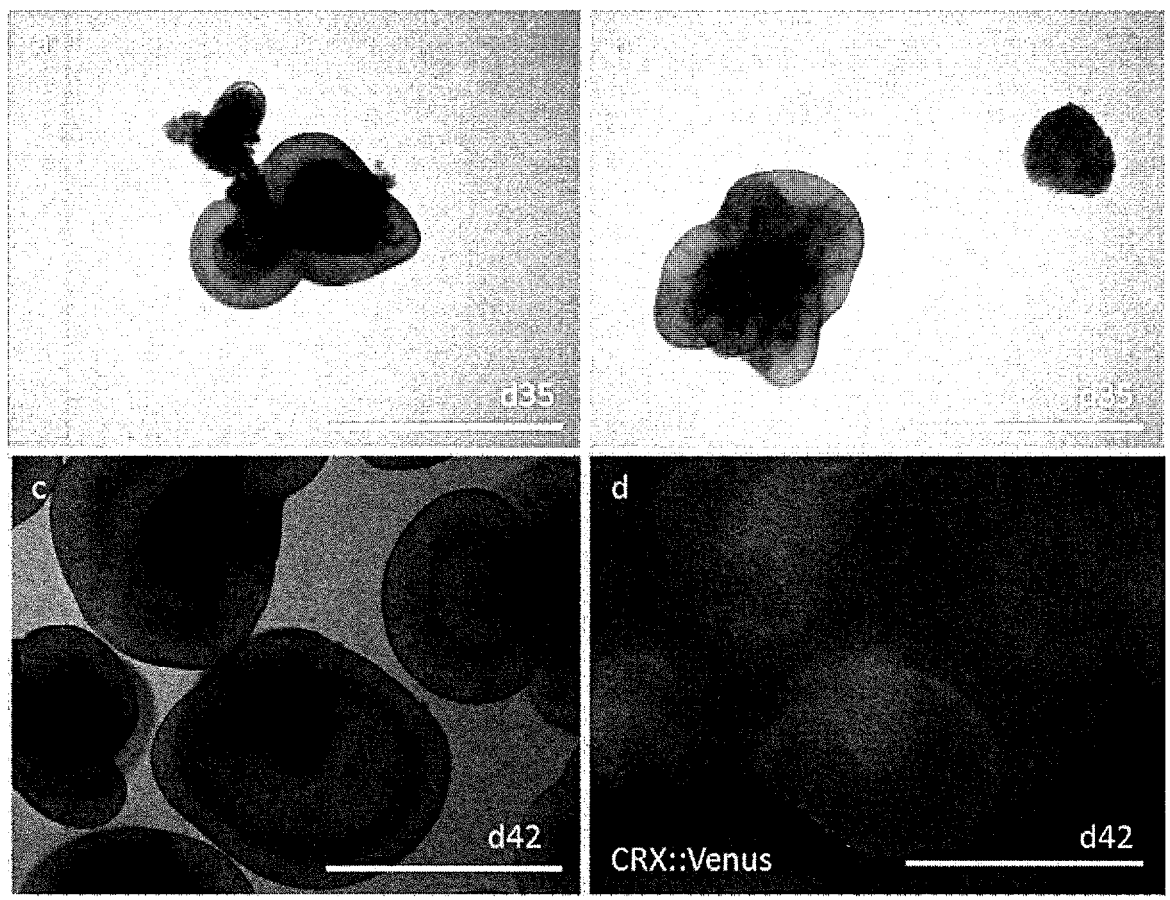
FIG. 1-1 is a photograph of a retinal tissue cut out from a cell aggregate containing the retinal tissue. (a) and (b): Retinal tissue cut out from cell aggregate 35 days after the start of suspension culture. (c) and (d): Retinal tissue 42 days after the start of suspension culture. (d) shows CRX::Venus expression.

In the present specification, "stem cell" means an undifferentiated cell having differentiation potency and proliferative capacity (particularly self-renewal competence) maintaining the same differentiation potency even after cell division. The stem cell includes subpopulations such as pluripotent stem cell, multipotent stem cell, unipotent stem cell and the like according to the differentiation potency. Pluripotent stem cell refers to a stem cell capable of being cultured in vitro and having a potency to differentiate into any cell lineage belonging to three germ layers (ectoderm, mesoderm, endoderm) (pluripotency). The multipotent stem cell means a stem cell having a potency to differentiate into plural types of tissues or cells, though not all kinds. The unipotent stem cell means a stem cell having a potency to differentiate into a particular tissue or cell.

Pluripotent stem cell can be induced from fertilized egg, clone embryo, germ stem cell, stem cell in a tissue and the like. Examples of the pluripotent stem cell include embryonic stem cell (ES cell), EG cell (embryonic germ cell), induced pluripotent stem cell (iPS cell) and the like.

Embryonic stem cell was first established in 1981, and has also been applied to the generation of knockout mouse since 1989. In 1998, human embryonic stem cell was established, which is also being utilized for regenerative medicine. ES cell can be produced by culturing an inner cell mass on a feeder cell or in a medium containing LIF. The production methods of ES cell are described in, for example, WO 96/22362, WO 02/101057, U.S. Pat. Nos. 5,843,780, 6,200,806, 6,280,718 and the like. Embryonic stem cells are available from given organizations, or a commercially available product can be purchased. For example, human embryonic stem cells, KhES-1, KhES-2 and KhES-3, are available from Kyoto University's Institute for Frontier Medical Sciences. EB5 cell, which is a mouse embryonic stem cell, is available from Incorporated Administrative Agency RIKEN, and D3 cell line, which is a mouse embryonic stem cell, is available from ATCC.

Nuclear transfer ES cell (ntES cell), which is one of the ES cells, can be established from a clone embryo produced by transplanting the nucleus of a somatic cell into an enucleated egg.

The "induced pluripotent stem cell" (iPS cell to be also referred to as) in the present invention is a cell induced to have pluripotency by reprogramming a somatic cell by a known method and the like. Specifically, a cell induced to have pluripotency by reprogramming differentiated somatic cells such as fibroblast, peripheral blood mononuclear cell and the like by the expression of a combination of a plurality of genes selected from the group consisting of reprogramming genes including Oct3/4, Sox2, Klf4, Myc (c-Myc, N-Myc, L-Myc), Glis1, Nanog, Sall4, lin28, Esrrb and the like can be mentioned. Examples of preferable combination of reprogramming factors include (1) Oct3/4, Sox2, Klf4, and Myc (c-Myc or L-Myc), and (2) Oct3/4, Sox2, Klf4, Lin28 and L-Myc (Stem Cells, 2013; 31:458-466).

Induced pluripotent stem cell was established by Yamanaka et al. in mouse cell in 2006 (Cell, 2006, 126(4), pp. 663-676). In 2007, induced pluripotent stem cell was also established from human fibroblast, and has pluripotency and self-renewal competence similar to those of embryonic stem cells (Cell, 2007, 131(5), pp. 861-872; Science, 2007, 318(5858), pp. 1917-1920; Nat. Biotechnol., 2008, 26(1), pp. 101-106). The induction method of induced pluripotent stem cell has been variously improved thereafter (e.g., mouse iPS cell: Cell. 2006 Aug. 25; 126(4):663-76, human iPS cell: Cell. 2007 Nov. 30; 131(5):861-72).

Besides the production method of induced pluripotent stem cell based on direct reprogramming by gene expression, induced pluripotent stem cell can also be obtained from somatic cell by the addition of a compound and the like (Science, 2013, 341, pp. 651-654).

It is also possible to obtain established induced pluripotent stem cell and, for example, human induced pluripotent cell lines established by Kyoto University such as 201B7 cell, 201B7-Ff cell, 253G1 cell, 253G4 cell, 1201C1 cell, 1205D1 cell, 1210B2 cell or, 1231A3 cell, Ff-I01 cell, QHJI01 cell and the like are available from Kyoto University.

While the somatic cell used for obtaining induced pluripotent stem cell is not particularly limited, tissue-derived fibroblast, blood-lineage cells (e.g., peripheral blood mononuclear cell, T cell), hepatocyte, pancreatic cell, intestinal epithelial cell, smooth muscle cell and the like can be mentioned. As the fibroblast, those derived from corium and the like can be mentioned.

When induced pluripotent stem cell is produced by reprogramming by the expression of several kinds of genes, the means for gene expression is not particularly limited. Examples of the aforementioned means include an infection method using a virus vector (e.g., retrovirus vector, lentivirus vector, Sendaivirus vector, adenovirus vector, adeno-associated virus vector), a gene transfer method using a plasmid vector (e.g., plasmid vector, episomal vector) (e.g., calcium phosphate method, lipofection method, RetroNectin method, electroporation method), a gene transfer method using an RNA vector (e.g., calcium phosphate method, lipofection method, electroporation method), a method with direct injection of protein and the like.

The pluripotent stem cell to be used in the present invention is preferably ES cell or induced pluripotent stem cell, more preferably induced pluripotent stem cell (iPS cell).

The pluripotent stem cell to be used in the present invention is preferably a pluripotent stem cell of primates (e.g., human, monkey), preferably a human pluripotent stem cell. Therefore, the pluripotent stem cell to be used in the present invention is preferably a human ES cell or human induced pluripotent stem cell (human iPS cell), most preferably a human induced pluripotent stem cell (human iPS cell).

Genetically-modified pluripotent stem cells can be produced by using, for example, a homologous recombination technique. Examples of the gene on the chromosome to be modified include a cell marker gene, a histocompatibility antigen gene, a gene related to a disease due to a disorder of retinal cell and so on. A target gene on the chromosome can be modified using the methods described in Manipulating the Mouse Embryo, A Laboratory Manual, Second Edition, Cold Spring Harbor Laboratory Press (1994); Gene Targeting, A Practical Approach, IRL Press at Oxford University Press (1993); Biomanual Series 8, Gene Targeting, Making of Mutant Mouse using ES cell, YODOSHA CO., LTD. (1995); and so on.

To be specific, for example, the genomic DNA containing the target gene to be modified (e.g., cell marker gene, histocompatibility antigen gene, disease-related gene and so on) is isolated, and a targeting vector used for homologous recombination of the target gene is produced using the isolated genomic DNA. The produced targeting vector is introduced into stem cells and the cells that showed homologous recombination between the target gene and the targeting vector are selected, whereby stem cells having the modified gene on the chromosome can be produced.

Examples of the method for isolating genomic DNA containing the target gene include known methods described in Molecular Cloning, A Laboratory Manual, Second Edition, Cold Spring Harbor Laboratory Press (1989), Current Protocols in Molecular Biology, John Wiley & Sons (1987-1997) and so on. The genomic DNA containing the target gene can also be isolated using genomic DNA library screening system (manufactured by Genome Systems), Universal GenomeWalker Kits (manufactured by CLONTECH) and so on. A polynucleotide encoding the target protein can also be used instead of genome DNA. The polynucleotide can be obtained by amplifying the corresponding polynucleotide by the PCR method.

Production of targeting vector used for homologous recombination of the target gene, and efficient selection of a homologous recombinant can be performed according to the methods described in Gene Targeting, A Practical Approach, IRL Press at Oxford University Press (1993); Biomanual Series 8, Gene Targeting, Making of Mutant Mouse using ES cell, YODOSHA CO., LTD. (1995); and so on. As the targeting vector, any of replacement type or insertion type can be used. As the selection method, methods such as positive selection, promoter selection, negative selection, polyA selection and so on can be used.

Examples of a method for selecting the desired homologous recombinant from the selected cell lines include Southern hybridization method, PCR method and so on for the genomic DNA.

The "suspension culture" or "suspension culture method" in the present invention refers to culturing while maintaining a state in which cells or cell aggregates are suspended in a culture medium and a method of performing the culture. That is, suspension culture is performed under conditions in which cells or cell aggregates are not adhered to a culture vessel and the like, and culturing performed under conditions permitting adhesion to a culture vessel and the like (adhesion culture or adhesion culture method) is not included in the category of suspension culture. In this case, adhesion of cell means that a strong cell-substratum junction is formed between a cell or cell aggregate and a culture vessel. More particularly, suspension culturing refers to culturing under conditions in which a strong cell-substratum junction is not formed between a cell or cell aggregate and a culture vessel, and "adhesion culture" refers to culturing under conditions in which a strong cell-substratum junction is formed between a cell or cell aggregate and a culture vessel material and the like.

In a cell aggregate in suspension culture, a planar cell-cell adhesion is formed. In cell aggregates in suspension culture, a cell-substratum junction is hardly formed with a culture vessel and the like and, even if it is formed, its contribution is small. In some embodiment, in a cell aggregate in suspension culture an endogenous cell-substratum junction is present inside the aggregate, but a cell-substratum junction is hardly formed with a culture vessel and the like and, even if it is formed, its contribution is small. From such aspect, one embodiment of "suspension culture" is, for example, a culture method in which a cell aggregate is fixed on a thin needle equipment or the like that works as a scaffold for cell aggregates and cultured in equipment filled with a culture medium. Examples of the culture method include a method using a bio 3D printer "Regenova (registered trade mark)" manufactured by Cyfuse Biomedical K.K., reported at 29AB-pm009, the 136th Annual Meeting of the Pharmaceutical Society of Japan.

The planar cell-cell adhesion (plane attachment) means that a cell attaches to another cell via planes. More particularly, the planar cell-cell adhesion means that, for example, not less than 1%, preferably not less than 3%, more preferably not less than 5%, of the surface area of a cell adheres to the surface of another cell. A surface of a cell can be observed by staining with a reagent (e.g., DiI) that stains membranes, immunostaining of cell adhesion molecules (e.g., E-cadherin and N-cadherin).

The culture vessel to be used when performing suspension culture is not particularly limited as long as it enables "culturing in suspension" and those of ordinary skill in the art can appropriately determine same. Examples of such culture vessel include flask, tissue culture flask, dish, petri dish, tissue culture dish, multidish, microplate, microwell plate, micropore, multiplate, multiwell plate, chamber slide, schale, tube, tray, culture bag, spinner flask, roller bottle and so on. To enable suspension culture, these culture vessels are preferably non-cell-adhesive. Non-cell-adhesive culture vessels include culture vessels whose surfaces have not undergone an artificial treatment for improving the cell adhesiveness (e.g., coating treatment with extracellular matrix such as basement membrane preparation, laminin, entactin, collagen, gelatin etc., and the like, or with polymer such as polylysine, polyornithine etc. and the like or surface processing such as positive electric charge treatment and the like), and the like. As a non-cell-adhesive culture vessel, culture vessels whose surfaces have been artificially treated to decrease adhesiveness to the cells (e.g., superhydrophilic treatment with MPC polymer and the like, protein low adsorption treatment etc.) and the like can be used. Rotation culture using spinner flask, roller bottle and the like may be performed. The culture surface of the culture vessel may be a flat bottom or may have concaves and convexes.

On the other hand, as an incubator used for adhesion culture, culture vessels whose surfaces have undergone an artificial treatment for improving the cell adhesiveness (e.g., surface treatment with extracellular matrix such as basement membrane preparation, laminin, entactin, collagen, gelatin, Matrigel, Synthemax, vitronectin and the like, and the like, or coating treatment with polymer such as polylysine, polyornithine and the like or positive electric charge treatment and the like), and the like can be mentioned.

In the present specification, an aggregate of cells (or cell aggregate) is not particularly limited as long as a plurality of cells are adhered to each other to form a clump, and may be a cell aggregate formed by assembly of cells dispersed in a medium, or derived from a colony formed by cell culture, or a cell aggregate formed by newly budding from other cell aggregate. The cell aggregate also encompasses embryoid body, sphere and spheroid. Preferably, a planar cell-cell adhesion is formed in the aggregate of cells. In some embodiments, cells sometimes form a cell-cell junction or a cell adhesion, for example, adherence junction, in some or all of the aggregates. The cell aggregate also includes a cell population as a derivative obtained from the aforementioned cell aggregate.

The "uniformed aggregates" means that the size of each aggregate is constant when a plurality of aggregates are cultured, and that the variance in the length of the maximum diameter is small when the size of the aggregates are evaluated by the length of the maximum diameter. More specifically, it means that not less than 75% of aggregates in the whole aggregate population are within mean±100%, preferably mean±50%, more preferably mean±20%, of the maximum diameter in the population of the aggregates.

To "form uniformed cell aggregates" means to "rapidly aggregate a given number of dispersed cells" to form cell aggregates uniform in size, when gathering the cells to form cell aggregates and culturing the aggregates in suspension. That is, when an aggregate of pluripotent stem cells is formed by rapidly gathering the pluripotent stem cells, an epithelium-like structure can be formed with good reproducibility in the cells induced and differentiated from the formed aggregate.

Examples of the experimental operation to form the aggregate include a method involving keeping cells in a small space by using a plate with small wells (e.g., plate with wells having a base area of about 0.1-2.0 cm$^2$ when calculated in terms of flat bottom; 96 well plate), micropore and so on, a method involving aggregating cells by centrifugation for a short time using a small centrifugation tube and the like.

As a plate with small wells, for example, 24 well plate (area of about 1.88 cm$^2$ when calculated in terms of flat bottom), 48 well plate (area of about 1.0 cm$^2$ when calculated in terms of flat bottom), 96 well plate (area of about 0.35 cm$^2$ when calculated in terms of flat bottom, inner diameter about 6-8 mm), and 384 well plate can be mentioned. Preferred is 96 well plate. As a shape of the plate with small wells, the shape of the bottom surface when the well is seen from above is, for example, polygon, rectangle, ellipse, true circle, preferably true circle. As a shape of the plate with small wells when the well is seen from the side well, the shape of the bottom surface is preferably a structure having high outer circumference and low inner concave. The shape includes, for example, U-bottom, V-bottom, μ-bottom, preferably U-bottom or V-bottom, most preferably V-bottom. As a plate with small wells, a cell culture dish (e.g., 60 mm-150 mm dish, culture flask) with a concave convex, or dent on the bottom surface (e.g., EZSPHERE (AGC TECHNO GLASS CO., LTD.)) may also be used. The bottom surface of a plate with small wells is preferably a non-cell-adhesive bottom surface, preferably the aforementioned non-cell-adhesive-coated bottom surface.

"Dispersion" means that cells and tissues are separated into small cell debris (not less than 2 cells and not more than 100 cells, preferably not more than 50 cells) or single cells by dispersion treatments such as enzyme treatment, physical treatment and the like. A certain number of dispersed cells means a collection of a certain number of cell debris or single cells. Examples of the method for dispersing pluripotent stem cells include mechanical dispersion treatment, cell dispersing solution treatment, and cell protecting agent addition treatment. These treatments may be performed in combination. It is preferable to perform a cell dispersing solution treatment and then a mechanical dispersion treatment. Examples of the method for the mechanical dispersion treatment include pipetting treatment and scraping operation with a scraper.

The "tissue" in the present specification refers to a structure of a cell population having a structure in which plural types of cells having different morphologies and properties are sterically arranged in a given pattern.

In the present specification, the "retinal tissue" means a tissue in which one type or at least two or more types of retinal cells such as photoreceptor cells, horizontal cells, bipolar cells, amacrin cells, retinal ganglion cells, their progenitor/precursor cells and retinal progenitor cells and the like, which constitute respective retinal layers in retina in vivo, are sterically arranged in layers. Which retinal layer is constituted by respective cells can be confirmed by a known method, for example, the presence or absence of the expression of a cell marker or the level thereof, and the like.

In the present specification, the "retinal tissue" includes retinal tissue obtained by inducing differentiation of pluripotent stem cells and retinal tissue derived from a living body. Specifically, epithelial tissues which are obtained by suspension culture of the aggregates formed from pluripotent stem cells under appropriate differentiation-inducing conditions and contain retinal progenitor cells and/or neural retinal progenitor formed on the surface of the aforementioned aggregate can be mentioned.

In the present specification, the "cell aggregate containing retinal tissue" is not particularly limited as long as it is a cell aggregate containing the aforementioned retinal tissue.

In the present invention, the "retinal layer" means each layer constituting the retina. Specific examples thereof include retinal pigment epithelial layer and neural retinal layer, and the neural retinal layer includes outer boundary membrane, photoreceptor layer (outer nuclear layer), outer plexiform layer, inner nuclear layer, inner plexiform layer, ganglion cell layer, nerve fiber layer and inner limiting membrane.

In the present invention, the "retinal progenitor cell" refers to a progenitor cell capable of differentiating into any mature retinal cells constituting a retinal tissue, including photoreceptor cell, horizontal cell, bipolar cell, amacrine cell, retinal ganglion cell, retinal pigment epithelial cell and Muller cell.

In the present invention, the "neural retinal progenitor" refers to a cell that is destined to be the inner layer of the optic cup. It includes, for example, a progenitor cell capable of differentiating into any mature cell constituting a neural retinal layer (retinal layer containing retinal layer-specific neuron) that does not contain retinal pigment epithelium.

The photoreceptor progenitor cell, horizontal cell precursor cell, bipolar cell precursor cell, amacrine cell precursor cell, retinal ganglion cell precursor cell, and retinal pigment epithelial precursor cell refer to precursor cells committed to differentiate into photoreceptor cell, horizontal cell, bipolar cell, amacrine cell, retinal ganglion cells, and retinal pigment epithelial cell, respectively.

In the present specification, the "retinal layer-specific neuron" is a cell constituting a retina layer and is a neuron specific to the retinal layer. Examples of the retinal layer-specific neuron include bipolar cell, retinal ganglion cells, amacrine cell, horizontal cell and photoreceptor cell, and examples of the photoreceptor cell include rod photoreceptor (Rod cell) and cone photoreceptor (Cone cell).

In the present specification, the "retinal cell" encompasses the aforementioned retinal pigment epithelial cell, Muller cell, photoreceptor cell, horizontal cell, bipolar cell, amacrine cell, retinal ganglion cell and progenitor cell thereof, retinal progenitor cell, and neural retinal progenitor, and retinal layer-specific neuron and progenitor cell of the retinal layer-specific neuron.

The cells constituting the aforementioned retinal tissue can be detected or identified using an expressed or non-expressed retinal cell marker as an index.

Examples of the retinal cell marker include Rx (also referred to as Rax), PAX6 expressed in retinal progenitor cell and Rx, PAX6, Chx10 expressed in neural retinal progenitor, Nkx2.1 expressed in precursor cell of hypothalamus neuron but not expressed in retinal progenitor cell, Sox1 expressed in hypothalamus neuroepithelium but not expressed in retina, Crx, Blimp1 expressed in precursor cell of photoreceptor cell, and the like.

Examples of the marker of the retinal layer-specific neuron include Chx10, PKCα, Goα, VSX1 and L7 expressed in bipolar cell, TUJ1 and Brn3 expressed in retinal ganglion cell, Calretinin and HPC-1 expressed in amacrine cell, Calbindin expressed in horizontal cell, Recoverin expressed in photoreceptor cell and photoreceptor progenitor cell, Rhodopsin expressed in rod cell, Nr1 expressed in rod photoreceptor and rod photoreceptor progenitor cell, S-opsin and LM-opsin expressed in cone photoreceptor, RXR-γ expressed in cone cell, cone photoreceptor progenitor cell and ganglion cell, TRβ2, OTX2 and OC2 expressed in cone photoreceptor or progenitor cell thereof that emerge in the initial stage of differentiation from among cone photoreceptors, Pax6 commonly expressed in horizontal cell, amacrine cell and ganglion cell, RPE65 and Mitf expressed in retinal pigment epithelial cell, CRABP expressed in Muller cell and the like.

In the present specification, examples of the dorsal marker include TBX5, TBX3, TBX2, COUP-TF II, CYP26A1, CYP26C1 and the like expressed on the dorsal side, and examples of the ventral marker include VAX2, COUP-TF I and the like expressed on the ventral side.

The "serum-free medium" in the present specification means a medium not containing an unadjusted or unpurified serum. In the present specification, a medium containing purified blood-derived components and animal tissue-derived components (e.g., growth factor) is also included in the serum-free medium unless unadjusted or unpurified serum is contained therein.

The "serum-free conditions" in the present specification means conditions free of unadjusted or unpurified serum, specifically, conditions using a serum-free medium.

The serum-free medium here may contain a serum replacement. Examples of the serum replacement include one appropriately containing albumin, transferrin, fatty acid, collagen precursor, trace element, 2-mercaptoethanol or 3' thiolglycerol, or equivalents of these etc., and so on. Such serum replacement may be prepared by, for example, the method described in WO 98/30679. The serum replacement may be a commercially available product. Examples of such commercially available serum replacement include Knockout™ Serum Replacement (Life Technologies, hereinafter sometimes to be indicated as KSR), Chemically Defined Lipid Concentrated (manufactured by Life Technologies) and Glutamax™ (manufactured by Life Technologies), B27 (manufactured by Life Technologies), N2 (manufactured by Life Technologies).

The serum-free medium may appropriately contain a fatty acid or lipid, amino acid (e.g., non-essential amino acids), vitamin, growth factor, cytokine, antioxidant, 2-mercaptoethanol, pyruvic acid, buffering agent, inorganic salts and so on.

To avoid complicated preparation, a serum-free medium supplemented with an appropriate amount (e.g., about 0.5% to about 30%, preferably about 1% to about 20%) of commercially available KSR (manufactured by Life Technologies) may be used as such serum-free medium (e.g., medium of 1:1 mixture of F-12 medium and IMDM medium supplemented with 10% KSR and 450 µM 1-monothioglycerol). As a product equivalent to KSR, the medium disclosed in JP-A-2001-508302 can be mentioned.

The "serum-containing medium" in the present specification means a medium containing unadjusted or unpurified serum. The medium may contain a fatty acid, lipid, amino acid (e.g., non-essential amino acids), vitamin, growth factor, cytokine, antioxidant, 2-mercaptoethanol, 1-monothioglycerol, pyruvic acid, buffering agent, inorganic salts and so on. In addition, a serum-containing medium can be used in the step of maintaining retinal cell or retinal tissue produced by the present invention (Cell Stem Cell, 10(6), 771-775 (2012)).

Known growth factors, proteins, additives or chemical substances that promote proliferation and the like may be added to the aforementioned serum-free medium or serum-containing medium. Examples of the known growth factor and protein include EGF, FGF, IGF, insulin and the like. Examples of additives that promote proliferation include N2 supplement (N2, Invitrogen), B27 supplement (Invitrogen), and the like. Examples of chemical substances that promote proliferation include retinoids (e.g., retinoic acid or a derivative thereof), taurine, glutamine and the like.

In the present specification, "xeno-free" means conditions eliminating components derived from species different from that of the cell to be cultured.

In the present specification, the "medium containing substance X" and "in the presence of substance X" refer to a medium supplemented with an exogenous substance X or a medium containing an exogenous substance X, or in the presence of an exogenous substance X. That is, when the cells or tissues present in the medium endogenously express, secrete or produce substance X, the endogenous substance X is distinguished from the exogenous substance X, and a medium free of exogenous substance X is understood to fall outside the category of the "medium containing substance X", even when it contains endogenous substance X.

For example, a "medium containing a substrate of the methyl group donor" is a medium supplemented with an exogenous substrate of the methyl group donor or a medium containing an exogenous substrate of the methyl group donor. "In the presence of a substrate of the methyl group donor" means in the presence of an exogenous substrate of the methyl group donor.

Therefore, in the method of the present invention, when "medium containing substance X" or "in the presence of substance X" is described, the method of the present invention may include a step of adding exogenous substance X into the medium or system.

2. Production of Retinal Tissue in Early Developmental Stage

The retinal tissue in an early developmental stage used in the present specification is not particularly limited, and may be any cell aggregate containing a multi-layered retinal tissue wherein the retinal tissue is before formation of dysplastic rosette-like structure. Examples thereof include a retinal tissue derived from a living body, a pluripotent stem cell-derived retinal tissue that can be produced by the following starting material production method, a multi-layered retinal tissue produced by reaggregating neural retinal progenitor cells derived from a living body after separation, and the like.

In the present specification, the "early developmental stage" means a stage where retinal progenitor cells have emerged but ganglion cells have not emerged. Here, neural retinal progenitor cells may have emerged. That is, in this stage, RX (RAX) positive and PAX6 positive cells (and may further be CHX10 positive cells) are included, and TUJ1 positive cells and BRN3 positive cells are not included. The "retinal tissue in an early developmental stage" is not particularly limited as long as it includes retinal progenitor cells and/or neural retinal progenitor, that is, cells that can differentiate into photoreceptor cells and ganglion cells, and ganglion cells are not included. It may include a ciliary marginal zone structure.

When the retinal tissue in an early developmental stage is produced in accordance with, for example, the starting material production methods 5 to 7 (BMP-swing-back method) described later, it corresponds to day 22 (d22) to day 33 (d33) after the start of suspension culture. When the tissue is produced in accordance with the starting material production methods 1 to 4 (BMP method), it corresponds to day 12 (d12) to day 27 (d27) after the start of suspension culture.

The "retinal tissue in an early developmental stage" can be identified by confirming the expression state of a retinal progenitor cell marker, a neural retinal progenitor cell, and a ganglion cell marker.

The retinal tissue in an early developmental stage encompasses one corresponding to an "optic vesicle", or an "retinal tissue at the early stage of an optic cup" retinal tissue containing an RX positive, PAX6 positive and CHX10 positive neural retinal progenitor and free of a ganglion cell, which tissue shows differentiation somewhat progressed from optic vesicle.

A method for producing a retinal tissue in an early developmental stage which is a starting material used in the present invention from a pluripotent stem cell such as human iPS cell and the like is explained.

Pluripotent stem cells such as human iPS cell and the like can be obtained or produced by a method well known to those of ordinary skill in the art as mentioned above and subjected to maintenance culture and expansion culture. While the maintenance culture and expansion culture of pluripotent stem cells can be performed by suspension culture or adhesion culture, it is preferably performed by adhesion culture. While the maintenance culture and expansion culture of pluripotent stem cells may be performed in the presence of feeder cells or in the absence of feeder cells, it is preferably performed in the absence of feeder cells.

A retinal tissue in an early developmental stage can be produced using pluripotent stem cells subjected to maintenance culture and by a method well known to those of ordinary skill in the art. A method for producing a retinal tissue in an early developmental stage is not particularly limited, and may be a culture method by either suspension culture or adhesion culture. As this method, the methods described in WO 2013/077425 (& US2014/341864), WO 2015/025967 (& US2016/251616), WO 2016/063985 (& US2017/313976), WO 2016/063986 (& US2017/313981) and WO 2017/183732 and the like can be mentioned. Also, as this method, the methods described in non-patent document: Proc Natl Acad Sci USA. 111(23): 8518-8523(2014), Nat Commun. 5:4047(2014), Stem Cells. [Epub ahead of print] (2017); doi: 10.1002/stem.2586. and the like, and the like can be mentioned.

2-1. Starting Material Production Method 1

As one preferable embodiment of production of a retinal tissue in an early developmental stage, a method including the following steps can be mentioned:

(1) the first step of forming a cell aggregate by culturing pluripotent stem cells in suspension in a serum-free medium, and (2) the second step of obtaining an aggregate containing a retinal progenitor cell or a neural retinal progenitor by culturing in suspension the aggregate formed in the first step in a serum-free medium or serum-containing medium not containing an SHH signal transduction pathway agonist and containing a BMP signal transduction pathway agonist.

An aggregate containing a retinal progenitor cell or a neural retinal progenitor which is obtained by the method can be used as a retinal tissue in an early developmental stage which is a starting material used in the method of the present invention.

[First Step]

The first step can be performed according to the method described in WO2015/025967 (& US2014/341864). That is, in the first step, a cell aggregate is formed by culturing pluripotent stem cells in suspension in a serum-free medium.

The serum-free medium to be used in the first step is not particularly limited as long as it is as described above. For example, a serum-free medium free of both a BMP signal transduction pathway agonist and a Wnt signal transduction pathway inhibitor can be used. To avoid complicated preparation, for example, a serum-free medium supplemented with an appropriate amount of a commercially available serum replacement such as KSR and so on (e.g., medium of 1:1 mixture of IMDM and F-12, which is supplemented with 10% KSR, 450 µM 1-monothioglycerol and 1× Chemically Defined Lipid Concentrate) is preferably used. As a serum replacement, bovine serum albumin (BSA) can also be added at a concentration of 0.1 mg/mL-20 mg/mL, preferably about 4 mg/mL-6 mg/mL, to a serum-free medium. The amount of KSR to be added to a serum-free medium in the case of human ES cell or human iPS cell is generally about 1% to about 20%, preferably about 2% to about 20%.

The culture conditions such as culture temperature, $CO_2$ concentration and so on in the first step can be appropriately determined. The culture temperature is, for example, about 30° C. to about 40° C., preferably about 37° C. The $CO_2$ concentration is, for example, about 1% to about 10%, preferably about 5%.

The concentration of the pluripotent stem cells usable in the first step can be appropriately set so that an aggregate of the pluripotent stem cells can be more uniformly and efficiently formed. For example, when human ES cells are cultured in suspension using a 96-well plate, a liquid prepared to achieve about $1\times10^3$ to about $1\times10^5$ cells, preferably about $3\times10^3$ to about $5\times10^4$ cells, more preferably about $5\times10^3$ to about $3\times10^4$ cells, most preferably about $0.9\times10^4$ to $1.2\times10^4$ cells, per well is added to the wells, and the plate is left to stand to form aggregates.

The period for suspension culture necessary for forming an aggregate can be determined as appropriate according to the pluripotent stem cell to be used. To form uniformed cell aggregates, it is desirably as short as possible. The steps for the dispersed cells to form cell aggregates can be divided into a step for gathering cells, and a step forming cell aggregates from the gathered cells. The period from the time point of seeding the dispersed cells (i.e., at the time of the start of suspension culture) to the formation of an aggregate in the case of human pluripotent stem cells (e.g., human iPS cells, human ES cells) is, for example, preferably within about 72 hr, more preferably within about 48 hr, further preferably within about 24 hr, further more preferably within 12 hr. The period for cell aggregate formation can be appropriately adjusted by controlling the tools for aggregating the cells, centrifugation conditions and so on.

Formation of cell aggregates can be determined based on the size and cell number of the aggregates, macroscopic morphology, microscopic morphology by tissue staining analysis and uniformity thereof, expression of differentiation- and undifferentiation-markers and uniformity thereof, control of expression of differentiation marker and synchrony thereof, reproducibility of differentiation efficiency between the aggregates, and so on.

[Second Step]

A second step of obtaining an aggregate containing a retinal progenitor cell or a neural retinal progenitor cell as a retinal tissue in an early developmental stage by culturing in suspension the aggregate formed in the aforementioned first step in a serum-free medium or serum-containing medium that does not contain an SHH signal transduction pathway agonist and contains a BMP signal transduction pathway agonist is explained.

The medium to be used in the second step is, for example, a serum-free medium or a serum-containing medium not supplemented with an SHH signal transduction pathway agonist but supplemented with a BMP signal transduction pathway agonist. It is not necessary to add a basement membrane preparation.

A serum-free medium or serum-containing medium to be used for such medium is not particularly limited as long as it is as mentioned above. To avoid complicated preparation, for example, a serum-free medium supplemented with an appropriate amount of a commercially available serum replacement such as KSR and so on (e.g., medium of 1:1 mixture of IMDM and F-12 supplemented with 10% KSR, 450 µM 1-monothioglycerol and 1× Chemically Defined Lipid Concentrate) is preferably used. As a serum replacement, BSA can also be added at a concentration of 0.1 mg/mL-20 mg/mL, preferably about 4 mg/mL-6 mg/mL, to a serum-free medium. The amount of KSR to be added to a serum-free medium in the case of ES cell is generally about 1% to about 20%, preferably about 2% to about 20%.

As the serum-free medium to be used in the second step, the serum-free medium used in the first step may be continuously used as it is, or may be that replaced with a fresh medium When the serum-free medium free of a BMP signal transduction pathway substance used in the first step is directly used for the second step, a BMP signal transduction pathway agonist may be added to the medium.

The medium "free of a SHH signal transduction pathway agonist" also includes a medium substantially free of a SHH signal transduction pathway agonist, for example, a medium free of a SHH signal transduction pathway agonist at a concentration imparting an adverse influence on selective differentiation into a retinal progenitor cell or a retinal tissue.

The medium "not supplemented with a SHH signal transduction pathway agonist" also includes a medium substantially not supplemented with a SHH signal transduction pathway agonist, for example, a medium not supplemented with a SHH signal transduction pathway agonist at a concentration imparting an adverse effect on selective differentiation into a retinal progenitor cell or a retinal tissue.

Examples of BMP signal transduction pathway agonist used in the second step include BMP proteins such as BMP2, BMP4, BMP7 etc., GDF proteins such as GDF7 etc., anti-BMP receptor antibody, BMP partial peptides and so on. BMP2, BMP4 and BMP7 are available from, for example, R&D Systems, and GDF7 is available from, for example, Wako Pure Chemical Industries, Ltd. The BMP signal transduction pathway agonist is preferably BMP4.

The concentration of the BMP signal transduction pathway agonist used in the second step only need to be a concentration at which differentiation of the cells contained in the aggregates obtained in the aforementioned the first step into retinal cells can be induced. For example, BMP4 is added to the medium such that the concentration is about 0.01 nM to about 1 µM, preferably about 0.1 nM to about 100 nM, more preferably about 1 nM-about 10 nM, further preferably about 1.5 nM (55 ng/mL). When a BMP signal transduction pathway agonist other than BMP4 is used, it is desirably used at a concentration at which a BMP signal transduction pathway activation action equivalent to that of BMP4 at the above-mentioned concentration is exerted.

A BMP signal transduction pathway agonist may be added after about 24 hr or later from the start of the suspension culture in the first step, and may also be added to the medium within several days (e.g., within 15 days) from the start of the suspension culture in the first step. Preferably, a BMP signal transduction pathway agonist is added to the medium at day 1 to day 15, more preferably day 1 to day 9, further preferably day 2 to day 9, further preferably day 3 to day 8, still more preferably day 3 to day 6, most preferably day 6, from the start of the suspension culture.

After the addition of a BMP signal transduction pathway agonist to the medium and the start of the differentiation induction of cells contained in the aggregate obtained in the first step, further addition of the BMP signal transduction pathway agonist to the medium is not necessary, and the medium may be exchanged with a serum-free medium or serum-containing medium each free of a BMP signal transduction pathway agonist.

Alternatively, the concentration of the BMP signal transduction pathway agonist in the medium may be varied during the period of the second step. For example, the BMP signal transduction pathway agonist is provided to fall within the above-mentioned range of a concentration at the time of the start of the second step, and the concentration may be gradually or stepwise decreased at a ratio of 40-60% per 2-4 days.

In a specific embodiment, the medium is partly or entirely exchanged with a medium containing BMP4 on the 1st-9th day, preferably the 2nd-9th day, further preferably the 3rd-8th day, further more preferably the 3rd-6th day, after the start of suspension culture (namely, after the start of the aforementioned first step), the final concentration of BMP4 is adjusted to about 1-10 nM, and the cells can be cultured in the presence of BMP4 for, for example, 1-16 days, preferably 2-9 days, further preferably 6-9 days. It is also possible to culture cells for a longer term, specifically for not less than 20 days, not less than 30 days. That is, in the second step, culture performed in the presence of a BMP signal transduction pathway agonist is appropriately continued for a period until the aggregate obtained in the first step is induced to differentiate into a retinal tissue in an early developmental stage. Specifically, the retinal tissue in an early developmental stage can be obtained in 6-12 days after addition of the BMP signal transduction pathway agonist.

Here, the medium can be partly or entirely exchanged about 1 or 2 times with a medium containing BMP4 to maintain the concentration of BMP4 at the same concentration. Alternatively, as mentioned above, the concentration of BMP4 can also be reduced step by step.

In one embodiment, after the start of culturing in a medium containing a BMP signal transduction pathway agonist, the concentration of the BMP signal transduction pathway agonist in the medium can be gradually or stepwisely decreased at a ratio of 40-60% per 2-4 days by exchanging the medium with a serum-free medium or a serum-containing medium, each free of a BMP signal transduction pathway agonist.

Differentiation induction of a retinal tissue in an early developmental stage can be confirmed by, for example, detecting expression of a retinal progenitor marker and a neural retinal progenitor cell marker in the cells in the tissue. The aggregate formed in the first step by using pluripotent stem cells in which a fluorescence reporter protein gene such as GFP was knocked-in into the Rx gene locus is cultured in suspension in the presence of a BMP signal transduction pathway agonist at a concentration necessary for differentiation induction into retinal cell, and fluorescence emitted from the expressed fluorescence reporter protein is detected, whereby the time point when differentiation induction into retinal cell was started can be confirmed.

As one embodiment of the second step, a step of culturing the aggregate formed in the first step in suspension in a serum-free medium or serum-containing medium containing a BMP signal transduction pathway agonist at a concentration necessary for differentiation induction into retinal cell and not containing an SHH signal transduction pathway agonist, until a cell expressing retinal progenitor cell marker or neural retinal progenitor marker (e.g., Rx, Pax6, Chx10) begins emerging, thereby obtaining an aggregate containing retinal progenitor cells or neural retinal progenitor as retinal tissues in an early developmental stage can be mentioned.

In the second step, when a medium exchange operation is performed, for example, an operation to add a fresh medium without discarding the existing medium (medium addition operation), an operation to discard about a half amount of the existing medium (about 40-80% of the volume of the existing medium) and add about a half amount of a fresh medium (40-80% of the volume of the existing medium) (half-medium exchange operation), and an operation to discard about the whole amount of the existing medium (not less than 90% of the amount of the existing medium) and add about the whole amount of a fresh medium (not less than 90% of the amount of the existing medium) (full-medium exchange operation) can be mentioned.

When a particular component (e.g., BMP4) is added at a certain time point, for example, an operation to calculate the final concentration, to discard about a half amount of the existing medium, and to add about a half amount of a fresh medium containing a particular component at a concentration higher than the final concentration (specifically 1.5 times-3.0 times the final concentration, for example, about 2 times the final concentration, (half-medium exchange operation, half-medium exchange) may be performed.

When the concentration of a particular component contained in the existing medium is maintained at a certain time point, for example, an operation to discard about a half amount of the existing medium and to add about a half amount of a fresh medium containing the particular component at a concentration same as that in the existing medium may be performed.

When the concentration of a component contained in the existing medium is to be decreased by dilution at a certain time pointed, for example, the medium exchange operation may be performed plural times per day, preferably plural times (e.g., 2-3 times) within 1 hr. Also, when the concentration of a component contained in the existing medium is to be decreased by dilution at a certain time point, the cells or aggregates may be transferred to another culture container.

While the tool used for the medium exchange operation is not particularly limited, for example, pipetter, micropipette, multichannel micropipette, continuous dispenser, and the like can be mentioned. For example, when a 96 well plate is used as a culture vessel, a multichannel micropipette may be used.

In a preferable embodiment, the concentration of a SHH signal transduction pathway agonist in the medium to be used in the second step is, when calculated in terms of SHH signal transduction promoting activity of SAG, not more than 700 nM, preferably not more than 300 nM, more preferably not more than 10 nM, further preferably not more than 0.1 nM. That is, in the case of SAG, the concentration is not more than 700 nM, preferably not more than 300 nM, more preferably not more than 10 nM, further preferably not more than 0.1 nM. In the case of an SHH signal transduction pathway agonist other than SAG, it is not more than a concentration showing an SHH signal transduction promoting activity equivalent to that of SAG at the above-described concentration. Further preferably it is free of a SHH signal transduction pathway agonist. The medium "free of a SHH signal transduction pathway agonist" also includes a medium substantially free of a SHH signal transduction pathway agonist, for example, a medium free of a SHH signal transduction pathway agonist at a concentration imparting an adverse influence on selective differentiation into a retinal progenitor cell or a retinal tissue. The medium "not supplemented with a SHH signal transduction pathway agonist" also includes a medium substantially not supplemented with a SHH signal transduction pathway agonist, for example, a medium not supplemented with a SHH signal transduction pathway agonist at a concentration imparting an adverse effect on selective differentiation into a retinal progenitor cell or a retinal tissue.

The culture conditions such as culture temperature, $CO_2$ concentration and so on in the second step can be appropriately determined. The culture temperature is, for example, about 30° C. to about 40° C., preferably about 37° C. The $CO_2$ concentration is, for example, about 1% to about 10%, preferably about 5%.

By such culture, differentiation of the cells forming the aggregates obtained in the first step to a retinal tissue in an early developmental stage can be induced. That an aggregate containing retinal progenitor cells or neural retinal progenitor was obtained as a retinal tissue in an early developmental stage can be confirmed by, for example, detecting the presence of cells expressing Rx, PAX6, which is a retinal progenitor marker, or RX, PAX6 or CHX10, which is a neural retinal progenitor cell marker, in the aggregate.

One embodiment of the second step can be a step of culturing the aggregate formed in the first step in suspension in a serum-free medium or serum-containing medium containing a BMP signal transduction pathway agonist at a concentration necessary for differentiation induction into a retinal cell, until a cell expressing Rx gene begins emerging, whereby obtaining an aggregate containing retinal progenitor cells or neural retinal progenitor. In one embodiment, the culturing of the second step is performed until not less than 20% (preferably, not less than 30%, not less than 40%, not less than 50%, not less than 60%, not less than 80%) of the cells contained in the aggregate express Rx.

The aggregate obtained by the above-mentioned method can be used as a retinal tissue in an early developmental stage that is the starting material in the production method of the present invention after culturing in a suspension serum-free medium or serum-containing medium not containing any of SHH signal transduction pathway agonist, BMP signal transduction pathway agonist and Wnt signal transduction pathway agonist. The period of the suspension culture is not particularly limited as long as it is a period until emergence of a ganglion cell. It is, for example, 1 day-50 days, preferably 1 day-15 days, more preferably 1 day-7 days. The medium used in the aforementioned suspension culture is, for example, a serum-free medium or a serum-containing medium not supplemented with any of SHH signal transduction pathway agonist, BMP signal transduction pathway agonist and Wnt signal transduction pathway agonist.

The medium "not containing any of SHH signal transduction pathway agonist, BMP signal transduction pathway agonist and Wnt signal transduction pathway agonist" also includes a medium substantially not containing any of SHH signal transduction pathway agonist, BMP signal transduction pathway agonist and Wnt signal transduction pathway agonist, for example, a medium not containing SHH signal transduction pathway agonist, BMP signal transduction pathway agonist or Wnt signal transduction pathway agonist at a concentration that adversely affects selective differentiation into retinal tissue.

The medium "not supplemented with any of SHH signal transduction pathway agonist, BMP signal transduction pathway agonist and Wnt signal transduction pathway agonist" also includes a medium substantially not supplemented with any of SHH signal transduction pathway agonist, BMP signal transduction pathway agonist and Wnt signal transduction pathway agonist, for example, a medium not supplemented with SHH signal transduction pathway agonist, BMP signal transduction pathway agonist or Wnt signal transduction pathway agonist at a concentration that adversely affects selective differentiation into retinal tissue.

A serum-free medium or serum-containing medium to be used for such medium is not particularly limited as long as it is as mentioned above. To avoid complicated preparation, for example, a serum-free medium supplemented with an appropriate amount of a commercially available serum replacement such as KSR and so on (e.g., medium of 1:1 mixture of IMDM and F-12 supplemented with 10% KSR, 450 μM 1-monothioglycerol and 1× Chemically Defined Lipid Concentrate) is preferably used. As a serum replacement, bovine serum albumin (BSA) can also be added at a concentration of 0.1 mg/mL-20 mg/mL, preferably about 4 mg/mL-6 mg/mL, to a serum-free medium. The amount of KSR to be added to a serum-free medium in the case of, for example, human ES cell is generally about 1% to about 20%, preferably about 2% to about 20%. To avoid complicated preparation of serum-containing medium, for example, a serum-containing medium supplemented with an appropriate amount of a commercially available serum (e.g., medium of 1:1 mixture of DMDM and F-12, which is supplemented with serum, and N2 supplement) is more preferably used. The amount of serum to be added to a serum-containing medium in the case of human ES cell is generally about 1% to about 20%, preferably about 2% to about 20%. All the above-mentioned media may be used after addition of taurine and the like.

The culture conditions such as culture temperature, $CO_2$ concentration, $O_2$ concentration and the like can be appropriately determined. The culture temperature is, for example, about 30° C. to about 40° C., preferably about 37° C. The $CO_2$ concentration is, for example, about 1% to about 10%, preferably about 5%. The $O_2$ concentration is not less than about 5%, for example, about 20% to about 70%, preferably about 20% to about 60%, more preferably about 20% to about 40%, particularly preferably about 20%.

As described above, that the retinal tissue obtained by the starting material production method 1 is in an early developmental stage, that is, in a differentiation stage in the early stage of development in which a retinal progenitor cell or a neural retinal progenitor is contained and a ganglion cell has not emerged can be identified by measuring the expression state of at least one of retinal progenitor cell markers such as RX, PAX6 and the like, neural retinal progenitor markers such as CHX10, RX, PAX6 and the like, and ganglion cell markers such as Brn3 and the like. That is, it can be confirmed that, in this differentiation stage, not less than 30%, preferably not less than 50%, more preferably not less than 80% of the whole cells contained in the retinal tissue express retinal progenitor cell marker and/or neural retinal progenitor marker, and not more than 40%, preferably not more than 20%, not more than 10%, not more than 5%, not more than 1%, further preferably not more than 0.1%, further more preferably not more than 0.01%, of the whole cells contained in the retinal tissue express ganglion cell marker. At this time, expression of ventral marker and/or most dorsal marker (e.g., ALDH1A3 and/or ALDH1A1) does not pose any problem.

2-2. Starting Material Production Method 2

As one preferable embodiment of production of retinal tissue in an early developmental stage, a method containing the following steps can be mentioned:

(1) a first step of culturing pluripotent stem cells in the absence of feeder cells and in a medium containing 1) a TGF family signal transduction pathway inhibitor and/or an SHH signal transduction pathway agonist, and 2) a factor for maintaining undifferentiated state, (2) a second step of culturing the cells obtained in the first step in suspension to form a cell aggregate, and (3) a third step of culturing the aggregate obtained in the second step in suspension in the presence of a BMP signal transduction pathway agonist to obtain an aggregate containing a retinal progenitor cell or a neural retinal progenitor cell.

An aggregate obtained by this method and containing retinal progenitor cell or neural retinal progenitor can be used as a retinal tissue in an early developmental stage and as a starting material used in the method of the present invention.

[First Step]

The first step can be performed according to the method described in WO 2016/063985. That is, the absence of feeder cells (hereinafter to be also referred to as feeder-free) in the first step means a condition substantially free of feeder cells (e.g., the ratio of the number of feeder cells relative to the total number of cells is not more than 3%). Preferably, the first step is performed under a condition free of feeder cells. The medium to be used in the first step is not particularly limited as long as it is a medium enabling culturing of pluripotent stem cells to maintain undifferentiated state under feeder-free conditions (feeder-free medium). Preferably, to enable culturing to maintain undifferentiated state, it contains a factor for maintaining undifferentiated state.

The factor for maintaining undifferentiated state is not particularly limited as long as it is a substance having an action to suppress differentiation of pluripotent stem cells. Examples of the factor for maintaining undifferentiated state widely used by those of ordinary skill in the art include a FGF signal transduction pathway agonist, a TGFβ family signal transduction pathway agonist, insulin and the like. As the FGF signal transduction pathway agonist, fibroblast growth factors (e.g., bFGF, FGF4, FGF8) can be specifically mentioned. As the TGFβ family signal transduction pathway agonist, a TGFβ signal transduction pathway agonist, a Nodal/Activin signal transduction pathway agonist can be mentioned. As the TGFβ signal transduction pathway agonist, TGFβ1, TGFβ2 can be mentioned. As the Nodal/Activin signal transduction pathway agonist, Nodal, Activin A, Activin B can be mentioned. When human pluripotent stem cells (human ES cells, human iPS cells) are cultured, the medium in the first step preferably contains bFGF as a factor for maintaining undifferentiated state.

The factor for maintaining undifferentiated state to be used in the present invention is not particularly limited as long as it is a mammal-derived factor for maintaining undifferentiated state. Preferably, a factor for maintaining undifferentiated state of a mammal of the same species as the cells to be cultured is used. For example, for culturing human pluripotent stem cells, human factor for maintaining undifferentiated states (e.g., bFGF, FGF4, FGF8, EGF, Nodal, Activin A, Activin B, TGFβ 1, TGFβ 2 etc.) are used, and an isolated factor for maintaining undifferentiated state can be exogenously added. Alternatively, a factor for maintaining undifferentiated state may be added in advance to the medium to be used in the first step.

The concentration of the factor for maintaining undifferentiated state in the medium to be used in the first step is a concentration capable of maintaining the undifferentiated state of the pluripotent stem cells to be cultured, and can be appropriately determined by those of ordinary skill in the art. For example, specifically, when bFGF is used as a factor for maintaining undifferentiated state in the absence of feeder cells, the concentration thereof is generally about 4 ng-500 ng/mL, preferably about 10 ng-200 ng/mL, more preferably about 30 ng-150 ng/mL.

As a feeder-free medium containing a factor for maintaining undifferentiated state and usable for culturing pluripotent stem cells, many synthetic media have been developed and are commercially available and, for example, Essential 8 medium can be mentioned. Essential 8 medium is DMEM/F12 medium containing L-ascorbic acid-2-phosphate magnesium (64 mg/l), sodium selenium (14 µg/L), insulin (19.4 mg/l), NaHCO₃ (543 mg/l), transferrin (10.7 mg/l), bFGF (100 ng/mL), and a TGFβ family signal transduction pathway agonist (TGFβ 1 (2 ng/mL) or Nodal (100 ng/mL)) as additives (Nature Methods, 8, 424-429 (2011)). Examples of other commercially available feeder-free medium include S-medium (manufactured by DS Pharma Biomedical), StemPro (manufactured by Life Technologies), hESF9 (Proc. Natl. Acad. Sci. USA. 2008 Sep. 9; 105(36):13409-14), mTeSR1 (manufactured by STEMCELL Technologies), mTeSR2 (manufactured by STEMCELL Technologies), TeSR-E8 (manufactured by STEMCELL Technologies), and StemFit (manufactured by Ajinomoto Co., Inc.). The present invention can be performed conveniently by using these in the above-mentioned first step (1).

In the first step, the pluripotent stem cells may be cultured under any conditions of suspension culture and adhesion culture, preferably adhesion culture.

While a culture vessel used for adhesion culture is not particularly limited as long as "adhesion culture" can be performed, a cell adhesive culture vessel is preferable.

Cell-adhesive culture vessels include culture vessels whose surfaces have been artificially treated to improve cell adhesiveness, and specifically, the aforementioned culture vessel whose inside is coated with a coating agent can be mentioned. Examples of the coating agent include extracellular matrix such as laminin [including laminin α5β1γ1 (hereinafter laminin 511), laminin α1β1γ1 (hereinafter laminin 111) and the like and laminin fragment (laminin 511E8 etc.)], entactin, collagen, gelatin, vitronectin, Synthemax (Corning Incorporated), Matrigel and the like, or polymer such as polylysine, polyornithine and the like, and the like. It is also possible to use a culture container whose surface is processed by a positive electric charge treatment and the like. Preferred is laminin and more preferred is laminin 511E-8. Laminin 511E-8 can be a commercially available product (e.g., iMatrix-511, Nippi).

The medium to be used in the first step contains a TGFβ family signal transduction pathway inhibitor and/or an SHH signal transduction pathway agonist.

The TGFβ family signal transduction pathway inhibitor refers to a substance that inhibits the TGFβ family signal transduction pathway, i.e., signal transduction pathway transmitted by the Smad family, and specific examples include a TGFβ signal transduction pathway inhibitor, a Nodal/Activin signal transduction pathway inhibitor and a BMP signal transduction pathway inhibitor.

A TGFβ signal transduction pathway inhibitor is not particularly limited as long as it inhibits the signal transduction pathway caused by TGFβ, and may be any of nucleic acid, protein, and low-molecular-weight organic compound. Examples of the inhibitor can include a substance that directly acts on TGFβ (e.g., protein, antibody, aptamer etc.), a substance that suppresses expression of a gene encoding TGFβ (e.g., antisense oligonucleotide, siRNA etc.), a substance that inhibits the binding of a TGFβ receptor and TGFβ, and a substance that inhibits a physiological activity caused by signal transduction by TGFβ receptor (e.g., TGFβ receptor inhibitor, Smad inhibitor etc.). A protein known as a TGFβ signal transduction pathway inhibitor, Lefty and the like can be mentioned. As a TGFβ signal transduction pathway inhibitor, a compound well known to those of ordinary skill in the art can be used and, specifically, SB431542, LY-364947, SB-505124, A-83-01 and the like can be mentioned.

The Nodal/Activin signal transduction pathway inhibitor is not particularly limited as long as it inhibits a signal transduction pathway caused by Nodal or Activin, and may be any of nucleic acid, protein, and low-molecular-weight organic compound. Examples of the inhibitor can include a substance that directly acts on Nodal or Activin (e.g., antibody, aptamer etc.), a substance that suppresses expression of a gene encoding Nodal or Activin (e.g., antisense oligonucleotide, siRNA etc.), a substance that inhibits the binding of a Nodal/Activin receptor and Nodal/Activin, and a substance that inhibits a physiological activity caused by signal transduction by Nodal/Activin receptor. As a Nodal/Activin signal transduction pathway inhibitor, a compound well known to those of ordinary skill in the art can be used and, specifically, SB431542, A-83-01 and the like can be mentioned. Also, a protein (Lefty, Cerberus etc.) known as a Nodal/Activin signal transduction pathway inhibitor may be used. A Nodal/Activin signal transduction pathway inhibitor is preferably S3431542, A-83-01 or Lefty.

The BMP signal transduction pathway inhibitor is not particularly limited as long as it inhibits a signal transduction pathway caused by BMP, and may be any of nucleic acid, protein, and low-molecular-weight organic compound. Here, as BMP, BMP2, BMP4, BMP7 and GDF7 can be mentioned. Examples of the inhibitor can include a substance that directly acts on BMP (e.g., antibody, aptamer etc.), a substance that suppresses expression of a gene encoding BMP (e.g., antisense oligonucleotide, siRNA etc.), a substance that inhibits the binding of a BMP receptor (BMPR) and BMP, and a substance that inhibits a physiological activity caused by signal transduction by BMP receptor. As BMPR, ALK2 and ALK3 can be mentioned. As a BMP signal transduction pathway inhibitor, a compound well known to those of ordinary skill in the art can be used and, specifically, LDN193189, Dorsomorphin and the like can be mentioned. Also, a protein (Chordin, Noggin etc.) known as a BMP signal transduction pathway inhibitor may be used. A BMP signal transduction pathway inhibitor is preferably LDN193189.

A TGFβ family signal transduction pathway inhibitor is preferably Lefty, SB431542, A-83-01 or LDN193189.

Plural kinds of TGFβ family signal transduction pathway inhibitors having different points of action may be used in combination. By combining them, the aggregate quality improving effect is expected to be enhanced. For example, a combination of a TGFβ signal transduction pathway inhibitor and a BMP signal transduction pathway inhibitor, a combination of a TGFβ signal transduction pathway inhibitor and a Nodal/Activin signal transduction pathway inhibitor, a combination of a BMP signal transduction pathway inhibitor and a Nodal/Activin signal transduction pathway inhibitor can be mentioned. Preferably, a TGFβ signal transduction pathway inhibitor is used in combination with a BMP signal transduction pathway inhibitor. A specific preferable combination is, for example, a combination of SB431542 and LDN193189.

The SHH transduction pathway agonist is not particularly limited as long as it is a substance capable of enhancing signal transduction mediated by SHH. Examples of the SHH signal transduction pathway agonist include proteins belonging to the Hedgehog family (e.g., SHH and Ihh), SHH receptor, SHH receptor agonist, PMA or SAG and the like.

The SHH signal transduction pathway agonist is preferably SHH protein (Genbank accession numbers: NM 000193, NP 000184), SAG or PMA.

A TGFβ family signal transduction pathway inhibitor and a SHH signal transduction pathway agonist may be used in combination. As a specific combination, a combination of any TGFβ family signal transduction pathway inhibitor selected from the group consisting of Lefty, SB431542, A-83-01 and LDN193189, and any SHH signal transduction pathway agonist selected from the group consisting of SHH protein, SAG and PMA can be mentioned. When a TGFβ family signal transduction pathway inhibitor and a SHH signal transduction pathway agonist are used in combination, cells may be cultured in a medium containing both a TGFβ family signal transduction pathway inhibitor and a SHH signal transduction pathway agonist, or cells may be treated with either of a TGFβ family signal transduction pathway inhibitor and a SHH signal transduction pathway agonist, and continuously treated with either or both of them.

The concentrations of the TGFβ family signal transduction pathway inhibitor and the SHH signal transduction pathway agonist can be appropriately determined to fall within a range capable of affording the aforementioned effects. For example, SB431542 is generally used at a concentration of 0.1 μM-200 μM, preferably 2 μM-50 μM. A-83-01 is generally used at a concentration of 0.05 μM-50 μM, preferably 0.5 μM-5 μM. LDN193189 is generally used at a concentration of 1-2000 μM, preferably 10-300 nM. Lefty is generally used at a concentration of 5 ng/mL-200 ng/mL, preferably 10 ng/mL-50 ng/mL. SHH protein is generally used at a concentration of 20 ng/mL-1000 ng/mL, preferably 50 ng/mL-300 ng/mL. SAG is generally used at a concentration of 1 nM-2000 nM, preferably 10 nM-700 nM, more preferably 30-600 nM. PMA is generally used at a concentration of 0.002-20 μM, preferably 0.02 μM-2 μM. In one embodiment, a TGFβ family signal transduction pathway inhibitor can be appropriately used in an amount conferring TGFβ family signal transduction pathway inhibiting activity equivalent to that of SB43154 at the aforementioned concentration. In one embodiment, an SHH signal transduction pathway agonist can be appropriately used at a concentration providing SHH signal transduction pathway activating action equivalent to that of SAG at the aforementioned concentration.

A medium to be used in the first step may be a serum-containing medium or a serum-free medium. To avoid contamination with a chemically-undefined component, it is preferably a serum-free medium.

To avoid contamination with a chemically-undefined component, a medium to be used for the first step may be a medium whose components are chemically-defined.

In the first step, the pluripotent stem cells may be cultured under any conditions of suspension culture and adhesion culture, preferably adhesion culture.

For culturing pluripotent stem cells under feeder-free conditions in the first step, an appropriate matrix may be used as a scaffold to provide a scaffold in stead of the feeder cells to the pluripotent stem cell. The pluripotent stem cells are subjected to adhesion culture in a cell container whose surface is coated with a matrix as a scaffold.

As a matrix available as a scaffold, laminin (Nat Biotechnol 28, 611-615 (2010)), laminin fragment (Nat Commun 3, 1236 (2012)), basement membrane preparation (Nat Biotechnol 19, 971-974 (2001)), gelatin, collagen, heparan sulfate proteoglycan, entactin, vitronectin and the like can be mentioned.

Preferably, in the culturing of pluripotent stem cells under feeder-free conditions in the first step, the pluripotent stem cells are cultured in an adhered state in a cell container with surface coated with isolated laminin 511 or E8 fragment of laminin 511 (more preferably, E8 fragment of laminin 511).

While the period for the culturing of pluripotent stem cells in the first step is not particularly limited as long as the effect of improving the quality of the aggregate formed in the second step can be achieved, it is generally 0.5-144 hr. The period for the culturing of the pluripotent stem cells in the first step is preferably not less than 1 hr, not less than 2 hr, not less than 6 hr, not less than 12 hr, not less than 18 hr, or not less than 24 hr. The period for the culturing of the pluripotent stem cells in the first step is preferably within 96 hr or 72 hr. In, one embodiment, the period for the culturing of pluripotent stem cells in the first step is preferably 2-96 hr, more preferably 6-48 hr, further preferably 12-48 hr, further more preferably 18-28 hr (e.g., 24 hr). That is, the first step is started 0.5-144 hr (preferably, 18-28 hr) before the start of the second step, and the second step is continuously performed on completion of the first step. In a further embodiment, the period for the culturing of pluripotent stem cells in the first step is preferably 18-144 hr, 24-144 hr, 24-96 hr, or 24-72 hr. When the cells are treated with either of a TGFβ family signal transduction pathway inhibitor and a SHH signal transduction pathway agonist, and continuously treated with the other, the treatment time of each can be set to fall within the range of the aforementioned period for the culturing.

The culture conditions such as culture temperature, and $CO_2$ concentration in the first step can be appropriately determined. The culture temperature is, for example, about 30° C. to about 40° C., preferably about 37° C. The $CO_2$ concentration is, for example, about 1% to about 10%, preferably about 5%.

In a preferable embodiment, the cells obtained in the first step maintain a pluripotent-like state, and the pluripotent-like state is maintained throughout the first step. The pluripotent-like state means a state maintaining at least a part of the characteristics unique to pluripotent stem cells and common to pluripotent stem cells, including pluripotency. The pluripotent-like state does not require strict pluripotency. Specifically, the state expressing all or a part of the markers to be an index of pluripotent state is included in the "pluripotent-like state". As the marker of the pluripotent-like state, Oct3/4 positive, alkaline phosphatase positive and the like can be mentioned. In one embodiment, a cell maintaining the pluripotent-like state is Oct3/4 positive. It is included in a "cell showing a pluripotent-like state" even when the expression level of Nanog is low as compared to ES cell or iPS cell.

In one embodiment, the cells obtained in the first step are stem cells having a potency to differentiate into at least retinal tissue, retinal cell, retinal progenitor cell, or retinal layer-specific neuron.

In a preferable embodiment, human pluripotent stem cells (e.g., iPS cells) are cultured in an adhered state in the absence of feeder cells and in a serum-free medium containing a TGFβ family signal transduction pathway inhibitor and/or an SHH signal transduction pathway agonist, and bFGF.

The above-mentioned adhesion culture is preferably performed in a cell container whose surface is coated with laminin 511 or E8 fragment of laminin 511. The TGFβ family signal transduction pathway inhibitor is preferably a TGF signal transduction pathway inhibitor (e.g., SB431542, A-83-01, Lefty), a Nodal/Activin signal transduction pathway inhibitor (e.g., Lefty, SB431542, A-83-01), a BMP signal transduction pathway inhibitor (e.g., LDN193189, Chordin, Noggin), or a combination thereof (e.g., SB431542 and LDN193189). The TGFβ family signal transduction pathway inhibitor is more preferably Lefty, SB431542, A-83-01, or LDN193189, or a combination thereof (e.g., SB431542 and LDN193189). The SHH signal transduction pathway agonist is preferably SHH protein, SAG or Purmorphamine (PMA), more preferably SAG. A TGFβ family signal transduction pathway inhibitor (e.g., Lefty, SB431542, A-83-01, LDN193189) and an SHH signal transduction pathway agonist (e.g., SHH protein, SAG, PMA) may be used in combination. The period for the culturing is 0.5-144 hr (preferably, 18-144 hr, 24-144 hr, 24-96 hr, or 24-72 hr (e.g., 18-28 hr)).

For example, human pluripotent stem cells (e.g., human iPS cells) are subjected to maintenance culture in the absence of feeder cells and in a serum-free medium containing bFGF. The maintenance culture is preferably performed by adhesion culture. The adhesion culture is preferably performed in a cell container whose surface is coated with vitronectin, laminin 511 or E8 fragment of laminin 511. Then, a TGFβ family signal transduction pathway inhibitor and/or an SHH signal transduction pathway agonist are/is added to the culture, and the culturing is continued. The TGFβ family signal transduction pathway inhibitor is preferably a TGFβ signal transduction pathway inhibitor (e.g., SB431542, A-83-01, Lefty), a Nodal/Activin signal transduction pathway inhibitor (e.g., SB431542, A-83-01, Lefty), a BMP signal transduction pathway inhibitor (e.g., LDN193189), or a combination thereof (e.g., SB431542 and LDN193189). The TGFβ family signal transduction pathway inhibitor is more preferably Lefty, SB431542, A-83-01, or LDN193189, or a combination thereof (e.g., SB431542 and LDN193189). The SHH signal transduction pathway agonist is preferably SHH protein, SAG or PMA. A TGFβ family signal transduction pathway inhibitor (e.g., Lefty, SB431542, A-83-01, LDN193189) and an SHH signal transduction pathway agonist (e.g., SHH protein, SAG, PMA) may be used in combination. After the addition, the culturing is continued for 0.5-144 hr (preferably, 18-144 hr, 24-144 hr, 24-96 hr, or 24-72 hr (e.g., 18-28 hr)).

[Second Step]

The second step wherein the cells obtained in the first step are cultured in suspension in a medium to form a cell aggregate is explained.

The medium to be used in the second step may be a serum-containing medium or serum-free medium. To avoid contamination of chemically-undefined components, a serum-free medium is preferably used in the present invention. For example, a serum-free medium free of both a BMP signal transduction pathway agonist and a Wnt signal transduction pathway inhibitor can be used. To avoid complicated preparation, for example, a serum-free medium supplemented with an appropriate amount of a commercially available serum replacement such as KSR and so on (e.g., medium of 1:1 mixture of IMDM and F-12, which is supplemented with 10% KSR, 450 μM 1-monothioglycerol and 1× Chemically Defined Lipid Concentrate, or medium of GMEM supplemented with 5%-20% KSR, NEAA, pyruvic acid, 2-mercaptoethanol) is preferably used. The amount of KSR to be added to a serum-free medium in the case of human pluripotent stem cells is generally about 1% to about 30%, preferably about 2% to about 20%.

For formation of an aggregate, dispersed cells are first prepared by a dispersing operation of the cells obtained in the first step. The "dispersed cells" obtained by the dispersing operation refers to a state where, for example, not less than 70% of cells are single cells and not more than 30% of cells are clusters of 2-50 cells. Preferably, as the dispersed cells, a state where not less than 80% of cells are single cells, and not more than 20% of cells are clumps of 2-50 cells can be mentioned. The dispersed cells refer to a state almost free of mutual adhesion of cells (e.g., plane attachment).

A dispersion operation of the cells obtained in the first step may contain the above-mentioned mechanical dispersion treatment, cell dispersion solution treatment, and cell protecting agent treatment. These treatments may be performed in combination. Preferably, a cell dispersion solution treatment is performed simultaneously with a cell protecting agent treatment and then a mechanical dispersion treatment is performed.

As a cell protecting agent to be used for the cell protecting agent treatment, a FGF signal transduction pathway agonist (e.g., fibroblast growth factor such as bFGF, FGF4, FGF8 and the like), heparin, an IGF signal transduction pathway agonist (e.g., insulin), serum, and serum replacement can be mentioned. As a cell protecting agent for suppressing cell death of pluripotent stem cells (particularly, cell death of human pluripotent stem cells) induced by dispersion, a Rho-associated coiled-coilkinase (ROCK) inhibitor or a Myosin inhibitor may be added. To suppress cell death of pluripotent stem cells (particularly, human pluripotent stem cells) induced by dispersion, and protect the cells, a ROCK inhibitor or a Myosin inhibitor may be added from the start of the second step culture. As a ROCK inhibitor, Y-27632, Fasudil (HA1077), H-1152 and the like can be mentioned. As a Myosin inhibitor, Blebbistatin can be mentioned.

As a cell dispersion solution to be used for the cell dispersion treatment, a solution containing any of enzymes such as trypsin, collagenase, hyaluronidase, elastase, pronase, DNase, papain and so on, and a chelating agent such as ethylenediaminetetraacetic acid and so on can be mentioned. A commercially available cell dispersion solution such as TrypLE Select (manufactured by Life Technologies) and TrypLE Express (manufactured by Life Technologies) can also be used.

As a method of mechanical dispersion treatment, a pipetting treatment or scraping by a scraper can be mentioned.

The dispersed cells are suspended in the above-mentioned medium.

Then, a suspension of the dispersed cells is seeded in the above-mentioned culture vessel, and the dispersed cells are cultured under a condition non-adhesive to the culture vessel, whereby plural cells are gathered to form an aggregate. In this case, plural cell aggregates may be simultaneously formed in one culture vessel by seeding the dispersed cells in a comparatively large culture vessel such as a 10 cm dish. However, the size of the aggregates varies in this case. Thus, for example, a given amount of dispersed stem cells are placed in each well of a multiwell plate (U-bottom, V-bottom) such as a 96-well plate, and static culture is performed, whereby the cells are rapidly coagulated to form one aggregate in each well. The aggregates are recovered from plural wells, whereby a population of uniformed aggregates can be obtained.

The concentration of the cells in the second step can be appropriately set so that cell aggregates can be more uniformly and efficiently formed. For example, when human cells (e.g., cells obtained from human iPS cell in the first step) are cultured in suspension using a 96-well plate, a liquid prepared to achieve about $1\times10^3$ to about $1\times10^5$ cells, preferably about $3\times10^3$ to about $5\times10^4$ cells, more preferably about $4\times10^3$ to about $2\times10^4$ cells, further preferably about $4\times10^3$ to about $1.6\times10^4$ cells, further more preferably about $8\times10^3$ to about $1.2\times10^4$ cells, per well is added to the wells, and the plate is stood to form aggregates.

The culture conditions such as culture temperature, $CO_2$ concentration and so on in the second step can be appropriately determined. The culture temperature is, for example, about 30° C. to about 40° C., preferably about 37° C. The $CO_2$ concentration is, for example, about 1% to about 10%, preferably about 5%.

In the second step, when a medium exchange operation is performed, for example, an operation to add a fresh medium without discarding the existing medium (medium addition operation), an operation to discard about a half amount of the existing medium (about 30-90%, for example, 40-60% of the volume of the existing medium) and add about a half amount of a fresh medium (30-90%, for example, about 40-60% of the volume of the existing medium) (half-medium exchange operation), and an operation to discard about the whole amount of the existing medium (not less than 90% of the amount of the existing medium) and add about the whole amount of a fresh medium (not less than 90% of the amount of the existing medium) (full-medium exchange operation) can be mentioned.

While the tool used for the medium exchange operation is not particularly limited, for example, pipetter, micropipette, multichannel micropipette, continuous dispenser, and the like can be mentioned. For example, when a 96 well plate is used as a culture vessel, a multi-channel micropipette may be used.

The period for suspension culture necessary for forming a cell aggregate can be determined as appropriate according to the cell to be used, so that the cells can be aggregated uniformly. To form uniformed cell aggregates, it is desirably as short as possible. The steps for the dispersed cells to form cell aggregates can be divided into a step for gathering cells, and a step for forming cell aggregates from the gathered cells. The period from the time point of seeding the dispersed cells (i.e., at the time of the start of suspension culture) to gathering of the cells, for example, in case of human cells (e.g., stem cells obtained from human iPS cells in the first step), the gathered cells are formed preferably within about 24 hr, more preferably within about 12 hr. The period from the time point of seeding the dispersed cells (i.e., at the time of the start of suspension culture) to form an aggregate in case of human pluripotent stem cells (e.g., human iPS cells) is, for example, preferably within about 72 hr, more preferably within about 48 hr. The period for cell aggregate formation can be appropriately adjusted by controlling the tools for aggregating the cells, centrifugation conditions and so on.

Formation of cell aggregates and uniformity thereof can be determined based on the size and cell number of the aggregates, macroscopic morphology, microscopic morphology by tissue staining analysis and uniformity thereof, expression of differentiation- and undifferentiation-markers and uniformity thereof, control of expression of differentiation marker and synchrony thereof, reproducibility of differentiation efficiency between the aggregates, and so on.

After aggregate formation, the aggregate may be continuously cultured as it is. The suspension culture in the second step may generally be continued until a BMP signal transduction pathway agonist is added. Specifically, it is generally continued for 12 hr-6 days, preferably about 12 hr-48 hr.

As one embodiment of the medium to be used in the second step, a medium containing an SHH signal transduction pathway agonist can be mentioned. In the first step, pluripotent stem cells are treated with a TGFβ family signal transduction pathway inhibitor and/or a SHH signal transduction pathway agonist; and in the second step, the cells obtained in the first step are cultured in suspension in a medium (preferably serum-free medium) containing a SHH signal transduction pathway agonist to form aggregates, which results in further quality improvement of the aggregate and enhancement of its differentiation potency into retinal tissue. Using this high quality aggregate, an aggregate containing retinal progenitor cell or neural retinal progenitor can be induced with high efficiency.

As the SHH signal transduction pathway agonist, those mentioned above can be used. Preferably, the SHH signal transduction pathway agonist is SHH protein, SAG or PMA. The concentration of the SHH signal transduction pathway agonist in the medium can be appropriately determined to fall within a range capable of achieving the aforementioned effects. SAG is generally used at a concentration of 1 nM-2000 nM, preferably 10 nM-700 nM, more preferably 30 nM-600 nM. PMA is generally used at a concentration of 0.002 µM-20 µM, preferably 0.02 µM-2 µM. SHH protein is generally used at a concentration of 20 ng/ml-1000 ng/ml, preferably 50 ng/ml-300 ng/ml. When a SHH signal transduction pathway agonist other than SAG, PMA, and SHH protein is used, it is desirably used at a concentration affording an SHH signal transduction pathway activating action which is equivalent to the above-mentioned concentration of SAG.

The concentration of the SHH signal transduction pathway agonist in the medium may be varied during the period of the second step. For example, the SHH signal transduction pathway agonist is provided to fall within the above-mentioned range of a concentration at the time of the start of the second step, and the concentration may be gradually or stepwise decreased at a ratio of 40-60% per 2-4 days.

The timing of addition of a SHH signal transduction pathway agonist to the medium is not particularly limited as long as the above-mentioned effects can be afforded, but a higher effect can be obtained when it is added earlier. A SHH signal transduction pathway agonist is added to the medium generally within 6 days, preferably within 3 days, more preferably within 1 day, from the start of the second step, and further preferably at the time of the start of the second step.

In a preferable embodiment, the human cells obtained in the first step (e.g., cells obtained from human iPS cells in the first step) are subjected to suspension culture in a serum-free medium containing a SHH signal transduction pathway agonist (e.g., SAG, PMA, SHH protein) to form aggregates. A SHH signal transduction pathway agonist is preferably contained in the medium from the time of the start of suspension culture. A ROCK inhibitor (e.g., Y-27632) may also be added to the medium. The period for the culturing is 12 hr-6 days, preferably 12 hr-48 hr. The aggregates formed are preferably uniformed aggregates.

For example, the human cells obtained in the first step (e.g., cells obtained from human iPS cells in the first step) are recovered, dispersed into single cells or a state close thereto in a serum-free medium containing a SHH signal transduction pathway agonist (e.g., SAG, PMA), and subjected to suspension culture. The serum-free medium may contain a ROCK inhibitor (e.g., Y-27632). A suspension of human stem cells (e.g., stem cells derived from human iPS cells) is seeded in the above-mentioned culture vessel and the dispersed cells are cultured under conditions where they are non-adhesive to the culture vessel, whereby plural cells are assembled to form an aggregate. The period for the culturing is 12 hr-6 days (preferably 12 hr-48 hr). The aggregates formed are preferably uniformed aggregates.

By performing the second step in this manner, aggregates of the cells obtained in the first step, or the cells derived therefrom can be formed. The aggregate obtained in the second step have higher quality than the one formed by a treatment without a TGFβ family signal transduction pathway inhibitor and/or a SHH signal transduction pathway agonist is not performed in the first step. To be specific, a population of spherical cell aggregates having a smooth surface and a dense inside, and having a high ratio of uncollapsed aggregates can be obtained. In one embodiment, when aggregates (e.g., not less than 100 aggregates) are randomly selected on day 6 from the start of the second step, the ratio of non-cystic aggregates is, for example, not less than 70%, preferably not less than 80%.

The aggregate obtained in the second step has a potency to differentiate into a retinal tissue.

In one preferable embodiment, in the first step, pluripotent stem cells are treated with a TGFβ signal transduction pathway inhibitor, and in the second step, the cells obtained in the first step are subjected to suspension culture in a medium containing a SHH signal transduction pathway agonist (e.g., SAG, PMA, SHH protein). Preferably, SB431542 or A-83-01 may be used here as a TGFβ signal transduction pathway inhibitor.

In one preferable embodiment, in the first step, pluripotent stem cells are treated with a BMP signal transduction pathway inhibitor, and in the second step, the cells obtained in the first step are subjected to suspension culture in a medium free of a SHH signal transduction pathway agonist (e.g., SAG, PMA, SHH protein). Preferably, LDN193189 may be used here as a BMP signal transduction pathway inhibitor.

In one preferable embodiment, in the first step, pluripotent stem cells (e.g., human pluripotent stem cell) are treated with a TGFβ family signal transduction pathway inhibitor (e.g., a TGFβ signal transduction pathway inhibitor (e.g., Lefty, SB431542, A-83-01), a Nodal/Activin signal transduction pathway inhibitor (e.g., Lefty, SB431542, A-83-01), a BMP signal transduction pathway inhibitor (e.g., LDN193189), or a combination thereof (e.g., SB431542 and LDN193189) etc.); a SHH signal transduction pathway agonist (e.g., SHH protein, SAG, PMA); or a combination of a TGFβ family signal transduction pathway inhibitor (e.g., Lefty, SB431542, A-83-01, LDN193189) and an SHH signal transduction pathway agonist (e.g., SHH protein, SAG, PMA) and, in the second step, suspension culture of the cells obtained in the first step is performed in a medium containing an Sonic hedgehog signal transduction pathway agonist (e.g., SAG, PMA, SHH protein).

In another embodiment, in the first step, pluripotent stem cells (e.g., human pluripotent stem cells) are treated with a TGFβ family signal transduction pathway inhibitor (e.g., a TGFβ signal transduction pathway inhibitor (e.g., a Lefty, SB431542, A-83-01), a Nodal/Activin signal transduction pathway inhibitor (e.g., Lefty, 5B431542, A-83-01), a BMP signal transduction pathway inhibitor (e.g., LDN193189), or a combination thereof (e.g., SB431542 and LDN193189) etc.); a SHH signal transduction pathway agonist (e.g., SHH protein, SAG, PMA); or a combination of a TGFβ family signal transduction pathway inhibitor (e.g., Lefty, 5E431542, A-83-01, LDN193189) and an SHH signal transduction pathway agonist (e.g., SHH protein, SAG, PMA) and, in the second step, suspension culture of the cells obtained in the first step is performed in a medium free of a Sonic hedgehog signal transduction pathway agonist (e.g., SAG, PMA, SHH protein).

In any embodiment, the medium in the second step preferably contains a ROCK inhibitor (e.g., Y-27632).

[Third Step]

The aggregate obtained in the second step is cultured in suspension in the presence of a BMP signal transduction pathway agonist, whereby an aggregate containing a retinal progenitor cell or a neural retinal progenitor can be obtained. In this step, production can be performed according to the second step of the aforementioned starting material production method 1.

In one embodiment, when the concentration of the SHH signal transduction pathway agonist added to the medium in the second step is comparatively low (e.g., not more than 700 nM for SAG, and a concentration conferring SHH signal transduction pathway activating action equivalent to or lower than that of SAG at the above-mentioned concentration, for other SHH signal transduction pathway agonists), medium exchange is not necessary, and a BMP signal transduction pathway agonist (e.g., BMP4) may be added to the medium used in the second step. On the other hand, when the concentration of the SHH signal transduction pathway agonist is comparatively high (e.g., exceeding 700 nM or not less than 1000 nM for SAG, and a concentration conferring a SHH signal transduction pathway activating action equivalent to that of SAG at the above-mentioned concentration, for other SHH signal transduction pathway agonists), it is desirable to exchange the medium with a fresh medium containing a BMP signal transduction pathway agonist (e.g., BMP4) to suppress an influence of the SHH signal transduction pathway agonist remaining when a BMP signal transduction pathway agonist is added.

In a preferable embodiment, the concentration of a SHH signal transduction pathway agonist in the medium to be used in the third step is, when calculated in terms of SHH signal transduction promoting activity of SAG, not more than 700 nM, preferably not more than 300 nM, more preferably not more than 10 nM, further preferably not more than 0.1 nM. That is, in the case of SAG, the concentration is not more than 700 nM, preferably not more than 300 nM, more preferably not more than 10 nM, further preferably not more than 0.1 nM and, in the case of SHH signal transduction pathway agonist other than SAG, it is not more than a concentration exhibiting a SHH signal transduction promoting activity equivalent to that of SAG at the aforementioned concentration. Further preferably, it is free of a SHH signal transduction pathway agonist. The medium "free of a SHH signal transduction pathway agonist" also includes a medium substantially free of a SHH signal transduction pathway agonist, for example, a medium free of a SHH signal transduction pathway agonist at a concentration imparting an adverse influence on selective differentiation into a retinal progenitor cell or a retinal tissue. The medium "free of a SHH signal transduction pathway agonist" also includes a medium substantially not supplemented with a SHH signal transduction pathway agonist, for example, a medium not supplemented with a SHH signal transduction pathway agonist at a concentration imparting an adverse influence on selective differentiation into a retinal progenitor cell or a retinal tissue.

In a preferable embodiment of the production of a retinal tissue in the early developmental stage, in the first step, human pluripotent stem cells (e.g., human iPS cells) are cultured in an adhered state in the absence of feeder cells in a serum-free medium containing a TGFβ signal transduction pathway inhibitor (e.g., SB431542, A-83-01) and bFGF; in the second step, the cells are cultured in suspension in a serum-free medium containing a SHH signal transduction pathway agonist (e.g., SAG, PMA, SHH protein); and in the third step, the aggregate is cultured in suspension in a serum-free medium containing a BMP signal transduction pathway agonist (e.g., BMP4).

In addition, in a preferable embodiment of the production of a retinal tissue in the early developmental stage, in the first step, human pluripotent stem cells (e.g., human iPS cells) are cultured in an adhered state in the absence of feeder cells in a serum-free medium containing a BMP signal transduction pathway inhibitor (e.g., LDN193189) and bFGF; in the second step, the cells are cultured in suspension in a serum-free medium free of or containing a SHH signal transduction pathway agonist (e.g., SAG, PMA); and in the third step, the aggregate is cultured in suspension in a serum-free medium containing a BMP signal transduction pathway agonist (e.g., BMP4).

In a preferable embodiment of the production of a retinal tissue in the early developmental stage, in the first step, human pluripotent stem cells (e.g., human iPS cells) are cultured in an adhered state in the absence of feeder cells in a serum-free medium containing a SHH signal transduction pathway agonist (e.g., SAG, PMA) and bFGF for preferably not less than 1 day and not more than 6 days, further preferably 2-4 days, in the second step, the cells are cultured in suspension in a serum-free medium containing a SHH signal transduction pathway agonist (e.g., SAG, PMA), and in the third step, the aggregates are cultured in suspension in a serum-free medium containing a BMP signal transduction pathway agonist (e.g., BMP4).

In a preferable embodiment of the production of a retinal tissue in the early developmental stage, in the first step, human pluripotent stem cells (e.g., human iPS cells) are cultured in an adhered state in the absence of feeder cells in a serum-free medium containing a TGFβ family signal transduction pathway inhibitor (e.g., a TGFβ signal transduction pathway inhibitor (e.g., Lefty, SB431542, A-83-01), a Nodal/Activin signal transduction pathway inhibitor (e.g., Lefty, SB431542, A-83-01), a BMP signal transduction pathway inhibitor (e.g., LDN193189), or a combination thereof (e.g., SB431542 and LDN193189) etc.); a SHH signal transduction pathway agonist (e.g., SHH protein, SAG, PMA); or a combination of a TGFβ family signal transduction pathway inhibitor (e.g., Lefty, SB431542, A-83-01, LDN193189) and a SHH signal transduction pathway agonist (e.g., SHH protein, SAG, PMA); and bFGF, in the second step, the cells obtained the first step are cultured in suspension in a serum-free medium containing a SHH signal transduction pathway agonist (e.g., SAG, PMA, SHH protein) to form a cell aggregate, and in the third step, the aggregate is cultured in suspension in a serum-free medium containing a BMP signal transduction pathway agonist (e.g., BMP4) to give an aggregate containing a retinal progenitor cell or a neural retinal progenitor.

The second step and the third step of the starting material production method 2 can also be produced by the method disclosed in WO 2017/183732. That is, in the second step and/or the third step, suspension culture is performed in a medium further containing a Wnt signal transduction pathway inhibitor to form a cell aggregate.

The Wnt signal transduction pathway inhibitor to be used in the second step is not particularly limited as long as it can suppress signal transduction mediated by Wnt, and may be any of protein, nucleic acid, low-molecular-weight compound and the like. The signal mediated by Wnt is transduced via a Wnt receptor present as a heterodimer of Frizzled (Fz) and LRP5/6 (low-density lipoprotein receptor-related protein 5/6). Examples of the Wnt signal transduction pathway inhibitor include, but are not limited to, a substance that directly acts on Wnt or Wnt receptor (anti-Wnt neutralizing antibody, anti-Wnt receptor neutralizing antibody etc.), a substance that suppresses expression of gene encoding Wnt or Wnt receptor (e.g., antisense oligonucleotide, siRNA etc.), a substance that inhibits binding of Wnt receptor and Wnt (soluble Wnt receptor, dominant negative Wnt receptor etc., Wnt antagonist, Dkk1, Cerberus protein etc.), a substance that inhibits physiological activity caused by signal transduction by Wnt receptor [low-molecular-weight compounds such as CKI-7 (N-(2-aminoethyl)-5-chloroisoquinoline-8-sulfonamide), D4476 (4-[4-(2,3-dihydro-1,4-benzodioxin-6-yl)-5-(2-pyridinyl)-1H-imidazol-2-yl]benzamide), IWR-1-endo (IWR1e) (4-[(3aR,4S,7R,7aS)-1,3,3a,4,7,7a-hexahydro-1,3-dioxo-4,7-methano-2H-isoindol-2-yl]-N-8-quinolinyl-benzamide), and IWP-2 (N-(6-methyl-2-benzothiazolyl)-2-[(3,4,6,7-tetrahydro-4-oxo-3-phenylthieno[3,2-d]pyrimidin-2-yl)thio]acetamide) and the like, and the like] and the like. One or more kinds of these may be contained as a Wnt signal transduction pathway inhibitor. CKI-7, D4476, IWR-1-endo (IWR1e), IWP-2 and the like are known Wnt signal transduction pathway inhibitors, and commercially available products and the like are available as appropriate. As a preferred Wnt signal transduction pathway inhibitor, IWR1e is used.

[Second Step]

The concentration of the Wnt signal transduction pathway inhibitor only needs to be a concentration capable of inducing formation of a good cell aggregate. For example, IWR-1-endo is added to a medium such that the concentration is about 0.1 μM to about 100 μM, preferably about 0.3 μM to about 30 μM, more preferably about 1 μM to about 10 μM, further preferably about 3 μM. When a Wnt signal transduction pathway inhibitor other than IWR-1-endo is used, it is desirably used at a concentration exhibiting a Wnt signal transduction pathway inhibiting activity equivalent to that of IWR-1-endo at the above-mentioned concentration.

The timing of addition of a Wnt signal transduction pathway inhibitor to the medium is preferably earlier. A Wnt signal transduction pathway inhibitor is added to the medium generally within 6 days, preferably within 3 days, more preferably within 1 day, more preferably within 12 hours, from the start of the suspension culture in the second step, and further preferably at the time of the start of the suspension culture in the second step. Specifically, for example, it is possible to add a basal medium to which a Wnt signal transduction pathway inhibitor is added, or exchange a part or the whole of the medium with the basic medium. While the period during which the cells obtained in the first step are treated with the Wnt signal transduction pathway inhibitor in the second step is not particularly limited, preferably, the inhibitor is added to the medium when the suspension culture is started in the second step and acted until the end of the second step (immediately before addition of the BMP signal transduction pathway agonist). Further preferably, as mentioned later, the cells are continuously exposed to the Wnt signal transduction pathway inhibitor even after completion of the second step (that is, during the period of the third step). In one embodiment, as described later, the Wnt signal transduction pathway inhibitor may be allowed to continuously act even after completion of the second step (that is, during the period of the third step) until a retinal tissue is formed.

[Third Step]

As the Wnt signal transduction pathway inhibitor, any of the aforementioned Wnt signal transduction pathway inhibitors can be used. Preferably, the same kind of Wnt signal transduction pathway inhibitor as in the second step is used in the third step.

The concentration of the Wnt signal transduction pathway inhibitor only needs to be a concentration capable of inducing a retinal progenitor cell and retinal tissue. For example, IWR-1-endo is added to a medium such that the concentration is about 0.1 μM to about 100 μM, preferably about 0.3 μM to about 30 μM, more preferably about 1 μM to about 10 μM, further preferably about 3 μM. When a Wnt signal transduction pathway inhibitor other than IWR-1-endo is used, it is desirably used at a concentration exhibiting a Wnt signal transduction pathway inhibiting activity equivalent to that of IWR-1-endo at the above-mentioned concentration. The concentration of the Wnt signal transduction pathway inhibitor in the medium of the third step is preferably 50-150, more preferably 80-120, further preferably 90-110, when the concentration of the Wnt signal transduction pathway inhibitor in the medium of the second step is 100, and more preferably equivalent to the concentration of the Wnt signal transduction pathway inhibitor in the medium of the second step.

The timing of addition of a Wnt signal transduction pathway inhibitor to the medium is not particularly limited as long as an aggregate containing a retinal cell or retinal tissue can be formed, but earlier addition is more preferable. Preferably, a Wnt signal transduction pathway inhibitor is added to the medium at the time of the start of the third step. More preferably, a Wnt signal transduction pathway inhibitor is added in the second step and continuously contained in the medium also in the third step (i.e., from the time of the start of the third step). Further preferably, a Wnt signal transduction pathway inhibitor is added at the time of the start of suspension culture in the second step and continuously contained in the medium also in the third step. For example, a BMP signal transduction agonist (e.g., BMP4) is added to the culture obtained in the second step (suspension of aggregate in the medium containing a Wnt signal transduction pathway inhibitor).

The period of action of the Wnt signal transduction pathway inhibitor is not particularly limited. Preferably, when a Wnt signal transduction pathway inhibitor is added at the time of the start of suspension culture in the second step, the period is 2 days to 30 days, more preferably 6 days to 20 days, 8 days to 18 days, 10 days to 18 days, or 10 days to 17 days (e.g., 10 days), with the time of the start of suspension culture in the second step as the starting point. In another embodiment, when the Wnt signal transduction pathway inhibitor is added at the time of the start of suspension culture in the second step, the period of action of the Wnt signal transduction pathway inhibitor is preferably 3 days to 15 days (e.g., 5 days, 6 days, 7 days), more preferably 6 days to 10 days (e.g., 6 days), with the time of the start of suspension culture in the second step as the starting point.

2-3. Starting Material Production Method 3

As one preferable embodiment of production of retinal tissue in an early developmental stage, a method containing the following steps can also be mentioned:

(1) a first step of culturing pluripotent stem cells in the absence of feeder cells and in a medium containing a factor for maintaining undifferentiated state,
(2) a second step of culturing the pluripotent stem cells obtained in the first step in suspension in the presence of a SHH signal transduction pathway agonist to form a cell aggregate, and
(3) a third step of culturing the aggregate obtained in the second step in suspension in the presence of a BMP signal transduction pathway agonist to obtain an aggregate containing a retinal progenitor cell or neural retinal progenitor.

[First Step]

The first step can be performed according to the method described in WO 2016/063986. That is, in the first step, human pluripotent stem cells, preferably human induced pluripotent stem cells (iPS cells) or human embryonic stem cells (ES cell) are cultured in the absence of feeder cells and in a medium containing a factor for maintaining undifferentiated state. The absence of feeder cells (feeder-free) in the first step means a condition substantially free of feeder cells (e.g., the ratio of the number of feeder cells relative to the total number of cells is not more than 3%). Preferably, the first step is performed under a condition free of feeder cells.

The medium to be used in the first step is not particularly limited as long as it is a medium enabling culturing of pluripotent stem cells to maintain undifferentiated state under feeder-free conditions (feeder-free medium). Preferably, to enable culturing to maintain undifferentiated state, it contains a factor for maintaining undifferentiated state. For example, it is a medium containing a factor for maintaining undifferentiated state, and free of a TGFβ family signal transduction pathway inhibitor and an SHH signal transduction pathway agonist.

As the undifferentiated maintenance factor and feeder-free medium, those described in the aforementioned starting material production method 2 can be mentioned.

While the period for the culturing of pluripotent stem cells in the first step is not particularly limited as long as the effect of improving the quality of the aggregate formed in the second step can be achieved, it is generally 0.5-144 hr, preferably 2-96 hr, more preferably 6-48 hr, further preferably 12-48 hr, further more preferably 18-28 hr (e.g., 24 hr). That is, the first step is started 0.5-144 hr (preferably, 18-28 hr) before the start of the second step, and the second step is continuously performed on completion of the first step.

In the first step, the medium may be exchanged as appropriate, and one embodiment specifically includes a method including medium exchange every 1-2 days. Here, for example, the medium may be exchanged with a medium free of the cell protecting agent or an agent suppressing cell death such as ROCK inhibitor and the like.

The culture conditions such as culture temperature, $CO_2$ concentration and so on in the first step can be appropriately determined. The culture temperature is, for example, about 30° C. to about 40° C., preferably about 37° C. The $CO_2$ concentration is, for example, about 1% to about 10%, preferably about 5%.

In one preferable embodiment, human pluripotent stem cells (e.g., human iPS cells) are cultured in an adhered state in the absence of feeder cells and in a serum-free medium containing bFGF. The adhesion culture is preferably performed in a cell container with surface coated with laminin 511, E8 fragment of laminin 511 or vitronectin. The adhesion culture is preferably performed using Essential 8, TeSR medium, mTeSR medium, mTeSR-E8 medium, or StemFit medium, more preferably Essential 8 or StemFit medium, as a feeder-free medium.

[Second Step]

The second step in which the pluripotent stem cells obtained in the first step are cultured in suspension in the presence of a SHH signal transduction pathway agonist to form a cell aggregate of pluripotent stem cells may be performed according to the method described in the second step of the above-mentioned starting material production method 2.

[Third Step]

The third step can be performed according to the second step of the aforementioned starting material production method 1, or the third step of the aforementioned starting material production method 2.

2-4. Starting Material Production Method 4

As one preferable embodiment of production of a retinal tissue in an early developmental stage, a method including the following steps can also be mentioned:
(1) a first step of forming an aggregate of pluripotent stem cells by culturing pluripotent stem cells in suspension in a serum-free medium containing a Wnt signal transduction pathway inhibitor, and
(2) a second step of obtaining an aggregate containing a retinal progenitor cell or a neural retinal progenitor by culturing in suspension the aggregate formed in the first step in a serum-free medium containing a basement membrane preparation.

The starting material production method 4 can be performed according to the description of WO 2013/077425 (& US2014/341864).

[First Step]

As the Wnt signal transduction pathway inhibitor, those mentioned above can be mentioned.

The concentration of the Wnt signal transduction pathway inhibitor used here may be any as long as it is a concentration at which an aggregate of pluripotent stem cells can be formed. For example, in the case of general Wnt signal transduction pathway inhibitors such as IWR1e and the like, the concentration is 0.1 μM-100 μM, preferably 1 μM-10 μM, more preferably about 3 μM.

A Wnt signal transduction pathway inhibitor may be added to a serum-free medium before the start of the suspension culture, or may be added to a serum-free medium within several days (e.g., within 5 days) after the start of the suspension culture. Preferably, a Wnt signal transduction pathway inhibitor is added to a serum-free medium within 5 days, more preferably 3 days, after the start of the suspension culture, most preferably simultaneously with the start of the suspension culture. The suspension culture is performed until 18 days, more preferably 12 days, after the start of the suspension culture with addition of a Wnt signal transduction pathway inhibitor.

Culture conditions such as culture temperature, $CO_2$ concentration and the like can be appropriately set. The culture temperature is not particularly limited and it is, for example, about 30° C.-about 40° C., preferably about 37° C. The $CO_2$ concentration is, for example, about 1%-about 10%, preferably about 5%.

The concentration of the pluripotent stem cells can be appropriately determined by those of ordinary skill in the art so that aggregates of pluripotent stem cells can be more uniformly and efficiently formed. The concentration of the pluripotent stem cells during formation of the aggregate is not particularly limited as long as it is a concentration at which a uniform aggregate of stem cells can be formed. For example, when human ES cells are cultured in suspension using a 96-well plate, a liquid prepared to achieve about $1\times10^3$ to about $5\times10^4$ cells, preferably about $3\times10^3$ to about $3\times10^4$ cells, more preferably about $5\times10^3$ to about $2\times10^4$ cells, most preferably about $9\times10^3$, per well is added, and the plate is stood to form aggregates.

The period for suspension culture necessary for forming an aggregate can be determined as appropriate according to the pluripotent stem cell to be used as long as the cells can be rapidly aggregated. To form uniformed cell aggregates, it is desirably as short as possible. For example, in the case of a human ES cell or human iPS cell, it is desirable to form an aggregate preferably within 24 hr, more preferably within 12 hr. The period for cell aggregate formation can be appropriately adjusted by those of ordinary skill in the art by controlling the tools for aggregating the cells, centrifugation conditions and so on.

Formation of aggregates of pluripotent stem cells can be determined by those of ordinary skill in the art based on the size of the aggregate mass and the number of cells therein, macroscopic morphology, microscopic morphology by tissue staining analysis and uniformity thereof, expression of differentiation and undifferentiation markers and uniformity thereof, control of expression of differentiation marker and synchrony thereof, reproducibility of differentiation efficiency between aggregates, and so on.

[Second Step]

The second step to obtain an aggregate containing a retinal progenitor cell or a neural retinal progenitor cell by culturing the aggregate formed in the first step in suspension in a serum-free medium containing a basement membrane preparation is explained.

The "basement membrane preparation" refers to one containing basement membrane-constituting components having a function to control cell morphology, differentiation, growth, motility, expression of function and so on which are similar to those of epithelial cell, when intended cells capable of forming a basement membrane are plated thereon and cultured. Here, the "basement membrane constituting components" refers to extracellular matrix molecules in the form of a thin membrane present between epithelial cell layer and interstitial cell layer and so on in animal tissues. A basement membrane preparation can be produced by, for example, removing cells capable of forming a basement membrane, which adhere onto a support via a basement membrane, with a solution capable of dissolving the lipid of the cells, an alkali solution and so on. Examples of a preferable basement membrane preparation include products commercially available as basement membrane component (e.g., Matrigel™ (hereinafter sometimes referred to as Matrigel)), and extracellular matrix molecules known as basement membrane components (e.g., laminin, type IV collagen, heparan sulfate proteoglycan, entactin and so on).

Matrigel is a basement membrane preparation derived from Engelbreth Holm Swarn (EHS) mouse sarcoma. The main component of Matrigel is type IV collagen, laminin, heparan sulfate proteoglycan, and entactin. In addition to these, TGF-β, fibroblast growth factor (FGF), tissue plasminogen activator, and a growth factor naturally produced by EHS tumor are contained. The "growth factor reduced product" of Matrigel has a lower growth factor concentration than common Matrigel, and the standard concentration thereof is <0.5 ng/ml for EGF, <0.2 ng/ml for NGF, <5 pg/ml for PDGF, 5 ng/ml for IGF1, and 1.7 ng/ml for TGF-β. In starting material production method 4, "growth factor reduced product" is preferably used.

The concentration of the basement membrane preparation added to the serum-free medium in the suspension culture in the second step is not particularly limited as long as the epithelial structure of neural tissue (e.g., retinal tissue) is stably maintained. For example, when Martigel is used, it is preferably a volume of 1/20 to 1/200, more preferably about 1/100, of the culture medium. The basement membrane preparation may already be added to the medium at the start of culturing an aggregate of pluripotent stem cells. Preferably, it is added to the serum-free medium within 5 days, more preferably within 2 days, after the start of suspension culture.

The serum-free medium used in the second step may be the serum-free medium used in the first step as it is or may be that exchanged with a new serum-free medium.

When the serum-free medium used in the first step is directly used in this step, the "basement membrane preparation" may be added to the medium.

The serum-free medium used for the suspension culture in the first step and the second step is not particularly limited as long as it is as mentioned above. However, to avoid complicated preparation, for example, a serum-free medium (GMEM or DMEM, 0.1 mM 2-mercaptoethanol, 0.1 mM non-essential amino acid Mix, 1 mM sodium pyruvate) supplemented with an appropriate amount of commercially available KSR is preferably used as such serum-free medium. The dose of KSR in the serum-free medium is not particularly limited and, for example, it is generally 1-20%, preferably 2-20%, in the case of a human ES cell.

The culture conditions such as culture temperature, $CO_2$ concentration and so on in the third step can be appropriately determined. While the culture temperature is not particularly limited, it is, for example, about 30° C. to about 40° C., preferably about 37° C. The $CO_2$ concentration is, for example, about 1% to about 10%, preferably about 5%.

The aggregate obtained in the second step can be used as a retinal tissue in an early developmental stage, and the ratio of a retinal progenitor cell or neural retinal progenitor cell contained therein is low. Therefore, after suspension culture in a serum-free medium containing a basement membrane preparation, the following third step is performed, and the obtained aggregate can also be used as a retinal tissue in an early developmental stage:

(3) the third step of culturing the aggregate cultured in the second step in suspension in a serum-containing medium.

The serum-containing medium used in the third step may be the serum-free medium used in the second step for culture to which a serum is directly added or may be exchanged with a new serum-free medium.

The serum added to the medium in the third step third step may be, for example, mammalian serum such as bovine serum, calf serum, fetal bovine serum, equine serum, foal serum, fetal equine serum, rabbit serum, baby rabbit serum, fetal rabbit serum, human serum and the like, and the like.

The serum is added after 7 days, more preferably after 9 days, most preferably after 12 days, from the start of suspension culture. The serum concentration is 1-30%, preferably 3-20%, more preferably about 10%.

The serum-containing medium used in the third step is not particularly limited as long as it is as described above. The aforementioned serum-free medium (GMEM or DMEM, 0.1 mM 2-mercaptoethanol, 0.1 mM non-essential amino acid Mix, 1 mM sodium pyruvate) supplemented with serum is preferably used.

In addition, a serum-free medium supplemented with an appropriate amount of a commercially available serum replacement such as KSR and the like may also be used instead of such serum-containing medium.

In the third step, the production efficiency of the retinal tissue in an early developmental stage can be increased by adding an SHH signal transduction pathway agonist in addition to the serum.

The SHH signal transduction pathway agonist is not particularly limited as long as it can enhance signal transduction mediated by SHH, and includes those described above.

The concentration of the SHH signal transduction pathway agonist used in this step is, for example, 0.1 nM-10 μM, preferably 10 nM-1 μM, more preferably about 100 nM, in the case of general SHH signal transduction pathway agonists such as SAG and the like.

The thus-obtained aggregate can also be used as a retinal tissue in an early developmental stage.

In one preferable embodiment of production of a retinal tissue in an early developmental stage, after performing the aforementioned third step, the following fourth step is performed, and the obtained optic cup-like structure can also be used as a retinal tissue in an early developmental stage:
(4) the fourth step of culturing the aggregate cultured in the third step in suspension in a serum-free medium or serum-containing medium containing serum and an SHH signal transduction pathway agonist and a Wnt signal transduction pathway agonist.

The SHH signal transduction pathway agonist is not particularly limited as long as it can enhance signal transduction mediated by SHH, and includes those described above.

The concentration of the SHH signal transduction pathway agonist used here is, for example, 0.1 nM-10 μM, preferably 10 nM-1 μM, more preferably about 100 nM, in the case of general SHH signal transduction pathway agonists such as SAG and the like.

The Wnt signal transduction pathway agonist is not particularly limited as long as it can enhance signal transduction mediated by Wnt and includes those described above.

The concentration of the Wnt signal transduction pathway agonist used here is, for example, 0.1 μM-100 μM, preferably 1 μM-30 μM, more preferably about 3 μM, in the case of general Wnt signal transduction pathway agonists such as CHIR99021 and the like.

The SHH signal transduction pathway agonist and the Wnt signal transduction pathway agonist are added after 12 days and within 25 days, preferably after 15 days and within 18 days, after the start of suspension culture. At this time, it is preferable to use a medium that does not contain a Wnt signal transduction pathway inhibitor added in the aggregate formation step.

After 18 days from the start of suspension culture, an optic cup-like structure is formed in a protuberance state from the inside of the aggregate. The optic cup-like structure produced by the above-mentioned fourth step can also be used as a retinal tissue in an early developmental stage which is used as a starting material in the above-mentioned method 2 and the above-mentioned method 3.

The aggregate obtained in the above-mentioned fourth step is subjected to suspension culture in a serum-free medium or serum-containing medium not containing an SHH signal transduction pathway agonist or a Wnt signal transduction pathway agonist for 1 to 20 days, and can also be used as a retinal tissue in an early developmental stage which is used as a starting material in the methods of the above-mentioned 2 and the above-mentioned 3. Neural tissues other than the retinal tissue may be simultaneously formed by the starting material production method. These may express a Wnt signal transduction pathway agonist and the like which are dorsalization signal transduction substances. For this reason, preferably, to eliminate the influence of the Wnt signal transduction pathway agonist that is an excessive dorsalization signal transduction substance and the like, the optic cup-like structure present on the surface of the aggregate can also be physically cut out from the aggregate by using tweezers, scissors, injection needle, razor, one analogous thereto and the like.

2-5. Starting Material Production Method 5

The retinal tissue in an early developmental stage may contain a ciliary marginal zone structure, and a retinal tissue in an early developmental stage containing a ciliary marginal zone structure can be produced by the method described in WO 2015/087614 (& US2016/376554).

To be specific, a cell aggregate containing a retinal tissue in which Chx10 positive cells are present in a proportion of 20% or more and 100% or less of the retinal tissue, and obtained by a step of culturing a cell aggregate in a serum-free medium or serum-containing medium each containing a Wnt signal pathway agonist and a FGF signal pathway inhibitor for only a period before the emergence of a RPE65 gene-expressing cell, or an aggregate containing a ciliary marginal zone-like structure which is obtained by a step of further culturing the obtained "cell aggregate in which a RPE65 gene-expressing cell has not emerged" in a serum-free medium or a serum-containing medium not containing a Wnt signal transduction pathway agonist can also be used as a retinal tissue in an early developmental stage which is used as a starting material in the method of the present invention.

Specifically, for example, an aggregate containing a ciliary marginal zone structure, which is prepared by the following method, is also included in the retinal tissue in an early developmental stage:
(1) a method for producing an aggregate containing a ciliary marginal zone-like structure, which includes a step of culturing a cell aggregate containing a retinal tissue in which Chx10 positive cells are present in a proportion of 20% or more and 100% or less of the retinal tissue in a serum-free medium or serum-containing medium each containing a Wnt signal transduction pathway agonist and/or an FGF signal transduction pathway inhibitor for only a period before the emergence of a RPE65 gene-expressing cell, after which culturing the obtained "cell aggregate in which a RPE65 gene-expressing cell has not emerged" in a serum-free medium or serum-containing medium each not containing a Wnt signal transduction pathway agonist.

A "cell aggregate containing a retinal tissue in which Chx10 positive cells are present in a proportion of 20% or more and 100% or less of the retinal tissue" can be obtained by the method described in the aforementioned starting material production methods 1-4. That is, the cell aggregate is an aggregate containing a retinal tissue in an early developmental stage. For example, a cell aggregate obtained by suspension culture in the presence of a BMP signal transduction pathway agonist such as BMP4 and the like for 1 day-60 days, preferably 3 days-40 days, further preferably 6 days-20 days, in the second step of the starting material production method 1 or the third step of the starting material production method 2 or 3 can be used as the "cell aggregate containing a retinal tissue in which Chx10 positive cells are present in a proportion of 20% or more and 100% or less of the retinal tissue" of this step.

The above-mentioned "step of culturing a cell aggregate containing a retinal tissue in which Chx10 positive cells are present in a proportion of 20% or more and 100% or less of the retinal tissue in a serum-free medium or serum-containing medium each containing a Wnt signal transduction pathway agonist and/or an FGF signal transduction pathway inhibitor for only a period before the emergence of a RPE65 gene-expressing cell" is preferably started before not less than 50%, preferably not less than 80%, more preferably not less than 90%, further more preferably not less than 99%, of the cells contained in the retinal tissue can express RPE65 gene by continuously culturing in a serum-free medium or a serum-containing medium containing a Wnt signal transduction pathway agonist and a FGF signal transduction pathway inhibitor (e.g., for not less than 30 days), that is, before the above-mentioned proportion of the cells contained in the retinal tissue can differentiate into retinal pigment epithelium. Specifically, it is started by 40 days, preferably 30 days, more preferably 20 days, after the start of the suspension culture.

The thus-obtained cell aggregate can be used as the "cell aggregate containing a retinal tissue in which Chx10 positive cells are present in a proportion of 20% or more and 100% or less of the aforementioned retinal tissue" in this step.

First, "a cell aggregate containing a retinal tissue in which Chx10 positive cells are present in a proportion of 20% or more and 100% or less of the retinal tissue" is cultured in a serum-free medium or serum-containing medium each containing a Wnt signal pathway agonist and/or a FGF signal pathway inhibitor for only a period before the emergence of a RPE65 gene-expressing cell. As a preferable culture here, suspension culture can be mentioned.

As a serum-free medium, a serum-free medium which is a basal medium supplemented with N2 or KSR can be mentioned. More specifically, a serum-free medium which is a DMEM/F-12 medium supplemented with N2 supplement (N2, Invitrogen) can be mentioned. As the serum-containing medium, a serum-containing medium which is a basal medium supplemented with fetal bovine serum can be mentioned.

The culture conditions such as culture temperature, $CO_2$ concentration can be appropriately set. The culture temperature is, for example, in the range of about 30° C. to about 40° C., preferably, for example, about 37° C. The $CO_2$ concentration is, for example, in the range of about 1% to about 10%, preferably, for example, about 5%.

The Wnt signal transduction pathway agonist to be contained in a serum-free medium or serum-containing medium when the above-mentioned cell aggregate is cultured in the medium is not particularly limited as long as it can enhance signal transduction mediated by Wnt, and those mentioned above can be recited.

The concentration of the Wnt signal transduction pathway agonist to be contained in a serum-free medium or serum-containing medium in the case of a common Wnt signal transduction pathway agonist such as CHIR99021 is, for example, in the range of about 0.1 µM to about 100 µM, preferably, for example, in the range of about 1 µM to about 30 µM, more preferably, for example, about 3 µM.

The FGF signal transduction pathway inhibitor to be contained in a serum-free medium or serum-containing medium when the above-mentioned "cell aggregate containing a retinal tissue" is cultured in the medium is not particularly limited as long as it can inhibit signal transduction mediated by FGF. Examples of the FGF signal transduction pathway inhibitor include FGF receptor, FGF receptor inhibitor (e.g., SU-5402, AZD4547, BGJ398), MAP kinase cascade inhibiting substance (e.g. MEK inhibitor, MAPK inhibitor, ERK inhibitor), PI3 kinase inhibitor, Akt inhibitor and so on.

The concentration of the FGF signal transduction pathway inhibitor contained in a serum-free medium or serum-containing medium in step (A) only needs to be a concentration at which differentiation of the cells forming an aggregate of pluripotent stem cells into retinal cells can be induced. For example, in the case of SU-5402, it is added to the medium at a concentration of about 0.1 µM to about 100 µM, preferably about 1 µM to about 30 µM, more preferably about 5 µM.

In the present specification, "culturing for only a period before the emergence of a RPE65 gene-expressing cell" means culturing only in the whole or a part of the period before the emergence of a RPE65 gene-expressing cell. That is, culturing only in the whole or a part of the period (any period) during which the aforementioned "cell aggregate containing a retinal tissue" in the culture system is constituted by cells that do not substantially express RPE65 gene suffices. By employing such culturing, a cell aggregate in which a RPE65 gene-expressing cell has not emerged can be obtained. The "cell aggregate in which a RPE65 gene-expressing cell has not emerged" includes a "cell aggregate in which a RPE65 gene-expressing cell has not emerged at all" and a "cell aggregate in which a RPE65 gene-expressing cell does not substantially emerge". As the "cell aggregate in which a RPE65 gene-expressing cell does not substantially emerge", a cell aggregate in which the proportion of RPE65 positive cells in the retinal tissue contained in the cell aggregate is not more than about 1% can be mentioned.

To determine such particular period, the aforementioned "cell aggregate containing a retinal tissue" is used as a sample, and the presence or absence of expression of RPE65 gene contained in the sample or the level thereof may be measured by a general genetic engineering method or a biochemical method. Specifically, for example, the presence or absence of expression of RPE65 gene or the level thereof can be examined by subjecting a cryosection of the aforementioned "cell aggregate containing a retinal tissue" to an immunostaining method using an antibody against RPE65 protein.

As a "period before the emergence of a RPE65 gene-expressing cell", for example, a period during which the ratio of Chx10 positive cells present in the above-mentioned retinal tissue decreases as compared to that at the time of start of the culturing of the aforementioned cell aggregate in a serum-free medium or serum-containing medium each containing a Wnt signal transduction pathway agonist and a FGF signal transduction pathway inhibitor, and falls within the range of 30% to 0% can be mentioned. As the "cell aggregate in which a RPE65 gene-expressing cell has not emerged", a cell aggregate in which Chx10 positive cells are present in the above-mentioned retinal tissue in a proportion of within 30% to 0% of the tissue can be mentioned.

While the number of days of the "period before the emergence of a RPE65 gene-expressing cell" varies depending on the kind of the Wnt signal transduction pathway agonist and the FGF signal transduction pathway inhibitor, the kind of the serum-free medium or serum-containing medium, other culture conditions and so on, it is, for example, within 14 days. More specifically, when a serum-free medium (e.g., serum-free medium which is a basal medium supplemented with N2) is used, the above-mentioned period is preferably, for example, within 10 days, more preferably, for example, 3 days to 6 days, further specifically 4 days to 5 days. When a serum-containing medium (e.g., serum-containing medium which is a basal medium supplemented with fetal bovine serum) is used, the aforementioned period is preferably, for example, within 12 days, more preferably, for example, 6 days to 9 days.

The thus-obtained aggregate can be used as a retinal tissue in an early developmental stage which is used as a starting material in the method of the present invention.

In addition, the "cell aggregate in which a RPE65 gene-expressing cell has not emerged" obtained by culturing as mentioned above may be further cultured in a serum-free medium or serum-containing medium without containing a Wnt signal transduction pathway agonist for 1 day-50 days, preferably 1 day-15 days, further preferably 1 day-7 days, and then used as a retinal tissue in an early developmental stage which is used as a starting material in the method of the present invention.

2-6. Starting Material Production Method 6

A retinal tissue in an early developmental stage and containing a ciliary marginal zone structure which can be used as a starting material in the method of the present invention can also be produced by the method described in WO 2013/183774 (&US2015/132787).

Specifically, an aggregate obtained by a step of culturing a cell aggregate containing a retinal tissue, in which Chx10 positive cells are present in a proportion of 20% or more and 100% or less of the retinal tissue, in a serum-free medium or serum-containing medium each containing a Wnt signal transduction pathway agonist for only a period before the emergence of a RPE65 gene-expressing cell, or further, an aggregate containing a ciliary marginal zone-like structure which is obtained by a step of culturing the obtained "cell aggregate in which a RPE65 gene-expressing cell has not emerged" in a serum-free medium or serum-containing medium each free of a Wnt signal transduction pathway agonist is also a retinal tissue in the early developmental stage.

As the "cell aggregate containing a retinal tissue in which Chx10 positive cells are present in a proportion of 20% or more and 100% or less of the retinal tissue" which can be used as the starting material here, and a "Wnt signal transduction pathway agonist", those used in the above-mentioned starting material production method 5 can be mentioned.

As preferable culture, suspension culture can be mentioned. As a preferable medium, a serum-free medium can be mentioned.

The culture conditions such as culture temperature, $CO_2$ concentration and the like can be appropriately set. The culture temperature is, for example, in the range of about 30° C. to about 40° C., preferably, for example, about 37° C. The $CO_2$ concentration is, for example, in the range of about 1% to about 10%, preferably, for example, about 5%.

The Wnt signal transduction pathway agonist to be contained in the medium is not particularly limited as long as it can enhance signal transduction mediated by Wnt, and those mentioned above can be recited.

The concentration of the Wnt signal transduction pathway agonist to be contained in a serum-free medium or serum-containing medium in the case of a common Wnt signal transduction pathway agonist such as CHIR99021 is, for example, in the range of about 0.1 μM to about 100 μM, preferably, for example, in the range of about 1 μM to about 30 μM, more preferably, for example, about 3 μM.

In the same manner as in the above-mentioned starting material production method 5 except that an FGF signal transduction pathway inhibitor may not be contained, the cell aggregate is "cultured for only a period before the emergence of a RPE65 gene-expressing cell".

As a preferable "period before the emergence of a RPE65 gene-expressing cell", for example, a period during which the ratio of Chx10 positive cells present in the above-mentioned retinal tissue is within the range of 50% to 1% can be mentioned. In this case, the "cell aggregate in which a RPE65 gene-expressing cell has not emerged" is a cell aggregate in which Chx10 positive cells are present in the above-mentioned retinal tissue in a proportion of within 50% to 1% of the tissue.

While the number of days of the "period before the emergence of a RPE65 gene-expressing cell" varies depending on the kind of the Wnt signal transduction pathway agonist, the kind of the serum-free medium or serum-containing medium, other culture conditions and so on, it is, for example, within 14 days. The above-mentioned period is preferably, for example, within 10 days, more preferably, for example, 3 days to 6 days. When a serum-containing medium (e.g., serum-containing medium which is a basal medium supplemented with fetal bovine serum) is used, the aforementioned period is preferably, for example, within 12 days, more preferably, for example, 6 days to 9 days.

The thus-obtained aggregate can be used as a retinal tissue in an early developmental stage which is used as a starting material in the method of the present invention. The "cell aggregate in which a RPE65 gene-expressing cell has not emerged" obtained by culturing as mentioned above" may be directly used as a retinal tissue in an early developmental stage. It may be further cultured in a serum-free medium or serum-containing medium without containing a Wnt signal transduction pathway agonist for 1 day-50 days, preferably 1 day-15 days, further preferably 1 day-7 days, and then used as an aggregate containing a retinal tissue in an early developmental stage which is a starting material in the method of the present invention.

2-7. Starting Material Production Method?

The retinal tissue in an early developmental stage may contain a ciliary marginal zone structure, and a retinal tissue in an early developmental stage containing a ciliary marginal zone structure can be produced by the method described in WO 2015/107738 (and U.S. application Ser. No. 15/112,187). Specifically, for example, a retinosphere prepared by a method containing the following step can also be used as a retinal tissue in an early developmental stage which is used as a starting material in the method of the present invention: (1) a step of obtaining a retinosphere by proliferation culturing in suspension the cells obtained from a cell aggregate containing a ciliary marginal zone-like structure induced to differentiate from a pluripotent stem cell.

The "cell aggregate containing a ciliary marginal zone-like structure induced to differentiate from a pluripotent stem cell" can be produced according to the above-mentioned starting material production method 5 or 6. The cells obtained therefrom are dispersed and cultured in suspension to give a retinosphere.

In the above-mentioned step, the cells obtained from the "cell aggregate containing a ciliary marginal zone-like structure induced to differentiate from a pluripotent stem cell" are cultured for proliferation in suspension to give a retinosphere.

Examples of the cells obtained from the "cell aggregate containing a ciliary marginal zone-like structure induced to differentiate from a pluripotent stem cell" include cells obtained by dispersing the above-mentioned "cell aggregate containing a ciliary marginal zone-like structure induced to differentiate from a pluripotent stem cell", cells obtained by dispersing the ciliary marginal zone-like structure separated from the aforementioned cell aggregate, and cells obtained by dispersing the cells sorted from the aforementioned cell aggregate. When such cells are cultured in suspension at a low density in the presence of a growth factor or the like, a spherical cell aggregate derived from a single cell or a small number of cells of about 2 to 10 cells, namely, retinosphere, is formed. For a method for producing the retinosphere, WO 2015/107738 (and U.S. patent application Ser. No. 15/112,187) can be referred to.

Specifically, the dispersed cells can be cultured in suspension in a serum-free medium or serum-containing medium supplemented with additive for nerve cell culture and a growth factor. As a medium, preferably, a serum-free medium or serum-containing medium containing one or more substances selected from the group consisting of an FGF signal transduction pathway agonist and an EGF signal transduction pathway agonist can be mentioned. Examples of the FGF signal transduction pathway agonist used here include FGF proteins such as FGF1, bFGF, FGF4, FGF7, FGF8, FGF9 and the like and heparine as an auxiliary agent of FGF signal and the like. Examples of the EGF signal transduction pathway agonist include EGF, TGF-alpha and the like.

The retinosphere produced as mentioned above can be used as a retinal tissue in an early developmental stage that is the starting material in the production method of the present invention since it contains a retinal progenitor cell or a neural retinal progenitor, like retinal tissues. Then, the retinosphere obtained as mentioned above may be further cultured in a serum-free medium or serum-containing medium without containing a Wnt signal transduction pathway agonist for 1 day-50 days, preferably 1 day-15 days, further preferably 1 day-7 days, and then the obtained cell aggregate may be used as a retinal tissue in an early developmental stage.

3. Continuous Epithelial Structure

In the present specification, the "continuous epithelial structure" in the retinal tissue means a structure in which the retinal tissue has an apical surface unique to the epithelial tissue and the apical surface is formed on the surface of the retinal tissue continuously and generally parallel to at least photoreceptor layer (external granular layer) or neuroblastic layer among the respective layers forming the neural retinal layer. That is, the continuous epithelial structure does not have a structure seen in a rosette-like structure in which the apical surface is divided. For example, in the case of a cell aggregate containing a retinal tissue prepared from pluripotent stem cells, the apical surface is formed on the surface of the aggregate, and not less than 10, preferably not less than 30, more preferably not less than 100, further preferably not less than 400 photoreceptor or photoreceptor progenitor cells are regularly and continuously arranged in the tangential direction with respect to the surface. The number of photoreceptor cells or photoreceptor progenitor cells arranged continuously correlates with the size of the neural retinal tissue contained in the cell aggregate. In the present specification, the tangential direction with respect to the epithelial tissue refers to a direction in which every single cell forming the apical surface in the epithelial tissue is arranged and it is a parallel direction or transverse direction relative to the epithelial tissue (or epithelial sheet).

In one embodiment, an apical surface is formed on the surface of the neural retinal tissue, and photoreceptor cells or photoreceptor progenitor cells are regularly and continuously arranged along the apical surface.

In the case of a retinal tissue in a stage where the emergence rate of photoreceptor cells or photoreceptor progenitor cells is low (e.g., retinal tissue in an early developmental stage), it is known to those of ordinary skill in the art that the layer containing proliferating neural retinal progenitor is called a "neuroblastic layer". In addition, the surface of a retinal tissue in such stage may sometimes contain, in addition to photoreceptor cells and photoreceptor progenitor cells, a neural retinal progenitor that has polarity and can form the apical surface, a cell that divides and proliferates from the neural retinal progenitor and/or a cell in a stage of differentiation from a neural retinal progenitor into a cell constituting the neural retina. By continuously culturing the retinal tissue in such a state under the conditions that maintain the "continuous epithelial structure", a retinal tissue in which photoreceptor cells or photoreceptor progenitor cells are regularly and continuously arranged along the apical surface formed on the surface of the neural retinal tissue is obtained.

In one embodiment, the area of the apical surface present on the surface of the retinal tissue is not less than 30%, preferably not less than 50%, more preferably not less than 80%, further more preferably not less than 95%, on average relative to the surface area of the retinal tissue. The area of the apical surface present on the surface of the retinal tissue can be measured as described below by staining an apical surface marker.

In the present specification, the "rosette-like structure" in the retinal tissue refers to a structure in which cells are arranged radially or spirally while surrounding a central lumen. In the retinal tissue in which the rosette-like structure is formed, the apical surface and photoreceptor cells or photoreceptor progenitor cells exist along the center (lumen), and the apical surface is divided for each rosette-like structure.

In the present specification, the "apical surface" refers to a 50-100 nm surface (surface layer) formed on the side opposite from the basement membrane side where the layer (basement membrane) produced by epithelial cell is present in an epithelial tissue. The surface is rich in mucopolysaccharide (positive for PAS staining) and contains a large amount of laminin and type IV collagen. In one embodiment, in a retinal tissue whose developmental stage has progressed to the extent that photoreceptor cells or photoreceptor progenitor cells are observed, an outer boundary membrane formed and it refers to a surface in contact with a photoreceptor layer (external granular layer) in which photoreceptor cells and photoreceptor progenitor cells are present. Such apical surface can be identified by an immunostaining method or the like well known to those skilled in the art and by using an antibody against an apical surface marker (e.g., atypical-PKC (hereinafter sometimes to be abbreviated as aPKC), E-cadherin, N-cadherin). In an early developmental stage, even when photoreceptor cell or photoreceptor progenitor cell has not emerged or even when photoreceptor cell or photoreceptor progenitor cell has not emerged to sufficiently cover the surface of retinal tissue, the epithelial tissue has polarity, and the apical surface expresses the above-mentioned apical surface marker.

Whether or not the retinal tissue has a continuous epithelial structure can be confirmed by the continuity of the apical surface of the retinal tissue (that is, an undivided form). The continuity of the apical surface is determined by, for example, immunostaining a marker on the apical surface (e.g., aPKC, E-cadherin, N-cadherin), a marker for photoreceptor cell or photoreceptor progenitor cell located on the apical surface side (e.g., Crx or recoverin) and analyzing the obtained images and the like for positional relationship between the apical surface, the photoreceptor layer, and each retinal layer. As for retinal layers other than the apical surface and photoreceptor layer (external granular layer), the continuity can be identified by DAPI staining including staining of the cell nucleus, PI staining, Hoechst staining, or immunostaining with a marker protein (Rx, Chx10, Ki67, Crx etc.) or the like localized in the cell nucleus.

Whether or not a rosette-like structure was generated can be determined by fixing cell aggregates with 4% paraformaldehyde and so on, preparing frozen sections, and observing dysplasia (e.g., fragmented apical surface or invasion of apical surface into cell aggregate) of rosette-like structure by immunostaining or the like that is generally performed using antibodies against apical surface markers aPKC, E-cadherin, N-cadherin, and DAPI that specifically stains nucleus and the like.

4. Medium for Maintaining Continuous Epithelial Tissue

The present invention provides a medium for maintaining a continuous epithelial tissue.

The medium for maintaining a continuous epithelial tissue contains at least one of a methyl group donor or a substrate of the methyl group donor at a concentration at which cell differentiation of a retinal progenitor cell or a neural retinal progenitor can be suppressed, and a neurite extension inhibitor at a concentration at which neurite extension can be suppressed. Preferably, the medium for maintaining a continuous epithelial tissue contains a methyl group donor or a substrate of the methyl group donor at a concentration at which cell differentiation of a retinal progenitor cell or a neural retinal progenitor is suppressed, and a neurite extension inhibitor at a concentration at which neurite extension is suppressed.

A methyl group is transferred in vivo from a methyl donor to a DNA or a protein including histone by methyltransferase. In the present specification, a methyl group donor is a substance (methyl donor) that can donate a methyl group to be transferred to a DNA or a protein including histone. In the present specification, the substrate of the methyl group donor is a substrate necessary for biosynthesis of the aforementioned methyl donor. Specifically, the methyl group donor is, for example, S-adenosylmethionine (to be also referred to as SAM), and the substrate of the methyl group donor is, for example, methionine, S-methyl 5'-thioadenosine (sometimes to be abbreviated as MTA), homocysteine (sometimes to be abbreviated as Hcy) or the like. In the present invention, methionine is preferably used.

To determine whether cell differentiation of retinal progenitor cell or neural retinal progenitor is suppressed, for example, an evaluation target substance is reacted with a retinal tissue in an early developmental stage and containing retinal progenitor cell or neural retinal progenitor and, after culturing for a period of time, the proportion of retinal progenitor cells or neural retinal progenitor cells in the retinal tissue may be identified, or the proportion of differentiated cells in the retinal tissue or differentiated cells that have ceased growing may be identified. Specifically, for example, a decrease rate of retinal progenitor cells or neural retinal progenitor after a certain period of time (e.g., 5 days-50 days) from the emergence of ganglion cells; an increase rate of differentiated cells, cells that have stopped proliferating, or cells that express bHLH transcription factor necessary for terminal differentiation, each in the retinal tissue; or an expression level of bHLH transcription factor may be identified by immunostaining, quantitative PCR and the like. As a retinal progenitor cell or neural retinal progenitor marker, for example, a combination of RX and PAX6, a combination of RX, PAX6 and CHX10 or the like can be used. In addition, as a marker of differentiated cells contained in the retinal tissue, a marker of differentiated progenitor cells, or a bHLH transcription factor marker necessary for terminal differentiation, for example, BRN3, CRX, HuNu, Cath5, NeuroM, NGN1, NGN2, ISLET-1 (also referred to as ISL1), OLIG2 and the like can be used. As a marker for cells that have ceased cell proliferation due to cell differentiation, for example, p53, p27, p21 and the like can be used.

When methionine is used as a substrate of a methyl group donor, the concentration of methionine in the medium for maintaining a continuous epithelial tissue is generally more than 17.24 mg/L (preferably not less than 23.62 mg/L, not less than 25 mg/L, not less than 25.75 mg/L, not less than 26 mg/L, not less than 26.81 mg/L, not less than 27 mg/L, not less than 30 mg/L). The upper limit of the concentration of methionine in a medium for maintaining a continuous epithelial tissue is not particularly limited as long as continuous maintenance of epithelial tissue is achieved. It is generally not more than 100 mg/L (preferably not more than 75 mg/L). The range of methionine concentration in a medium for maintaining a continuous epithelial tissue is, for example, more than 17.24 mg/L and not more than 100 mg/L, preferably not less than 23.62 mg/L and not more than 75 mg/L, not less than 25 mg/L and not more than 75 mg/L, not less than 25.75 mg/L and not more than 75 mg/L, not less than 26 mg/L and not more than 75 mg/L, not less than 26.81 mg/L and not more than 75 mg/L, not less than 27 mg/L and not more than 75 mg/L, not less than 30 mg/L and not more than 75 mg/L. When a methyl group donor other than methionine or a substrate thereof is used, it is preferably used at a concentration affording an equivalent level of suppression of cell differentiation of retinal progenitor cell or neural retinal progenitor to that by the above-mentioned concentration of methionine.

In the present specification, the neurite extension inhibitor is a substance that suppresses neurite extension of ganglion cells. Specifically, neurite extension suppresses hormones such as glucocorticoid and the like, neurite extension suppressive proteins such as Semaphorin, Nogo, Mag, OMgp protein, chondroitin sulfate proteoglycan and the like, and the like can be mentioned. Examples of the glucocorticoid include corticosterone, cortisol, cortisone and the like. The neurite extension inhibitor is preferably glucocorticoid, more preferably corticosterone.

The extension suppressive action can be evaluated by, for example, adhesion culture of retinal tissues or ganglion cells contained in the retinal tissue in the presence of an evaluation target substance, followed by measurement of the length of the extended neurite by using image analysis software (e.g., Image J) and the like.

When corticosterone is used as a neurite extension inhibitor, the concentration of corticosterone in a medium for maintaining a continuous epithelial tissue is a concentration that suppresses neurite extension of ganglion cell and the like contained in the retinal tissue. It is generally not less than 0.1 nM (preferably, not less than 1 nM, not less than 5 nM, not less than 10 nM, not less than 50 nM, not less than 100 nM). The upper limit of the concentration of corticosterone in a medium for maintaining a continuous epithelial tissue is not particularly limited as long as continuous maintenance of epithelial tissue is achieved. It is generally not more than 10 µM (preferably not more than 5 µM, not more than 1 µM). The range of corticosterone concentration in a medium for maintaining a continuous epithelial tissue is, for example, 0.1 nM-10 µM, preferably, 1 nM-5 µM. When the above-mentioned neurite extension inhibitor other than corticosterone is used, it is preferably used at a concentration affording an equivalent level of neurite extension suppressive action to that by the above-mentioned concentration of corticosterone.

In one embodiment, a medium for maintaining a continuous epithelial tissue contains methionine and corticosterone at the above-mentioned concentrations. In one embodiment, a medium for maintaining a continuous epithelial tissue contains more than 17.24 mg/L (preferably not less than 23.62 mg/L, not less than 25 mg/L, not less than 25.75 mg/L, not less than 26 mg/L, not less than 26.81 mg/L, not less than 27 mg/L, not less than 30 mg/L) of methionine and not less than 0.1 nM (preferably not less than 1 nM, more preferably not less than 5 nM, further preferably not less than 10 nM, further preferably not less than 50 nM, further preferably not less than 100 nM) of corticosterone.

The concentration of each of acidic amino acid, antioxidant and retinal neuron protection substance in a medium for maintaining a continuous epithelial tissue is preferably lower.

In the present specification, specific examples of acidic amino acid include glutamic acid and aspartic acid and each encompasses L form and D form. In the present specification, glutamic acid in an L form is indicated as L-glutamic acid, aspartic acid in an L form is indicated as L-aspartic acid, glutamic acid in a D form is indicated as D-glutamic acid, and aspartic acid in a D form is indicated as D-aspartic acid. In the present specification, when the D form and L form are not distinguished, they are indicated as "glutamic acid" and "aspartic acid".

The concentration of L-glutamic acid in a medium for maintaining a continuous epithelial tissue is preferably less than 50 µM (more preferably not more than 25 µM, further preferably not more than 12.5 µM, further more preferably not more than 1 µM, particularly preferably not more than 0.1 µM). In one embodiment, the concentration of glutamic acid in a medium for maintaining a continuous epithelial tissue is preferably less than 50 µM (more preferably not more than 25 µM, further preferably not more than 12.5 µM, further more preferably not more than 1 µM, particularly preferably not more than 0.1 µM).

The concentration of L-aspartic acid in a medium for maintaining a continuous epithelial tissue is preferably less than 50 µM (more preferably not more than 25 µM, further preferably not more than 12.5 µM, further more preferably not more than 1 µM, particularly preferably not more than 0.1 µM). In one embodiment, the concentration of aspartic acid contained in a medium for maintaining a continuous epithelial tissue is preferably less than 50 µM (more preferably not more than 25 µM, further preferably not more than 12.5 µM, further preferably not more than 10 µM, further preferably not more than 1 µM, further preferably not more than 0.1 µM).

In one preferable embodiment, a medium for maintaining a continuous epithelial tissue contains at least one (preferably both) of more than 17.24 mg/L (preferably not less than 23.62 mg/L, not less than 25 mg/L, not less than 25.75 mg/L, not less than 26 mg/L, not less than 26.81 mg/L, not less than 27 mg/L, not less than 30 mg/L) of methionine and not less than 0.1 nM (preferably not less than 1 nM, more preferably not less than 5 nM, further preferably not less than 10 nM, further preferably not less than 50 nM, further preferably not less than 100 nM) of corticosterone, and the concentration of L-glutamic acid is less than 50 µM (more preferably not more than 25 µM, further preferably not more than 12.5 µM, further more preferably not more than 1 µM, particularly preferably not more than 0.1 µM).

In a more preferable embodiment, a medium for maintaining a continuous epithelial tissue contains at least one (preferably both) of more than 17.24 mg/L (preferably not less than 23.62 mg/L, not less than 25 mg/L, not less than 25.75 mg/L, not less than 26 mg/L, not less than 26.81 mg/L, not less than 27 mg/L, not less than 30 mg/L) of methionine and not less than 0.1 nM (preferably not less than 1 nM, not less than 5 nM, not less than 10 nM, not less than 50 nM, not less than 100 nM) of corticosterone, and the concentration of L-glutamic acid is less than 50 µM (more preferably not more than 25 µM, further preferably not more than 12.5 µM, further more preferably not more than 1 µM, particularly preferably not more than 0.1 µM) and the concentration of L-aspartic acid is preferably less than 50 µM (more preferably not more than 25 µM, further preferably not more than 12.5 µM, further more preferably not more than 1 µM, particularly preferably not more than 0.1 µM).

In the present specification, examples of the antioxidant include glutathione, catalase, Superoxide dismutase, alpha-tocopherol, cysteine and the like. In one embodiment, the concentration of at least one, preferably plural, more preferably all antioxidants selected from the group consisting of glutathione, catalase, Superoxide dismutase, alpha-tocopherol, and cysteine in a medium for maintaining a continuous epithelial tissue is within the following ranges:

glutathione: not more than 100 ng/mL (preferably not more than 10 ng/mL, more preferably not more than 1 ng/mL, further preferably not more than 0.1 ng/mL);

catalase: not more than 100 U/mL (preferably not more than 10 U/mL, more preferably not more than 1 U/mL, further preferably not more than 0.1 U/mL);

Superoxide dismutase: not more than 100 U/mL (preferably not more than 10 U/mL, more preferably not more than 1 U/mL, further preferably not more than 0.1 U/mL);

alpha-tocopherol: not more than 50 nM (preferably not more than 5 nM, more preferably not more than 0.5 nM, further preferably not more than 0.05 nM); and cysteine: not more than 0.26 mM (preferably not more than 0.22 mM, more preferably not more than 0.18 mM, further preferably not more than 0.1 mM).

In one embodiment, the concentration of at least one, preferably plural, more preferably all antioxidants selected from the group consisting of glutathione, catalase, Superoxide dismutase, and alpha-tocopherol in a medium for maintaining a continuous epithelial tissue is a concentration that does not have an antioxidative action that influences the continuous epithelial structure, and the concentration of cysteine is not more than 0.26 mM (preferably not more than 0.22 mM, more preferably not more than 0.18 mM, further preferably not more than 0.1 mM). When other antioxidant is contained, the concentration thereof is preferably not more than a concentration that affords an antioxidative action equivalent to that of the above-mentioned antioxidant at the above-mentioned concentration, or a concentration that does not have an antioxidative action. The antioxidative action can be evaluated by directly measuring a part of active oxygen belonging to free radical by, for example, electron Spin resonance apparatus (Electron Spin Resonance, to be also referred to as ESR) in the presence of a spin trap agent. The antioxidative action can also be evaluated by other various methods for measuring active oxygen (e.g., measuring the amount of lipoperoxide produced due to active oxygen, the amount of 8-hydroxydeoxyguanosine or 8-nitroguanosine utilizable as oxidation stress markers and the like. For the measurement of the amount of active oxygen and the like, commercially available measurement kits (COSMO BIO, DOJINDO LABORATORIES, Thermo Fisher Scientific etc.) may be used.

In the present specification, examples of the retinal neuron protection substance include progesterone and the like. In one embodiment, the concentration of progesterone in a medium for maintaining a continuous epithelial tissue is not more than 100 nM, preferably not more than 50 nM, more preferably 20 nM (or 6.3 µg/mL (20.033708 nM)), further preferably not more than 10 nM, further preferably not more than 3 nM. In one embodiment, the concentration of progesterone in a medium for maintaining a continuous epithelial tissue is a concentration that does not show a ganglion cell protective action. When other retinal neuron protection substance is contained, the concentration thereof is preferably not more than a concentration that affords a retinal neuron protective action equivalent to that of progesterone at the above-mentioned concentration, or a concentration that does not show a retinal neuron protective action. The retinal neuron protective action can be confirmed by, for example, identifying the proportion of ganglion cell contained in a retinal tissue, or the proportion of cleaved caspase3 (known as an apoptosis marker) positive ganglion cell, and identifying increase and decrease thereof. When the evaluation target substance shows a ganglion cell protective action, the proportion of the ganglion cells contained in a retinal tissue reacted with the substance for a given period increases and conversely, the proportion of the cleaved caspase3 positive ganglion cells decreases compared to that without reaction with the substance. The proportion of the ganglion cells can be identified using immunohistostaining with antibody against the aforementioned ganglion cell markers (e.g., BRN3), DAPI staining, PI staining, Hoechst staining and the like.

In one preferable embodiment, a medium for maintaining a continuous epithelial tissue contains at least one (preferably both) of more than 17.24 mg/L (preferably not less than 23.62 mg/L, not less than 25 mg/L, not less than 25.75 mg/L, not less than 26 mg/L, not less than 26.81 mg/L, not less than 27 mg/L, not less than 30 mg/L) of methionine and not less than 0.1 nM (preferably not less than 1 nM, more preferably not less than 5 nM, further preferably not less than 10 nM, further preferably not less than 50 nM, further preferably not less than 100 nM) of corticosterone, the concentration of L-glutamic acid is less than 50 µM (more preferably not more than 25 µM, further preferably not more than 12.5 µM, further more preferably not more than 1 µM, particularly preferably not more than 0.1 µM), and further, the concentration of at least one, preferably plural, more preferably all compounds selected from the group consisting of L-aspartic acid, glutathione, catalase, Superoxide dismutase, alpha-tocopherol, cysteine and progesterone is within the following ranges:

L-aspartic acid: less than 50 µM (more preferably not more than 25 µM, further preferably not more than 12.5 µM, further more preferably not more than 1 µM, particularly preferably not more than 0.1 µM);
glutathione: not more than 100 ng/mL (preferably not more than 10 ng/mL, more preferably not more than 1 ng/mL, further preferably not more than 0.1 ng/mL);
catalase: not more than 100 U/mL (preferably not more than 10 U/mL, more preferably not more than 1 U/mL, further preferably not more than 0.1 U/mL);
Superoxide dismutase: not more than 100 U/mL (preferably not more than 10 U/mL, more preferably not more than 1 U/mL, further preferably not more than 0.1 U/mL);
alpha-tocopherol: not more than 50 nM (preferably not more than 5 nM, more preferably not more than 0.5 nM, further preferably not more than 0.05 nM);
cysteine: not more than 0.26 mM (preferably not more than 0.22 mM, more preferably not more than 0.18 mM, further preferably not more than 0.1 mM); and
progesterone: not more than 100 nM (preferably not more than 50 nM, more preferably not more than 20 nM (or 6.3 µg/mL (20.033708 nM)), further preferably not more than 10 nM, further preferably not more than 3 nM).

The concentration of each of hypoxanthine, thymidine and vitamin B12 in a medium for maintaining a continuous epithelial tissue is preferably lower.

In one embodiment, the concentration of hypoxanthine in a medium for maintaining a continuous epithelial tissue is, for example, less than 15 µM (preferably not more than 7.5 µM, more preferably not more than 3.75 µM, further preferably not more than 1 µM, further more preferably not more than 0.1 µM (e.g., 0 µM)).

In one embodiment, the concentration of thymidine in a medium for maintaining a continuous epithelial tissue is less than 1.5 µM (preferably not more than 0.75 µM, more preferably not more than 0.375 µM, further preferably not more than 0.1 µM, further more preferably not more than 0.01 µM (e.g., 0 µM)).

In one embodiment, the concentration of vitamin B12 in a medium for maintaining a continuous epithelial tissue is less than 0.5 µM (preferably not more than 0.253 µM, more preferably not more than 0.129 µM, further preferably not more than 0.005 µM).

In a preferable embodiment, the concentration of 2 or 3 compounds selected from the group consisting of hypoxanthine, thymidine and vitamin B12 in a medium for maintaining a continuous epithelial tissue is within the aforementioned ranges.

In one preferable embodiment, a medium for maintaining a continuous epithelial tissue contains at least one (preferably both) of more than 17.24 mg/L (preferably not less than 23.62 mg/L, not less than 25 mg/L, not less than 25.75 mg/L, not less than 26 mg/L, not less than 26.81 mg/L, not less than 27 mg/L, not less than 30 mg/L) of methionine and not less than 0.1 nM (preferably not less than 1 nM, more preferably not less than 5 nM, further preferably not less than 10 nM, further preferably not less than 50 nM, further preferably not less than 100 nM) of corticosterone, the concentration of L-glutamic acid is less than 50 µM (more preferably not more than 25 µM, further preferably not more than 12.5 µM, further more preferably not more than 1 µM, particularly preferably not more than 0.1 µM), and the concentration of at least one, preferably plural, more preferably all compounds selected from the group consisting of L-aspartic acid, glutathione, catalase, Superoxide dismutase, alpha-tocopherol, cysteine, progesterone, hypoxantine, thymidine and vitamin B12 is within the following ranges:

L-aspartic acid: less than 50 µM (more preferably not more than 25 µM, further preferably not more than 12.5 µM, further more preferably not more than 1 µM, particularly preferably not more than 0.1 µM);
glutathione: not more than 100 ng/mL (preferably not more than 10 ng/mL, more preferably not more than 1 ng/mL, further preferably not more than 0.1 ng/mL);

catalase: not more than 100 U/mL (preferably not more than 10 U/mL, more preferably not more than 1 U/mL, further preferably not more than 0.1 U/mL);

Superoxide dismutase: not more than 100 U/mL (preferably not more than 10 U/mL, more preferably not more than 1 U/mL, further preferably not more than 0.1 U/mL);

alpha-tocopherol: not more than 50 nM (preferably not more than 5 nM, more preferably not more than 0.5 nM, further preferably not more than 0.05 nM);

cysteine: not more than 0.26 mM (preferably not more than 0.22 mM, more preferably not more than 0.18 mM, further preferably not more than 0.1 mM);

progesterone: not more than 100 nM (preferably not more than 50 nM, more preferably not more than 20 nM (or 6.3 μg/mL (20.033708 nM)), further preferably not more than 10 nM, further preferably not more than 3 nM);

hypoxanthine: less than 15 μM (preferably not more than 7.5 μM, more preferably not more than 3.75 μM, further preferably not more than 1 μM, further more preferably not more than 0.1 μM (e.g., 0 μM));

thymidine: less than 1.5 μM (preferably not more than 0.75 μM, more preferably not more than 0.375 μM, further preferably not more than 0.1 μM, further more preferably not more than 0.01 μM (e.g., 0 μM)); and vitamin B12: less than 0.5 μM (preferably not more than 0.253 μM, more preferably not more than 0.129 μM, further preferably not more than 0.005 μM).

In one preferable embodiment, a medium for maintaining a continuous epithelial tissue has the following composition:

methionine: more than 17.24 mg/L (preferably not less than 23.62 mg/L, not less than 25 mg/L, not less than 25.75 mg/L, not less than 26 mg/L, not less than 26.81 mg/L, not less than 27 mg/L, not less than 30 mg/L);

corticosterone: not less than 0.1 nM (preferably not less than 1 nM, more preferably not less than 5 nM, further preferably not less than 10 nM, further preferably not less than 50 nM, further preferably not less than 100 nM);

L-glutamic acid: less than 50 μM (more preferably not more than 25 μM, further preferably not more than 12.5 μM, further more preferably not more than 1 μM, particularly preferably not more than 0.1 μM);

L-aspartic acid: less than 50 μM (more preferably not more than 25 μM, further preferably not more than 12.5 μM, further more preferably not more than 1 μM, particularly preferably not more than 0.1 μM);

hypoxanthine: less than 15 μM (preferably not more than 7.5 μM, more preferably not more than 3.75 μM, further preferably not more than 1 μM, further more preferably not more than 0.1 μM (e.g., 0 μM));

thymidine: less than 1.5 μM (preferably not more than 0.75 μM, more preferably not more than 0.375 μM, further preferably not more than 0.1 μM, further more preferably not more than 0.01 μM (e.g., 0 μM)); and vitamin B12: less than 0.5 μM (preferably not more than 0.253 μM, more preferably not more than 0.129 μM, further preferably not more than 0.005 μM).

In the embodiment, the concentration of at least one, preferably plural, more preferably all compounds selected from the group consisting of glutathione, catalase, Superoxide dismutase, alpha-tocopherol, L-cysteine and progesterone is within the following ranges:

glutathione: not more than 100 ng/mL (preferably not more than 10 ng/mL, more preferably not more than 1 ng/mL, further preferably not more than 0.1 ng/mL);

catalase: not more than 100 U/mL (preferably not more than 10 U/mL, more preferably not more than 1 U/mL, further preferably not more than 0.1 U/mL);

Superoxide dismutase: not more than 100 U/mL (preferably not more than 10 U/mL, more preferably not more than 1 U/mL, further preferably not more than 0.1 U/mL);

alpha-tocopherol: not more than 50 nM (preferably not more than 5 nM, more preferably not more than 0.5 nM, further preferably not more than 0.05 nM);

cysteine: not more than 0.26 mM (preferably not more than 0.22 mM, more preferably not more than 0.18 mM, further preferably not more than 0.1 mM); and progesterone: not more than 100 nM (preferably not more than 50 nM, more preferably 20 nM (6.3 μg/mL), further preferably not more than 10 nM, further preferably not more than 3 nM).

A medium for maintaining a continuous epithelial tissue can be prepared by appropriately blending a commercially available medium.

Examples of the basal medium that can be used for preparing a medium for maintaining a continuous epithelial tissue include a medium not containing at least one of the aforementioned acidic amino acid, antioxidant and retinal neuron protection substances such as progesterone and the like (e.g., acidic amino acid), preferably two or more (e.g., acidic amino acid and any other substance), more preferably not containing all, or within the aforementioned concentration ranges. In one embodiment of the basal medium, one, preferably two, more preferably three, of hypoxanthine, thymidine and vitamin B12 are within the aforementioned concentration ranges. In one embodiment of the basal medium, hypoxanthine and thymidine are not contained, and the concentration of vitamin B12 is within the aforementioned concentration range.

As a basal medium that can be used for the preparation of a medium for maintaining a continuous epithelial tissue, a medium in which the concentration of at least one of methyl donor (e.g., S-adenosylmethionine), methyl donor substrate (e.g., methionine, MTA, Hcy) and neurite extension inhibitor (e.g., corticosterone) is in the aforementioned concentration range is preferable. A medium for maintaining a continuous epithelial tissue can be prepared by appropriately supplementing necessary substances to the basal medium that fall within the above-mentioned concentration ranges.

The basal medium that can be used for the preparation of a medium for maintaining a continuous epithelial tissue may be appropriately selected from commercially available basal media according to the above-mentioned selection criteria and based on the ingredient table published by the manufacturer. Examples of the basal medium that can be used for the preparation of a medium for maintaining a continuous epithelial tissue include commercially available Neurobasal medium (including Neurobasal-A medium, phenol red-free Neurobasal medium and the like), Improved MEM Zinc Option medium, MEM, DMEM, Leibovitz's L-15, E-MEM, G-MEM and the like. In addition, it is also possible to order and purchase a medium with individual customized components to and from a medium manufacturer. Also, a medium customized according to the aforementioned description to be a basal medium usable for the preparation of a medium for maintaining a continuous epithelial tissue may be used.

A supplemental medium may be appropriately blended to supplement corticosterone. Specific examples of the supplemental medium include B27 supplement and the like. As one embodiment of the medium for maintaining a continuous epithelial tissue, specifically, a medium in which B27 supplement is blended with Neurobasal medium can be mentioned. The medium may contain L-glutamine, taurine, serum and the like as appropriate Neurobasal medium is a known basal medium developed for nerve cell culture (J. Neurosci. Res., vol. 35, p. 567-576, 1993). While Neurobasal medium has been partially modified from the report, it is available as a commercially available Neurobasal medium from a medium manufacturer (e.g., manufactured by Thermo Fisher Scientific, 21103049). The composition of Neurobasal medium (21103049) available from Thermo Fisher Scientific does not contain acidic amino acids (L-glutamic acid and L-aspartic acid), progesterone, hypoxanthine or thymidine, has high methionine concentration (30 mg/L), high cysteine concentration (0.26 mM), and low vitamin B12 concentration (0.005 μM) compared to DMEM/F12. The specific composition is as follows.

TABLE 1-1

| Components | Molecular Weight | Concentration (mg/L) | mM |
|---|---|---|---|
| Amino Acids | | | |
| Glycine | 75 | 30 | 0.4 |
| L-Alanine | 89 | 2 | 0.02247191 |
| L-Arginine hydrochloride | 211 | 84 | 0.39810428 |
| L-Asparagine-H2O | 150 | 0.83 | 0.005533333 |
| L-Cysteine | 121 | 31.5 | 0.2603306 |
| L-Histidine hydrochloride-H2O | 210 | 42 | 0.2 |
| L-Isoleucine | 131 | 105 | 0.8015267 |
| L-Leucine | 131 | 105 | 0.8015267 |
| L-Lysine hydrochloride | 183 | 146 | 0.7978142 |
| L-Methionine | 149 | 30 | 0.20134228 |
| L-Phenylalanine | 165 | 66 | 0.4 |
| L-Proline | 115 | 7.76 | 0.06747826 |
| L-Serine | 105 | 42 | 0.4 |
| L-Threonine | 119 | 95 | 0.79831934 |
| L-Tryptophan | 204 | 16 | 0.078431375 |
| L-Tyrosine | 181 | 72 | 0.39779004 |
| L-Valine | 117 | 94 | 0.8034188 |
| Vitamins | | | |
| Choline chloride | 140 | 4 | 0.028571429 |
| D-Calcium pantothenate | 477 | 4 | 0.008385744 |
| Folic Acid | 441 | 4 | 0.009070295 |
| Niacinamide | 122 | 4 | 0.032786883 |
| Pyridoxal hydrochloride | 204 | 4 | 0.019607844 |
| Riboflavin | 376 | 0.4 | 0.00106383 |
| Thiamine hydrochloride | 337 | 4 | 0.011869436 |
| Vitamin B12 | 1355 | 0.0068 | 0.00000502 |
| i-Inositol | 180 | 7.2 | 0.04 |

TABLE 1-2

| Inorganic Salts | | | |
|---|---|---|---|
| Calcium Chloride (CaCl2) (anhyd.) | 111 | 200 | 1.8018018 |
| Ferric Nitrate (Fe(NO3)3"9H2O) | 404 | 0.1 | 0.000248 |
| Magnesium Chloride (anhydrous) | 95 | 77.3 | 0.8136842 |
| Potassium Chloride (KCl) | 75 | 400 | 5.3333335 |
| Sodium Bicarbonate (NaHCO3) | 84 | 2200 | 26.190475 |
| Sodium Chloride (NaCl) | 58 | 3000 | 51.724136 |
| Sodium Phosphate monobasic (NaH2PO4—H2O) | 138 | 125 | 0.9057971 |
| Zinc sulfate (ZnSO4—7H2O) | 288 | 0.194 | 0.000674 |

TABLE 1-2-continued

| Other Components | | | |
|---|---|---|---|
| D-Glucose (Dextrose) | 180 | 4500 | 25 |
| HEPES | 238 | 2600 | 10.92437 |
| Phenol Red | 376.4 | 8.1 | 0.021519661 |
| Sodium Pyruvate | 110 | 25 | 0.22727273 |

B27 supplement is a known supplemental medium developed for nerve cell culture (J. Neurosci. Res., vol. 35, p. 567-576, 1993). B27 supplement is generally used by adding to a basal medium such as Neurobasal medium and the like at a volume ratio of about 2%. B27 supplement containing corticosterone and combined with Neurobasal medium can be used as the medium for maintaining a continuous epithelial tissue of the present invention. For example, B27 supplement containing corticosterone is added to a basal medium containing methionine (Neurobasal medium etc.) such that the aforementioned methionine concentration and corticosterone concentration would be achieved, whereby the medium for maintaining a continuous epithelial tissue of the present invention can be prepared.

B27 supplement (J. Neurosci. Res., vol. 35, p. 567-576, 1993) can be purchased from, for example, a medium manufacturer (e.g., Thermo Fisher Scientific, 12587010), and the composition is as follows.

TABLE 2

| Components | mM |
|---|---|
| Vitamins | |
| Biotin | n/a |
| DL Alpha Tocopherol Acetate | n/a |
| DL Alpha-Tocopherol | n/a |
| Proteins | |
| BSA, fatty acid free Fraction V | n/a |
| Catalase | n/a |
| Human Recombinant Insulin | n/a |
| Human Transferrin | n/a |
| Superoxide Dismutase | n/a |
| Other Components | |
| Corticosterone | n/a |
| D-Galactose | n/a |
| Ethanolamine HCl | n/a |
| Glutathione (reduced) | n/a |
| L-Carnitine HCl | n/a |
| Linoleic Acid | n/a |
| Linolenic Acid | n/a |
| Progesterone | n/a |
| Putrescine 2HCl | n/a |
| Sodium Selenite | n/a |
| T3 (triodo-I-thyronine) | n/a |

In another embodiment, the medium for maintaining a continuous epithelial tissue includes a medium (e.g., DMEM/F12 mixed medium (DMEM:F12=1:1)) containing Neurobasal medium supplemented with B27 supplement at a volume ratio of one or more (preferably two or more, more preferably three or more) based on the cell proliferation basal medium.

The cell proliferation basal medium is not particularly limited and a commercially available basal medium can be used alone or in an appropriate mixture. The cell proliferation basal medium may contain an appropriately additive (supplement), and a specific supplement is, for example, N2 supplement.

The concentration of L-methionine, L-glutamic acid, L-aspartic acid, L-cysteine, hypoxanthine, thymidine, and vitamin B12 in a medium obtained by mixing a medium obtained by adding B27 supplement (Thermo Fisher Scientific, 12587010) to the above-mentioned commercially available Neurobasal medium (Thermo Fisher Scientific, 21103049), and a medium obtained by mixing a medium obtained by adding B27 supplement to Neurobasal medium and a medium obtained by adding N2 supplement to DMEM/F12 mixed medium (DMEM:F12=1:1) at a ratio of 3:1, 2:1 or 1:1 is, for example, as shown below.

TABLE 3

| | Neuro-basal + B27 | ①Neuro-basal + B27 ②DMEM/F12 + N2 ①:② = 3:1 | ①Neuro-basal + B27 ②DMEM/F12 + N2 ①:② = 2:1 | ①Neuro-basal B27 ②DMEM/F12 + N2 ①:② = 1:1 |
|---|---|---|---|---|
| methionine | 30 mg/L | 26.81 mg/L | 25.75 mg/L | 23.62 mg/L |
| L-glutamic acid | 0 µM | 12.5 µM | 16.67 µM | 26 µM |
| L-aspartic acid | 0 µM | 12.5 µM | 16.67 µM | 25 µM |
| L-cysteine | 31.5 mg/L (0.26 mM) | 28.015 mg/L (0.22 mM) | 26.853 mg/L (0.207 mM) | 24.53 mg/L (0.135 mM) |
| hypoxanthine | 0 µM | 3.75 µM | 5 µM | 7.5 µM |
| thymidine | 0 µM | 0.375 µM | 0.5 µM | 0.75 µM |
| vitamin B12 | 6.8 µg/L (0.005 µM) | 175.1 µg/L (0.12875 µM) | 231.2 µg/L (0.17 µM) | 343.4 µg/L (0.275 µM) |

In one embodiment, a medium having a composition of L-methionine, L-glutamic acid, L-aspartic acid, L-cysteine, hypoxanthine, thymidine, and vitamin B12 at concentrations equivalent to those shown in Table 3 can be used as a medium for maintaining a continuous epithelial tissue. Here, the "equivalent concentration" independently means that it includes the range of ±20% (preferably ±10%, more preferably ±5%, further preferably ±2.5%, and further more preferably ±1%) for the concentration of each factor.

In one embodiment, a medium having a composition of L-methionine, L-glutamic acid, L-aspartic acid, hypoxanthine, thymidine, and vitamin B12 at concentrations equivalent to those shown in Table 3, wherein the concentration of at least one, preferably plural, more preferably all compounds selected from the group consisting of corticosterone, glutathione, catalase, Superoxide dismutase, alpha-tocopherol, L-cysteine and progesterone is within the following ranges can be used as a medium for maintaining a continuous epithelial tissue:

corticosterone: not less than 0.1 nM (preferably not less than 1 nM, more preferably not less than 5 nM, further preferably not less than 10 nM, further preferably not less than 50 nM, further preferably not less than 100 nM);

glutathione: not more than 100 ng/mL (preferably not more than 10 ng/mL, more preferably not more than 1 ng/mL, further preferably not more than 0.1 ng/mL);

catalase: not more than 100 U/mL (preferably not more than 10 U/mL, more preferably not more than 1 U/mL, further preferably not more than 0.1 U/mL);

Superoxide dismutase: not more than 100 U/mL (preferably not more than 10 U/mL, more preferably not more than 1 U/mL, further preferably not more than 0.1 U/mL);

alpha-tocopherol: not more than 50 nM (preferably not more than 5 nM, more preferably not more than 0.5 nM, further preferably not more than 0.05 nM);

cysteine: not more than 0.26 mM (preferably not more than 0.22 mM, more preferably not more than 0.18 mM, further preferably not more than 0.1 mM); and progesterone: not more than 100 nM (preferably not more than 50 nM, more preferably not more than 20 nM (or 6.3 µg/mL (20.033708 nM)), further preferably not more than 10 nM, further preferably not more than 3 nM).

The medium for maintaining a continuous epithelial tissue may contain L-glutamine, taurine, N2 and the like as appropriate. The concentration of taurine is generally 1-1000 µM, preferably 10 µM-500 µM. When N2 is contained, it is more preferable to add glucocorticoid such as corticosterone and the like at the aforementioned concentration without adding B27.

The medium for maintaining a continuous epithelial tissue may contain, as long as continuous epithelial tissues can be maintained, one or more additives appropriately selected from, though not limited to, adjusting agents such as buffering agent (e.g., HEPES), salt (e.g., inorganic salt such as sodium chloride, sodium hydrogen carbonate and the like) or antioxidant (e.g., 2-mercaptoethanol, antioxidant is not contained in one embodiment) and the like, nutritional supplements such as amino acid (e.g., non-essential amino acid, acidic amino acid is not contained in one embodiment), fatty acid, sugar, vitamin, lipid, pyruvic acid and the like, antibiotic (e.g., penicillin, streptomycin), extracellular matrix (e.g., Matrigel, laminin, laminin fragment, laminin511-E8 fragment), dye (e.g., phenol red) and the like, which are generally contained in a medium.

The medium for maintaining a continuous epithelial tissue may be either a serum-containing medium or a serum-free medium. It is preferably a serum-containing medium. The concentration of serum in the serum-containing medium is generally 0.1-20% (v/v), preferably 0.1-12% (v/v) (e.g., 10% (v/v)). In the present specification, the concentration change of the composition contained in the medium due to the addition of serum at a concentration of 0.1-20% (v/v) is not to be considered.

5. Method for Maintaining Continuous Epithelial Structure

The present invention provides a method for maintaining a continuous epithelial structure of a retinal tissue, which includes culturing the retinal tissue in the aforementioned medium for maintaining a continuous epithelial tissue.

As the medium for maintaining a continuous epithelial tissue, the aforementioned medium can be used. Examples of the medium for maintaining a continuous epithelial tissue include Neurobasal medium supplemented with B27 supplement. The medium may contain L-glutamine, taurine, serum and the like as appropriate.

The retinal tissue used in the method of the present invention is a retinal tissue having a continuous epithelial structure. Not only when the entire retinal tissue shows a continuous epithelial structure, but also when only a part of the region within the retinal tissue exhibits a continuous epithelial structure, the retinal tissue can be used in the method of the present invention. For example, even a retinal tissue having a rosette structure can be used in the method of the present invention as long as it includes a region having a continuous epithelial structure. This is because even if a rosette structure is formed in a part of the retinal tissue, the continuous epithelial structure is maintained by the method of the present invention, and a region including the continuous epithelial structure can be cut out with tweezers or the like and applied to pharmaceutical use. Preferably, a retinal tissue having a continuous epithelial structure and not having a rosette structure is used in the method of the present invention. Whether the retinal tissue has a continuous epithelial structure or a rosette structure can be confirmed by the aforementioned method.

The period of culturing the retinal tissue in a medium for maintaining a continuous epithelial tissue is not limited as long as the continuous epithelial structure of the retinal tissue is maintained, and the medium may be replaced with a medium other than the medium for maintaining a continuous epithelial tissue during the culture.

When a medium for maintaining a continuous epithelial tissue is used, the expression of RAX (or RX) and CRX, which play an important role in the differentiation of cells contained in a retinal tissue, decreases, and the emergence rate of photoreceptor cells or photoreceptor progenitor cells sometimes decreases. Therefore, to promote differentiation into a photoreceptor progenitor cell, a retinal tissue in an early developmental stage or a retinal tissue in a stage from early developmental stage until emergence rate of cone photoreceptor progenitor cell reaches maximum is preferably cultured for a given period in a cell proliferation basal medium, or a mixed medium of a cell proliferation basal medium and a medium for maintaining a continuous epithelial tissue, after which the medium is exchanged with a medium for maintaining a continuous epithelial tissue.

For example, by culturing a retinal tissue in an early developmental stage in a cell proliferation basal medium, or a mixed medium of a cell proliferation basal medium and a medium for maintaining a continuous epithelial tissue, a decrease in the expression of RAX and CRX can be suppressed while maintaining continuous epithelium and differentiation into a photoreceptor cell or a photoreceptor progenitor cell can be promoted. To suppress a decrease in the expression of RAX and CRX, a cell proliferation basal medium is more preferable.

In one embodiment, the cell proliferation basal medium contains a methyl group donor or a substrate of the methyl group donor, and the concentration thereof is lower compared to that in a medium for maintaining a continuous epithelial tissue. When methionine is used as the substrate for the methyl group donor, the concentration of methionine in the cell proliferation basal medium is, for example, not more than 17.24 mg/L. Since methionine is an essential amino acid, the cell proliferation basal medium contains methionine. The concentration of methionine in the cell proliferation basal medium is generally not less than 5 mg/L (e.g., not less than 10 mg/L).

A neurite extension inhibitor (e.g., glucocorticoids such as corticosterone and the like) may be contained in the cell proliferation basal medium. In one embodiment, the concentration of a neurite extension inhibitor in a cell proliferation basal medium is lower than the concentration for suppressing neurite extension. For example, the concentration of corticosterone in a cell proliferation basal medium is, for example, less than 1 nM.

The cell proliferation basal medium preferably contains an acidic amino acid. In one embodiment, the concentration of L-glutamic acid in a cell proliferation basal medium is not less than 50 µM. In one embodiment, the concentration of L-aspartic acid in a cell proliferation basal medium is not less than 50 µM.

The cell proliferation basal medium may or may not contain a retinal neuron protection substance (progesterone etc.). In one embodiment, the concentration of progesterone in a cell proliferation basal medium is not less than 20 nM.

The cell proliferation basal medium preferably contains one, two or three compounds selected from the group consisting of hypoxanthine, thymidine and vitamin B12.

In one embodiment, the concentration of hypoxanthine in a cell proliferation basal medium is, for example, not less than 15 µM.

In one embodiment, the concentration of thymidine in a cell proliferation basal medium is not less than 1.5 µM.

In one embodiment, the concentration of vitamin B12 in a cell proliferation basal medium is not less than 0.5 µM.

In a preferable embodiment, the concentration of one, two or three compounds selected from the group consisting of hypoxanthine, thymidine and vitamin B12 in a cell proliferation basal medium is within the aforementioned range.

The cell proliferation basal medium may or may not contain, as an antioxidative substance, antioxidative substance selected from the group consisting of glutathione, catalase, Superoxide dismutase, and alpha-tocopherol and cysteine. In one embodiment, the concentration of at least one, preferably plural, more preferably all antioxidative substances selected from the group consisting of glutathione, catalase, Superoxide dismutase, alpha-tocopherol, and cysteine in a cell proliferation basal medium is within the following ranges:
  glutathione: not more than 0.1 ng/mL (e.g., 0 ng/mL);
  catalase: not more than 0.1 U/mL (e.g., 0 U/mL);
  Superoxide dismutase: not more than 0.1 U/mL (e.g., 0 U/mL);
  alpha-tocopherol: not more than 0.05 nM (e.g., 0 nM); and
  cysteine: not more than 0.1 mM.

In one embodiment, the cell proliferation basal medium has the following composition:
  methionine: not more than 17.24 mg/L;
  corticosterone: less than 1 nM (e.g., 0 nM);
  L-glutamic acid: not less than 50 µM;
  L-aspartic acid: not less than 50 µM;
  hypoxanthine: not less than 15 µM;
  thymidine: not less than 1.5 µM; and
  vitamin B12: not less than 0.5 µM.

In the embodiment, the progesterone concentration may be not less than 20 nM.

In the embodiment, the concentration of at least one, preferably plural, more preferably all antioxidative substances selected from the group consisting of glutathione, catalase, Superoxide dismutase, alpha-tocopherol, and cysteine may be within the following ranges:
  glutathione: not more than 0.1 ng/mL (e.g., 0 ng/mL);
  catalase: not more than 0.1 U/mL (e.g., 0 U/mL);
  Superoxide dismutase: not more than 0.1 U/mL (e.g., 0 U/mL);
  alpha-tocopherol: not more than 0.05 nM (e.g., 0 nM); and
  cysteine: not more than 0.1 mM.

The cell proliferation basal medium is not particularly limited as long as it can induce differentiation into a cell constituting neural retina such as retinal progenitor cell, neural retinal progenitor, photoreceptor and the like, for example, it can maintain expression of RAX and CRX in the cell, and a basal medium commercially available as a medium for cell proliferation can be used as appropriate. Specifically, for example, a medium usable for culturing animal cell such as BME medium, BGJb medium, CMRL 1066 medium, Glasgow MEM (GMEM) medium, Improved MEM Zinc Option medium, IMDM medium, Medium 199 medium, MEM medium, Eagle MEM medium, aMEM medium, DMEM medium, F-12 medium, DMEM/F12 medium, IMDM/F12 medium, Ham's medium, RPMI1640 medium, Fischer's medium, Leibovitz's L-15 medium or a mixed medium of these and the like can be mentioned. In addition, a medium supplemented with N2 medium, which is a supplemental medium, may also be used. To maintain expression of RAX and CRX, a medium having a methionine content of not more than 17.24 mg/L can also be selected from the above-mentioned commercially available basal media. Specifically, BME medium, CMRL 1066 medium, Glasgow MEM (GMEM) medium, Improved MEM Zinc Option medium, Medium 199 medium, MEM medium, Eagle MEM medium, aMEM medium, F-12 medium, DMEM/F12 medium, Ham's medium, and RPMI 1640 medium can be mentioned. Also, to maintain expression of RAX, CRX and to maintain emergence rate of photoreceptor cell or photoreceptor progenitor cell, an acidic amino acid may also be added.

As a preferable embodiment of the cell proliferation basal medium, a mixture of DMEM medium, F12 medium and N2 medium can be mentioned. For example, a medium obtained by adding N2 supplement to a commercially available DMEM/F12 mixed medium (DMEM:F12=1:1, manufactured by Thermo Fisher Scientific, 10565042) and the like can be used to eliminate the labor of mixing.

The DMEM/F12 mixed medium is a well-known basal medium, and commercially available as mentioned above.

The N2 supplement is a known supplemental medium containing insulin, transferrin, progesterone, putrescine, sodium selenite and the like. As the N2 supplement, for example, commercially available 17502048 manufactured by Thermo Fisher Scientific can also be purchased and used.

The composition of 100×N2 supplement is as shown below.

TABLE 4

| Components | Molecular Weight | Concentration (mg/L) | mM |
|---|---|---|---|
| Proteins | | | |
| Human Transferrin (Holo) | 10000 | 10000 | 1 |
| Insulin Recombinant Full Chain | 5807.7 | 500 | 0.0860926 |
| Other Components | | | |
| Progesterone | 314.47 | 0.63 | 0.002003371 |
| Putrescine | 161 | 1611 | 10.006211 |
| Selenite | 173 | 0.52 | 0.00300578 |

A medium obtained by adding N2 supplement to DMEM/F12 mixed medium (DMEM:F12=1:1) has, for example, the following composition:

TABLE 5-1

| Components | Molecular Weight | Concentration (mg/L) | mM |
|---|---|---|---|
| Amino Acids | | | |
| Glycine | 75 | 18.75 | 0.25 |
| L-Alanine | 89 | 4.45 | 0.049999997 |
| L-Alanyl-L-Glutamine | 217 | 542 | 2.497696 |
| L-Arginine hydrochloride | 211 | 147.5 | 0.69905216 |
| L-Asparagine-H2O | 150 | 7.5 | 0.05 |
| L-Aspartic acid | 133 | 6.65 | 0.05 |
| L-Cysteine hydrochloride-H2O | 176 | 17.56 | 0.09977272 |
| L-Cystine 2HCl | 313 | 31.29 | 0.09996805 |
| L-Glutamic Acid | 147 | 7.35 | 0.05 |
| L-Histidine hydrochloride-H2O | 210 | 31.48 | 0.14990476 |
| L-Isoleucine | 131 | 54.47 | 0.41580153 |
| L-Leucine | 131 | 59.05 | 0.45076334 |
| L-Lysine hydrochloride | 183 | 91.25 | 0.4986339 |
| L-Methionine | 149 | 17.24 | 0.11570469 |
| L-Phenylalanine | 165 | 35.48 | 0.2150303 |
| L-Proline | 115 | 17.25 | 0.15 |
| L-Serine | 105 | 26.25 | 0.25 |
| L-Threonine | 119 | 53.45 | 0.44915968 |
| L-Tryptophan | 204 | 9.02 | 0.04421569 |
| L-Tyrosine disodium salt dihydrate | 261 | 55.79 | 0.21375479 |
| L-Valine | 117 | 52.85 | 0.4517094 |
| Vitamins | | | |
| Biotin | 244 | 0.0035 | 0.0000143 |
| Choline chloride | 140 | 8.98 | 0.06414285 |
| D-Calcium pantothenate | 477 | 2.24 | 0.004696017 |
| Folic Acid | 441 | 2.65 | 0.006009071 |
| Niacinamide | 122 | 2.02 | 0.016557377 |
| Pyridoxine hydrochloride | 206 | 2.031 | 0.009859223 |
| Riboflavin | 376 | 0.219 | 0.000582 |
| Thiamine hydrochloride | 337 | 2.17 | 0.006439169 |
| Vitamin B12 | 1355 | 0.68 | 0.000502 |
| i-Inositol | 180 | 12.6 | 0.07 |

TABLE 5-2

| Components | Molecular Weight | Concentration (mg/L) | mM |
|---|---|---|---|
| Inorganic Salts | | | |
| Calcium Chloride (CaCl2) (anhyd.) | 111 | 116.6 | 1.0504504 |
| Cupric sulfate (CuSO4—5H2O) | 250 | 0.0013 | 0.00000520 |
| Ferric Nitrate (Fe(NO3)3"9H2O) | 404 | 0.05 | 0.000124 |
| Ferric sulfate (FeSO4—7H2O) | 278 | 0.417 | 0.0015 |
| Magnesium Chloride (anhydrous) | 95 | 28.64 | 0.30147368 |
| Magnesium Sulfate (MgSO4) (anhyd.) | 120 | 48.84 | 0.407 |
| Potassium Chloride (KCl) | 75 | 311.8 | 4.1573334 |
| Sodium Bicarbonate (NaHCO3) | 84 | 2438 | 29.02381 |
| Sodium Chloride (NaCl) | 58 | 6999.5 | 120.68104 |
| Sodium Phosphate dibasic (Na2HPO4) anhydrous | 142 | 71.02 | 0.50014085 |
| Sodium Phosphate monobasic (NaH2PO4—H2O) | 138 | 62.5 | 0.45289856 |
| Zinc sulfate (ZnSO4—7H2O) | 288 | 0.432 | 0.0015 |
| Other Components | | | |
| D-Glucose (Dextrose) | 180 | 3151 | 17.505556 |
| Hypoxanthine Na | 159 | 2.39 | 0.015031448 |
| Linoleic Acid | 280 | 0.042 | 0.000150 |
| Lipoic Acid | 206 | 0.105 | 0.000510 |
| Phenol Red | 376.4 | 8.1 | 0.021519661 |
| Putrescine 2HCl | 161 | 0.081 | 0.000503 |

TABLE 5-2-continued

| | | | |
|---|---|---|---|
| Sodium Pyruvate | 110 | 55 | 0.5 |
| Thymidine | 242 | 0.365 | 0.001508265 |
| Progesterone | 314.47 | 0.63 | 0.00002003371 |
| Putrescine | 161 | 1611 | 0.10006211 |
| Selenite | 173 | 0.52 | 0.0000300578 |
| Proteins | | | |
| Human Transferrin (Holo) | 10000 | 10000 | 0.01 |
| Insulin Recombinant Full Chain | 5807.7 | 500 | 0.000860926 |

In one embodiment, a medium having a composition of L-methionine, L-glutamic acid, L-aspartic acid, L-cysteine, progesterone, hypoxanthine, thymidine, and vitamin B12 and the like at concentrations equivalent to those shown in Table 5 can be used as a cell proliferation basal medium. Here, the "equivalent concentration" independently means that it includes the range of ±20% (preferably ±10%, more preferably ±5%, further preferably ±2.5%, and further more preferably ±1%) for the concentration of each factor.

The cell proliferation basal medium may contain non-acidic amino acids such as L-glutamine, taurine, N2 and the like as appropriate. The concentration of taurine is generally 1 μM-1000 μM, preferably 10 μM-500 μM.

The cell proliferation basal medium may be either a serum-containing medium or a serum-free medium. It is preferably a serum-containing medium. The concentration of serum in the serum-containing medium is generally 0.1-20% (v/v), preferably 0.1-12% (v/v) (e.g., 10% (v/v)).

As the cell proliferation basal medium, specifically, a medium obtained by adding N2 supplement to a commercially available DMEM/F12 mixed medium (DMEM: F12=1:1, manufactured by Thermo Fisher Scientific, 10565042) and the like can be mentioned. As a specific medium for maintaining a continuous epithelial tissue, for example, a medium obtained by adding B27 supplement medium (manufactured by Thermo Fisher Scientific, 12587010) to Neurobasal medium (manufactured by Thermo Fisher Scientific, 21103049) can be used.

The proportion (% by volume) of a medium for maintaining a continuous epithelial tissue contained in a mixed medium of a cell proliferation basal medium and a medium for maintaining a continuous epithelial tissue is generally 10%-90%, preferably 40%-80%, more preferably 50%-75%. For example, 1 part by volume of a cell proliferation basal medium (e.g., DMEM/F12 mixed medium blended with N2 supplement) and not less than 1 part by volume (e.g., 1-3 parts by volume) of a medium for maintaining a continuous epithelial tissue (e.g., Neurobasal medium blended with B27 supplement) are mixed to give a mixed medium. As a result, for example, a mixed medium of a medium for maintaining a continuous epithelial tissue (e.g., Neurobasal medium blended with B27 supplement) and a cell proliferation basal medium (e.g., DMEM/F12 mixed medium blended with N2 supplement) which contains not less than 50% (e.g., 50-75%) in volume of a medium for maintaining a continuous epithelial tissue can be obtained. As another embodiment, a mixed medium of a medium for maintaining a continuous epithelial tissue (e.g., Neurobasal medium blended with B27 supplement) and a cell proliferation basal medium (e.g., DMEM/F12 mixed medium blended with N2 supplement) which contains not less than 75% in volume of a medium for maintaining a continuous epithelial tissue can be mentioned.

A person skilled in the art can easily determine the period of culturing in a mixed medium of a cell proliferation basal medium and a medium for maintaining a continuous epithelial tissue, that is, the time for exchanging with a medium for maintaining a continuous epithelial tissue. For example, the culture period suitable for the purpose of use can be determined by confirming the differentiation state of the retinal tissue and the maintenance state of the continuous epithelial structure by a method such as immunostaining and the like.

One embodiment of the present invention is a method for maintaining a continuous epithelial structure of a retinal tissue, including culturing a "retinal tissue in an early developmental stage" and a "retinal tissue in a stage from early developmental stage until emergence rate of cone photoreceptor progenitor cell reaches maximum" in a medium for maintaining a continuous epithelial tissue. The "retinal tissue in an early developmental stage" and the "retinal tissue in a stage from early developmental stage until emergence rate of cone photoreceptor progenitor cell reaches maximum" may be in any differentiation stage as long as it is a retinal tissue having a continuous epithelial structure, preferably a retinal tissue without a rosette-like structure.

Depending on the condition of retinal tissue, culture conditions, and the like, when a retinal tissue in an early developmental stage is cultured in a medium other than a medium for maintaining a continuous epithelial tissue (e.g., cell proliferation basal medium), a rosette-like structure is formed in about 5 to 70 days, and the continuous epithelial structure may collapse. As described above, using a mixed medium of a cell proliferation basal medium and a medium for maintaining a continuous epithelial tissue, formation of a rosette-like structure and collapse of the continuous epithelial structure can be prevented for a certain period.

Therefore, one embodiment of the present invention is a method for maintaining a continuous epithelial structure of a retinal tissue, including culturing a retinal tissue in an early developmental stage in a medium other than a medium for maintaining a continuous epithelial tissue (e.g., a cell proliferation basal medium, a mixed medium of a cell proliferation basal medium and a medium for maintaining a continuous epithelial tissue) for any period within 80 days (preferably within 50 days and the like) and thereafter culturing in a medium for maintaining a continuous epithelial tissue.

When a retinal tissue in an early developmental stage is cultured in any medium (e.g., a cell proliferation basal medium, a mixed medium of a cell proliferation basal medium and a medium for maintaining a continuous epithelial tissue, a medium for maintaining a continuous epithelial tissue), the differentiation of the retinal tissue proceeds and the aforementioned various retinal cells are obtained by differentiation. For example, taking note of photoreceptor, a photoreceptor progenitor cell emerges in the retinal tissue by continuing culture. When culture is further continued, the emergence rate of cone photoreceptor progenitor cell reaches maximum, and then a photoreceptor progenitor cell to be differentiated into a rod photoreceptor progenitor cell emerges. As culture conditions under which a photoreceptor progenitor cell is actually differentiated into a rod photoreceptor progenitor cell, for example, when the above-mentioned medium for maintaining a continuous epithelial tissue, cell proliferation basal medium or mixed medium of a cell proliferation basal medium and a medium for maintaining a continuous epithelial tissue which contains about 10%-20% of serum, or about 0.1 nM to 1000 nM retinoic acid or a derivative thereof and the like is used, emergence of a rod photoreceptor progenitor cell can be observed. On the other hand, depending on the culture conditions, a rod photoreceptor progenitor cell may not actually emerge in some cases; however, a retinal tissue at the same level as the retinal tissue in which a rod photoreceptor progenitor cell emerges can be obtained by culturing for a period required for the rod photoreceptor progenitor cell to emerge under conditions where the above-mentioned rod photoreceptor progenitor cell emerges. As mentioned above, when a medium for maintaining a continuous epithelial tissue is used, emergence of a photoreceptor progenitor cell is suppressed compared to when a medium other than a medium for maintaining a continuous epithelial tissue (e.g., cell proliferation basal medium, or, a mixed medium of a cell proliferation basal medium and a medium for maintaining a continuous epithelial tissue) is used.

One embodiment of the retinal tissue in a stage from early developmental stage until emergence rate of cone photoreceptor progenitor cell reaches maximum is a retinal tissue in a stage when a photoreceptor progenitor cell starts to emerge.

A person skilled in the art can specify "a stage when a photoreceptor progenitor cell starts to emerge" using the expression of a photoreceptor progenitor cell marker as an index. For example, a retinal tissue can be stained with a photoreceptor progenitor cell marker by a method such as immunostaining and the like. As the photoreceptor progenitor cell marker here, for example, CRX can be mentioned. That is, in one embodiment, "a stage when a photoreceptor progenitor cell starts to emerge" is a "stage when expression of CRX begins to be detected".

Depending on the condition of retinal tissue, culture conditions, and the like, when a "retinal tissue in an early developmental stage" is cultured in a cell proliferation basal medium, or a mixed medium of a cell proliferation basal medium and a medium for maintaining a continuous epithelial tissue for 1-30 days (preferably 3 days-20 days, more preferably 3-15 days), a photoreceptor progenitor cell emerges. It is preferable to culture the cells in a cell proliferation basal medium (optionally containing an additive) until a stage when a photoreceptor progenitor cell starts to emerge. As mentioned above, to maintain expression of RAX and CRX and promote differentiation into a photoreceptor progenitor cell, it is more preferable to culture the cells in a cell proliferation basal medium than in a mixed medium of a cell proliferation basal medium and a medium for maintaining a continuous epithelial tissue.

On the other hand, when a retinal tissue in an early developmental stage is continuously cultured in a cell proliferation basal medium not containing a medium for maintaining a continuous epithelial tissue, a rosette-like structure is observed in about 1 to 50 days after emergence of a photoreceptor progenitor cell, and the continuous epithelial structure starts to collapse. Therefore, in one embodiment of the present invention, it is preferable to culture the cells in a mixed medium of a cell proliferation basal medium and a medium for maintaining a continuous epithelial tissue, or a medium for maintaining a continuous epithelial tissue after a stage when a photoreceptor progenitor cell starts to emerge. As mentioned above, use of a medium for maintaining a continuous epithelial tissue may cause a decrease in the expression of RAX, CRX, which play an important role in the differentiation of cells contained in a retinal tissue. Therefore, in one embodiment of the present invention, to promote differentiation into a photoreceptor progenitor, it is more preferable to culture the cells in a mixed medium of a cell proliferation basal medium and a medium for maintaining a continuous epithelial tissue after a stage when a photoreceptor progenitor cell starts to emerge. That is, by culturing for a certain period in a mixed medium of a cell proliferation basal medium and a medium for maintaining a continuous epithelial tissue, differentiation and maturation of photoreceptor cell and the like contained in a retinal tissue can be performed while maintaining a continuous epithelial structure. Therefore, a production method of a retinal tissue maintaining a continuous epithelial structure, which includes culturing in a mixed medium of a cell proliferation basal medium and a medium for maintaining a continuous epithelial tissue is also within the scope of the present invention.

One embodiment of the present invention is, for example, a method for culturing in a mixed medium of a cell proliferation basal medium and a medium for maintaining a continuous epithelial tissue until a retinal tissue in any stage between an early developmental stage and a stage when emergence rate of cone photoreceptor progenitor cell reaches maximum is obtained, preferably until a retinal tissue in a stage when emergence rate of cone photoreceptor progenitor cell reaches maximum is obtained.

A person skilled in the art can specify "a stage when emergence rate of cone photoreceptor progenitor cell reaches maximum" by immunostaining with photoreceptor progenitor cell marker and/or cone photoreceptor progenitor cell marker, nuclear staining with DAPI and the like.

Specifically, for example, the retinal tissue undergoing differentiation is collected at certain intervals (e.g., 1-20 days) (e.g., 40 days, 50 days, 60 days, 70 days, 80 days after the start of culture), and fixed with para-formaldehyde and the like and frozen sections are prepared. The frozen sections are stained with, for example, CRX antibody, TRβ2 antibody, RXR-γ antibody and the like, the nucleus is simultaneously stained with DAPI and the like, and the proportion of the number of cone photoreceptor progenitor cells (i.e., the number of CRX positive and RXR-γ positive cells, or cells expressing CRX and TRβ2) based on the total number of cells contained in the neural retina tissue is determined. At this time, the ratio of the number of cone photoreceptor progenitor cell marker-positive cells that emerge in the above-mentioned certain period to the total number of cells, that is, the emergence ratio, is determined at a plurality of times (timing). As a result, the period when the proportion of emergence of cone photoreceptor progenitor cell marker-positive cells is the highest can be specified as "a stage when emergence rate of cone photoreceptor progenitor cell reaches maximum".

In addition, BrdU, EdU and the like which are incorporated into the cells in a proliferation period (here, retinal progenitor cell or neural retinal progenitor having proliferation ability) are added to a culture medium for a particular period (e.g., 1-7 days), the proportion of the cells that incorporated BrdU, EdU and the like and differentiated into cells that express the aforementioned cone photoreceptor progenitor cell marker is measured by immunostaining and the like well known to those skilled in the art, and the period when the proportion is the highest is determined, whereby "a stage when emergence rate of cone photoreceptor progenitor cell reaches maximum" can be identified. Specifically, for example, BrdU, Edu and the like are added to a culture medium for cultivating a retinal tissue in any differentiation stage and the retinal tissue is cultured for any one day. The next day, the retinal tissue is recovered and the number and/or proportion of CRX and RXR-γ positive cells or the number and/or proportion of CRX and TRβ2 positive cells in BrdU or EdU positive cells are/is measured. The day of addition of BrdU or EdU that yields the highest number and/or the highest proportion of the cells in the neural retinal tissue can be identified as "a stage when emergence rate of cone photoreceptor progenitor cell reaches maximum".

Specifically, the "stage when emergence rate of cone photoreceptor progenitor cell reaches maximum" corresponds to 30 to 50 days, preferably 30 to 40 days, after emergence of cone photoreceptor progenitor cell is observed.

Depending on the condition of retinal tissue, culture conditions, and the like, when a retinal tissue after an early developmental stage until a stage when emergence rate of cone photoreceptor progenitor cell reaches maximum (reaches peak) is cultured in a medium other than a medium for maintaining a continuous epithelial tissue (e.g., a mixed medium of a cell proliferation basal medium and a medium for maintaining a continuous epithelial tissue), a rosette-like structure is formed in about 1 to 50 days after passing the stage when emergence rate of cone photoreceptor progenitor cell reaches maximum (reaches peak), and the continuous epithelial structure collapses. Therefore, one embodiment of the present invention is, for example, a method including exchanging the medium with a medium for maintaining a continuous epithelial tissue before a stage when emergence rate of cone photoreceptor progenitor cell reaches maximum and culturing the retinal tissue in a medium for maintaining a continuous epithelial tissue.

Depending on the condition of retinal tissue, culture conditions, and the like, in one embodiment of the present invention, it is preferable to culture, after a stage when a new ganglion cell no longer emerges, a retinal tissue in a medium for maintaining a continuous epithelial tissue and not containing a cell proliferation basal medium.

A person skilled in the art can easily specify "a stage when a new ganglion cell no longer emerges". For example, it can be specified by adding BrdU, or EdU and the like which are incorporated into cells in a cell proliferation period (here, neural retinal progenitor having proliferation ability) to a culture medium for a particular period (e.g., 1-7 days), and monitoring the proportion of the cells that incorporated BrdU, or EdU and the like and differentiated into cells that express a ganglion cell marker. Specifically, "a stage when a new ganglion cell no longer emerges" can be identified, for example, as a stage when new BRN3 positive cell and the like no longer emerge from BrdU positive cells.

Depending on the condition of retinal tissue, culture conditions, and the like, in one embodiment of the present invention, a retinal tissue maintaining a continuous epithelial structure and in a stage when emergence rate of cone photoreceptor progenitor cell reaches maximum, or a retinal tissue maintaining a continuous epithelial structure and in a stage when a new ganglion cell no longer emerges can be obtained by culturing a retinal tissue in an early developmental stage for 30-70 days (preferably 40 days-60 days).

Depending on the condition of retinal tissue, culture conditions, and the like, in one embodiment of the present invention, a retinal tissue maintaining a continuous epithelial structure and in a stage when emergence rate of cone photoreceptor progenitor cell reaches maximum, or a retinal tissue maintaining a continuous epithelial structure and in a stage when a new ganglion cell no longer emerges can be obtained by culturing a retinal tissue having a continuous epithelial structure and in a stage when a photoreceptor progenitor cell started to emerge in, for example, a mixed medium of a cell proliferation basal medium and a medium for maintaining a continuous epithelial tissue for 30-50 days (preferably 30 days-40 days).

The period of culturing a retinal tissue in the aforementioned differentiation stage (e.g., retinal tissue in an early developmental stage, retinal tissue in a stage when a photoreceptor progenitor cell starts to emerge, retinal tissue in a stage when emergence rate of cone photoreceptor progenitor cell reaches maximum, or retinal tissue in a stage when a new ganglion cell no longer emerges) in a medium for maintaining a continuous epithelial tissue is not particularly limited. For example, it can be cultured in a medium for maintaining a continuous epithelial tissue until it is used for a particular objective (e.g., transplantation). That is, a retinal tissue in a stage when differentiation has progressed beyond the stage when emergence rate of cone photoreceptor progenitor cell reaches maximum, or a retinal tissue in a stage when differentiation has progressed beyond the stage when a new ganglion cell no longer emerges can be cultured while highly efficiently maintaining a continuous epithelial structure in a medium for maintaining a continuous epithelial tissue. It is also possible to culture cells while exchanging a medium for maintaining a continuous epithelial tissue and a medium other than same as long as a continuous epithelial structure is maintained.

When the differentiation stage of the retinal tissue progresses until the time when rod photoreceptor progenitor cell begins to emerge or a time corresponding thereto, the continuous epithelial structure can be maintained even without culturing in a medium for maintaining a continuous epithelial tissue. Therefore, after start of the emergence of a rod photoreceptor progenitor cell, culture may be continued by exchanging to a medium other than a medium for maintaining a continuous epithelial tissue (e.g., cell proliferation basal medium, mixed medium of a cell proliferation basal medium and a medium for maintaining a continuous epithelial tissue), or culture may be continued in the same medium for maintaining a continuous epithelial tissue.

A person skilled in the art can appropriately determine the "period until a rod photoreceptor progenitor cell emerges" with the expression of NRL which is a marker of rod photoreceptor progenitor cell as an index. Specifically, expression of NRL may be confirmed by a method such as immunostaining and the like. In one embodiment of the present invention, the "period until a rod photoreceptor progenitor cell emerges" is "a period until the proportion of NRL positive rod photoreceptor progenitor cells in the photoreceptor progenitor cells contained in a retinal tissue reaches 0.01%-100, preferably 0.1-5%, further preferably 1-3%".

Depending on the condition of retinal tissue, culture conditions, and the like, the period until a rod photoreceptor progenitor cell emerges after starting culture of "retinal tissue in an early developmental stage" is, for example, 40 days-100 days, preferably 50 days-80 days.

Depending on the condition of retinal tissue, culture conditions, and the like, the period until a rod photoreceptor progenitor cell emerges after starting culture of a retinal tissue in a stage when a photoreceptor progenitor cell starts to emerge is, for example, 30 days-100 days, preferably 40 days-70 days.

Depending on the condition of retinal tissue, culture conditions, and the like, the period until a rod photoreceptor progenitor cell emerges after starting culture of a retinal tissue in a stage when emergence rate of cone photoreceptor progenitor cell reaches maximum or a stage when a new ganglion cell no longer emerges is, for example, 10 days-80 days, preferably 10 days-40 days.

One embodiment of the present invention is, for example, a method for maintaining a continuous epithelial structure of a retinal tissue, which includes culturing a retinal tissue after an early developmental stage (e.g., retinal tissue in an early developmental stage or a retinal tissue after an early developmental stage and until a stage when emergence rate of cone photoreceptor progenitor cell reaches maximum) in a medium for maintaining a continuous epithelial tissue for a period until a rod photoreceptor progenitor cell emerges or a period corresponding thereto.

The period corresponding to a period until a rod photoreceptor progenitor cell emerges is (1) for example, 40 days-100 days, preferably 50 days-80 days, after starting culture of "retinal tissue in an early developmental stage", (2) for example, 30 days-100 days, preferably 40 days-70 days, after starting culture of a retinal tissue in a stage when a photoreceptor progenitor cell starts to emerge, or (3) for example, 10 days-80 days, preferably 10 days-40 days, after starting culture of a retinal tissue in a stage when emergence rate of cone photoreceptor progenitor cell reaches maximum, or a retinal tissue in a stage when a new ganglion cell no longer emerges.

In a method for maintaining a continuous epithelial structure of a retinal tissue, it is preferable to exchange the cell proliferation basal medium with a medium for maintaining a continuous epithelial tissue step by step. That is, a retinal tissue after an early developmental stage is cultured for a given period in a mixed medium of a cell proliferation basal medium and a medium for maintaining a continuous epithelial tissue, after which the medium is exchanged with a medium for maintaining a continuous epithelial tissue.

In addition, differentiation and maturation of a photoreceptor cell and the like contained in a retinal tissue can be further promoted while maintaining a continuous epithelial structure by culturing the retinal tissue in a medium for maintaining a continuous epithelial tissue for a given period. Therefore, a method for producing a retinal tissue maintaining a continuous epithelial structure, which includes culturing the retinal tissue in a medium for maintaining a continuous epithelial tissue is also within the scope of the present invention.

The period of culturing in a cell proliferation basal medium, or a mixed medium of a cell proliferation basal medium and a medium for maintaining a continuous epithelial tissue is not particularly limited as long as a continuous epithelial structure is maintained. A person skilled in the art can appropriately determine same while confirming the differentiation stage of the objective cell and the maintenance state of the continuous epithelial structure.

In the method of the present invention, a retinal tissue is preferably cultured by suspension culture. As a culture vessel used for suspension culture, those described above can be used.

In the method of the present invention, the culture conditions for culturing retinal tissues such as culture temperature, $CO_2$ concentration and so on can be appropriately determined. The culture temperature is, for example, about 30° C. to about 40° C., preferably about 37° C. The $CO_2$ concentration is, for example, about 1% to about 10%, preferably about 5%. As for the oxygen concentration, it is preferable to culture cells at the general oxygen concentration in air (20±2%) rather than 40% $O_2$ from the aspect of suppression of excessive protection of ganglion cell. This is because a ganglion cell survives in excess and rosette formation tends to occur under high oxygen concentration conditions. In one embodiment of the present invention, excessive neurite extension of ganglion cell and the like is suppressed and continuous epithelium of retinal tissue can also be maintained by culturing at an oxygen concentration lower than the general oxygen concentration in air (20±2%).

As one preferable embodiment of the present invention, the following method is provided.

A method for maintaining a continuous epithelial structure, or a method for producing a retinal tissue maintaining a continuous epithelial structure, which contains the following steps (1)-(3):

(1) a step of culturing a "retinal tissue in an early developmental stage" in a cell proliferation basal medium for a period until a photoreceptor progenitor cell starts to emerge (at the longest), (2) a step of culturing the retinal tissue obtained in (1) in a mixed medium of a cell proliferation basal medium and a medium for maintaining a continuous epithelial tissue for a period until (at the longest) a stage when a new ganglion cell no longer emerges (stage when differentiation of ganglion cell completes), or a stage when emergence rate of cone photoreceptor progenitor cell reaches maximum, and (3) a step of culturing the retinal tissue obtained in (2) in a medium for maintaining a continuous epithelial tissue at least for a period until emergence of a rod photoreceptor progenitor cell.

A retinal tissue produced by the above-mentioned method maintains a continuous epithelial structure and shows differentiation and maturation of retinal cells (particularly photoreceptor cells). A person skilled in the art can confirm differentiation and maturation of retinal cells (particularly photoreceptor cells) by staining with markers such as Recoverin expressed in photoreceptor cell and photoreceptor progenitor cell, Rhodopsin expressed in rod cell, NRL expressed in rod photoreceptor cell and rod photoreceptor progenitor cell, S-opsin and LM-opsin expressed in cone photoreceptor cell and the like according to the differentiation stage of the retinal tissue.

Step (1)

The cell proliferation basal medium is not particularly limited as long as it is a medium described above. Preferable embodiment of the cell proliferation basal medium includes a mixture of DMEM medium, F12 medium and N2 medium. For example, commercially available DMEM/F12 mixed medium (DMEM:F12=1:1, manufactured by thermofisher scientific, 10565042) and the like can be used.

A person skilled in the art can appropriately determine a "period until a photoreceptor progenitor cell starts to emerge" with expression of a photoreceptor progenitor cell marker as an index. For example, a culture tissue can be stained with a marker of photoreceptor progenitor cell according to a method such as immunostaining and the like. Examples of the photoreceptor progenitor cell marker include CRX. That is, in one embodiment, the "period until a photoreceptor progenitor cell starts to emerge" is a "period until expression of CRX begins to be detected".

Depending on the culture conditions and the like, culture conditions and the like, the "period until a photoreceptor progenitor cell starts to emerge" from the start of culturing a "retinal tissue in an early developmental stage" is, for example, 1 day-30 days (preferably 3 days-20 days, more preferably 3-15 days).

Culturing may be continued beyond the period until a photoreceptor progenitor cell starts to emerge as long as it is before a rosette-like structure is produced in a retinal tissue maintaining a continuous epithelial structure. The rosette-like structure can be confirmed by the aforementioned method. Depending on the condition of retinal tissue, culture conditions, and the like, specifically, the medium may be changed to the culture medium of the step (2) within 20 days, preferably 15 days, more preferably 10 days, more preferably 5 days, from a stage when a photoreceptor progenitor cell starts to emerge in the retinal tissue.

That is, the period after photoreceptor progenitor cell begins to emerge and before a rosette-like structure is formed varies depending on the condition of retinal tissue, culture conditions, and the like. It is specifically 1 day-40 days (preferably, 1 day-30 days, more preferably 3-20 days, further preferably 3-15 days) from the start of culture of step (1).

Step (2)

The cell proliferation basal medium and the medium for maintaining a continuous epithelial tissue are not particularly limited as long as they are the media mentioned above. The proportion of a medium for maintaining a continuous epithelial tissue contained in a mixed medium of a cell proliferation basal medium and a medium for maintaining a continuous epithelial tissue is specifically 10%-90%, preferably 40%-800, more preferably 50%-75%. For example, 1 volume part of a cell proliferation basal medium (e.g., DMEM/F12 mixed medium blended with N2 supplement) and not less than 1 volume part (e.g., 1-3 volume parts) of a medium for maintaining a continuous epithelial tissue (e.g., Neurobasal medium blended with B27 supplement) are mixed to give a mixed medium.

Furthermore, it is preferable to exchange the medium with a 100% medium for maintaining a continuous epithelial tissue until a stage when a new ganglion cell no longer emerges (stage of completion of differentiation of ganglion cell), preferably a stage when emergence rate of cone photoreceptor progenitor cell reaches maximum.

Here, a person skilled in the art can identify "a stage when a new ganglion cell no longer emerges (stage when differentiation of ganglion cell completes)" and "a stage when emergence rate of cone photoreceptor progenitor cell reaches maximum", as mentioned above.

The period after the start of the step (2) until a stage when a new ganglion cell no longer emerges (stage when differentiation of ganglion cell completes), or a stage when emergence rate of cone photoreceptor progenitor cell reaches maximum is, for example, not more than 50 days, (preferably 10-50 days, more preferably 10-40 days, further more preferably 20-30 days).

Step (3)

A medium for maintaining a continuous epithelial tissue used in this step is not particularly limited as long as it is a medium for maintaining a continuous epithelial tissue described in the above-mentioned 3. For example, a medium of Neurobasal blended (added) with B27 supplement can be used.

A person skilled in the art can appropriately determine the "period until a rod photoreceptor progenitor cell emerges" as mentioned above with the expression of the rod photoreceptor progenitor cell marker NRL as an index.

The period after the start of step (3) until a rod photoreceptor progenitor cell emerges varies depending on the condition of cell, culture conditions, and the like. It is, for example, not more than 80 days (e.g., 10 days-80 days, preferably 20-50 days).

As mentioned above, the emergence of the rod photoreceptor progenitor cell may not be observed depending on the culture conditions (e.g., serum-free and the like). In this case, the continuous epithelial structure of the retinal tissue can be maintained by culturing in a medium for maintaining a continuous epithelial tissue for at least not less than 10 days (e.g., not less than 20 days, not less than 30 days, not less than 50 days, not less than 80 days) after the start of step (3).

When the differentiation of the retinal tissue progresses until the time when rod photoreceptor progenitor cell emerges, the continuous epithelial structure can be maintained even without culturing in a medium for maintaining a continuous epithelial tissue. Therefore, at the time of emergence of a rod photoreceptor progenitor cell, culture may be continued by exchanging the medium with another medium (e.g., cell proliferation basal medium), or culture may be continued in the same medium for maintaining a continuous epithelial tissue. When the retinal tissue is to be further differentiated or matured, culture is preferably continued by exchanging the medium with a cell proliferation basal medium.

A retinal tissue produced by a method containing the aforementioned steps (1)-(3) does not accompany a decrease in the expression of RAX, CRX, shows progressed differentiation and maturation of retinal cell (e.g., photoreceptor cell) and maintains the continuous epithelial structure, as compared to when culture in all the aforementioned steps (1)-(3) or the aforementioned steps (2) and (3) is performed in a medium for maintaining a continuous epithelial tissue.

In one embodiment, a retinal tissue produced by a method containing the aforementioned steps (1)-(3) contains photoreceptor progenitor cells or photoreceptor cells at a proportion higher by not less than 1.1 times, preferably not less than 1.3 times, more preferably not less than 1.5 times, as compared to when culture in all the aforementioned steps (1)-(3) or the aforementioned steps (2) and (3) is performed in a medium for maintaining a continuous epithelial tissue. Alternatively, in one embodiment, when a retinal tissue is produced by a method containing the aforementioned steps (1)-(3), the retinal tissue at 15-20 days after a stage when a photoreceptor progenitor cell or a photoreceptor cell starts to emerge contains the photoreceptor cell or progenitor cell thereof in not less than 50%, preferably not less than 60%, not less than 70%, not less than 80%, of the surface thereof (i.e., apical surface side), and has a higher rate of the photoreceptor cell or progenitor cell thereof as compared to when culture in all the aforementioned steps (1)-(3) or the aforementioned steps (2) and (3) is performed in a medium for maintaining a continuous epithelial tissue.

As one preferable embodiment of the present invention, the following method is provided.

A method for maintaining a continuous epithelial structure of a retinal tissue, or a method for producing a retinal tissue maintaining a continuous epithelial structure, which contains the following steps (1)-(3):

(1) a step of culturing a retinal tissue in an early developmental stage (e.g., a retinal tissue including a retinal progenitor cell and in a differentiation stage without emergence of a ganglion cell) in a cell proliferation basal medium (e.g., medium containing DMEM/F12 medium and N12 medium, DMEM/F12 mixed medium blended with N2 supplement) for not more than 20 days (e.g., 3-20 days, more preferably 3-15 days, further more preferably 7 days-15 days), (2) a step of culturing the retinal tissue obtained in (1) in a mixed medium of a cell proliferation basal medium (e.g., medium containing DMEM/F12 medium and N12 medium, DMEM/F12 mixed medium blended with N2 supplement) and a medium for maintaining a continuous epithelial tissue (e.g., Neurobasal medium blended with B27 supplement) (volume ratio 1:1-1:3) for 10 days-40 days, preferably 20 days-30 days, and (3) a step of culturing the retinal tissue obtained in (2) in a medium for maintaining a continuous epithelial tissue (e.g., Neurobasal medium blended with B27 supplement) (period: for example, not more than 80 days, preferably 10 days-80 days, more preferably 20-50 days).

A preferable one embodiment of the present invention provides the following method.

A method for maintaining a continuous epithelial structure of a retinal tissue, or a method for producing a retinal tissue maintaining a continuous epithelial structure, which contains the following steps (1)-(3):

(1) a step of culturing a retinal tissue in an early developmental stage (e.g., a retinal tissue containing a retinal progenitor cell and in a differentiation stage without emergence of a ganglion cell) in a cell proliferation basal medium (e.g., medium containing DMEM/F12 medium and N12 medium, DMEM/F12 mixed medium blended with N2 supplement) for a period until expression of CRX is observed, (2) a step of culturing the retinal tissue obtained in (1) in a mixed medium of a cell proliferation basal medium (e.g., medium containing DMEM/F12 medium and N12 medium, DMEM/F12 mixed medium blended with N2 supplement) and a medium for maintaining a continuous epithelial tissue (e.g., Neurobasal medium blended with B27 supplement) at a volume ratio of 1:1-1:3 until an emergence rate of CRX positive and RXR-γ positive cells in the proliferated cells reaches maximum, and (3) a step of culturing the retinal tissue obtained in (2) in a medium for maintaining a continuous epithelial tissue (e.g., Neurobasal medium blended with B27 supplement) until expression of at least NRL is observed.

In one embodiment of the present invention, a preparation of an aggregate containing a retinal tissue having a continuous epithelial structure is provided. This preparation contains an aggregate containing a retinal tissue having a continuous epithelial structure, namely, a retinal tissue having a photoreceptor or a progenitor cell thereof continuously present in not less than at least 50% (preferably not less than 60%, not less than 70%, not less than 80%, not less than 85%, not less than 90%) of a surface of the retinal tissue, and a medium for maintaining a continuous epithelial tissue. In one embodiment of the present invention, the preparation contains an aggregate containing a retinal tissue having a continuous epithelial structure, namely, a retinal tissue in which the area of the apical surface present on the surface of the retinal tissue is not less than at least 50% (preferably not less than 60%, not less than 70%, not less than 80%, not less than 85%, not less than 90%) based on the surface area of the retinal tissue, and a medium for maintaining a continuous epithelial tissue. In one embodiment of the present invention, the retinal tissue in this preparation has a diameter in the major axis direction of not less than 0.5 mm (preferably not less than 0.6 mm, not less than 0.8 mm, not less than 1.0 mm, not less than 1.2 mm, not less than 1.4 mm, not less than 1.6 mm, not less than 1.8 mm, not less than 2.0 mm). A retinal tissue to be transplanted is preferably large since a wide area of a retinal tissue of a recipient with a disorder can be covered. A retinal tissue exceeding 0.5 mm-1.0 mm easily produces a rosette structure during transplantation. However, the present invention can efficiently provide a preparation of an aggregate containing a retinal tissue having a continuous epithelial structure, without producing a rosette structure even with a retinal tissue exceeding 0.5 mm-1.0 mm.

Here, the diameter in the major axis direction of a retinal tissue means, for example, when measuring based on images taken with a stereomicroscope, the length of the longest straight line connecting any two points in the outer circumference (contour, surface) of the retinal tissue. Some aggregates containing a retinal tissue contain multiple retinal tissues overlapping with one another (e.g., clover type, refer to FIG. 5-1 and the like). A person skilled in the art can easily determine whether multiple retinal tissues are present. In this case, the diameter in the major axis direction of the retinal tissue means the diameter in the major axis direction of each retinal tissue in the aggregate, and the diameter in the major axis direction of at least one retinal tissue only needs to be not less than 0.5 mm. Preferably, the diameter in the major axis direction of all retinal tissues in the aggregate is not less than 0.5 mm. More specifically, the length of the longest straight line connecting any two points in the outer circumference separated by two overlapping circles or ellipses in terms of shape (more specifically, when the continuous positional information of the outer circumference of the aggregate containing a retinal tissue is hypothetically determined, the point at which continuity of the curve is lost in the curve obtained when the positional information is plotted on the horizontal axis and the slope of the tangent line at the position is plotted on the vertical axis) is measured. Furthermore, some aggregates containing a retinal tissue contain a retinal pigment epithelial cell and/or a ciliary marginal zone. Also in this case, similar to when multiple retinal tissues are present in an aggregate, the length of the longest straight line connecting any two points in the outer circumference separated by a contact point between a retinal pigment epithelium and/or a ciliary marginal zone and a retinal tissue is measured.

The proportion of the cells expressing RAX, CHX10 and/or CRX in a retinal tissue in the preparation is preferably not less than 50%, not less than 60%, not less than 70%, not less than 80%, not less than 85%, not less than 90%, not less than 95%.

When the preparation contains an aggregate containing multiple retinal tissues, the proportion of the number of aggregates containing a retinal tissue satisfying the above-mentioned conditions based on the whole number is preferably at least not less than 50% (preferably not less than 60%, not less than 70%, not less than 80%, not less than 85%, not less than 90%, not less than 95%).

The medium for maintaining a continuous epithelial tissue in the preparation is a medium for maintaining a continuous epithelial tissue defined in the present specification. It may contain, for example, antibiotic, preservative, stabilizer, preservative and the like as long as a continuous epithelial tissue can be maintained.

The retinal tissue having a continuous epithelial structure obtained above can be used as an active ingredient of a cell pharmaceutical product used for a cell therapy.

6. Pharmaceutical Composition

The present invention provides a pharmaceutical composition containing an effective amount of a retinal tissue having a continuous epithelial structure which is produced or maintained by the method of the present invention.

The pharmaceutical composition contains an effective amount of a retinal tissue having a continuous epithelial structure which is produced or maintained by the method of the present invention, and a pharmaceutically acceptable carrier.

As a pharmaceutically acceptable carrier, a physiological aqueous solvent (saline, buffer, serum-free medium etc.) can be used. Where necessary, in a transplantation therapy, a medicament containing a tissue or cells to be transplanted may contain conventionally used preservative, stabilizer, reducing agent, isotonizing agent and the like.

The pharmaceutical composition of the present invention can be produced as a suspension by suspending a retinal tissue having a continuous epithelial structure which is produced or maintained by the method of the present invention in an appropriate physiological aqueous solvent. Where necessary, the composition may be cryopreserved by adding a cryopreservative, and when in use, thawed and washed with buffer for use of a transplantation therapy.

The retinal tissue obtained by the production method of the present invention may be cut in an appropriate size with a tool such as tweezers and the like to prepare a retinal tissue section for administration. In addition, a loose retinal tissue section cut into a sheet like form can be used as a sheet agent. That is, a pharmaceutical composition containing a retinal tissue section cut out from the retinal tissue of the present invention is also within the scope of the present invention.

A retinal cell suspension for administration can be prepared by dispersing a retinal tissue obtained by the method of the present invention by using a cell dispersant such as papain and the like. In addition, a cell containing an active ingredient can also be separated by a cell sorter from a cell suspension by using specific antibody, aptamer, peptide, and the like.

That is, a pharmaceutical composition containing a cell suspension prepared by dispersing and/or purifying the retinal tissue of the present invention is also within the scope of the present invention.

7. Toxicity Evaluation Method

Since a retinal tissue containing a continuous epithelial structure produced or maintained by the method of the present invention is useful as a material for disease study or drug discovery in a screening for a medicament for treating a disease due to a disorder of a retinal tissue, or in toxicity evaluation, it can be used as a reagent for evaluating toxicity or efficacy of a test substance. For example, iPS cells are established from a human patient with a disease due to a disorder of a retinal tissue, particularly a hereditary disease, and using the iPS cells, a retinal tissue containing a continuous epithelial structure is produced or maintained by the method of the present invention. The retinal tissue can reproduce the disorder of retinal tissue causing the disease of the patient in vitro. Therefore, the present invention provides a method for evaluating toxicity or efficacy of a test substance, which includes contacting a test substance with a retinal tissue produced by the method of the present invention and detecting an influence of the substance on the tissue.

For example, a retinal tissue having a particular disorder (e.g., hereditary disorder) which is produced or maintained by the method of the present invention is cultured in the presence or absence (negative control) of a test substance. Then, the severity of disorder of the retinal tissue treated with a test substance is compared with that of the negative control. As a result, a test substance that reduced the severity of the disorder can be selected as a candidate substance for a medicament for treating the disease resulting from the disorder. For example, a test substance that improves the physiological activity (e.g., survival promotion, functional improvement or maturation) of the retinal tissue produced or maintained by the method of the present invention can be searched for as a candidate substance of a pharmaceutical product. Alternatively, an induced pluripotent stem cell is prepared from a somatic cell having a gene mutation that causes a particular disorder such as a disease having a disorder of a retinal tissue and the like, a test substance is added to a retinal tissue produced by the method of the present invention with the cell or a retinal progenitor cell or retinal layer-specific neuron obtained therefrom, and a candidate of a test substance effective as a therapeutic drug or prophylactic drug for the disorder can be searched for based on whether they show the disorder as an index.

For toxicity evaluation, the retinal tissue produced or maintained by the method of the present invention is cultured in the presence or absence (negative control) of a test substance. Then, the severity of toxicity on the retinal tissue treated with the test substance is compared with that of the negative control. As a result, a test substance that exerted toxicity as compared to the negative control can be judged as a substance having toxicity to the retinal tissue.

That is, the present invention encompasses a method for evaluating toxicity including the following steps:
(step 1) a step of culturing a retinal tissue produced or maintained by the method of the present invention under viable culture conditions for a given time in the presence of a test substance, and measuring the severity of cell injury,
(step 2) a step of culturing a retinal tissue produced or maintained by the method of the present invention under viable culture conditions for a given time in the absence of test substance or in the presence of a positive control, and measuring the severity of cell injury,
(step 3) a step of evaluating the toxicity of the test substance in step 1, based on the difference in the results measured in (step 1) and (step 2).

As used herein, "in the absence of a test substance" encompasses adding only a culture medium or a solvent used to dissolve the test substance instead of adding a test substance. In addition, "positive control" means a known compound having toxicity. Examples of the method for measuring the severity of cell injury include a method for measuring the number of viable cells, for example, a method for measuring intracellular ATP amount, a method for measuring the number of viable cells by cell staining (e.g., nucleus staining, cytotoxic marker) and morphology observation and the like.

In step 3, as a method for evaluating the toxicity of a test substance, the measurement value in step 1 and the measurement value of the negative control in step 2 are compared, and when the severity of cell injury in step 1 is higher, the test substance can be judged to have toxicity. In addition, the measurement value in step 1 and the measurement value of the positive control in step 2 are compared, and when the severity of cell injury in step 1 is the same or above, the test substance can be judged to have toxicity.

The obtained aggregate containing retinal progenitor cells may be used as it is as a reagent for evaluating toxicity or efficacy. An aggregate containing retinal progenitor cells is subjected to a dispersion treatment (e.g., trypsin/EDTA treatment or papain treatment), and the obtained cells are subjected to a selection using FACS or MACS, whereby highly pure retinal progenitor cells can also be obtained.

8. Therapeutic Drug and Treatment Method

A retinal tissue having a continuous epithelial structure which is produced or maintained by the method of the present invention is useful for a transplantation therapy for a disease due to (caused by) a disorder of retina. Thus, the present invention provides a therapeutic drug for a disease due to a disorder of a retinal tissue, which contains a retinal tissue having a continuous epithelial structure which is produced or maintained by the method of the present invention, and a treatment method including administering the therapeutic drug to patients. The retinal tissue having a continuous epithelial structure which is produced or maintained by the method of the present invention can be used as a therapeutic drug for a disease based on a disorder of a retinal tissue or to complement the corresponding damaged site in a damaged state of a retinal tissue. A disease due to a disorder of a retinal tissue, and a damaged state of a retinal tissue can be treated by transplanting a retinal cell produced or maintained by the method of the present invention or a retinal tissue containing same to a patient with a disease due to a disorder of a retinal tissue, or a damaged state of a retinal tissue, who requires transplantation, to complement the disordered retinal tissue itself. Examples of the disease due to a disorder of a retinal tissue include retinal denaturation, pigmentary degeneration of the retina, age-related macular degeneration, organic mercury poisoning, chloroquine retinopathy, glaucoma, diabetic retinopathy, retinopathy of newborn babies, and the like.

In transplantation therapy, rejection due to the difference in histocompatibility antigens often poses a problem. The problem can be solved by using pluripotent stem cells (e.g., induced pluripotent stem cells) established from the somatic cells of the transplantation recipient. That is, in a preferable embodiment, by using pluripotent stem cells (e.g., induced pluripotent stem cells) established from the somatic cell of the recipient as pluripotent stem cells in the method of present invention, a neural tissue or neural cell which is immunological self to the recipient is produced, and they are transplanted to the recipient.

In addition, an allogenic retinal tissue or retinal cell may be produced from pluripotent stem cells (e.g., induced pluripotent stem cells) established from the somatic cell of others who are immunologically compatible with the recipient (e.g., compatible in part or all of HLA type and MHC type), and transplanted to the recipient.

EXAMPLE

While the present invention is explained in detail by referring to the following Examples, the present invention is not limited thereto.

Example 1

(Production Example of Cell Aggregate Containing Retinal Tissue Using Human ES Cell and Method for Cutting Out Retinal Tissue)

CRX::Venus knock-in human ES cells (derived from KhES-1; Nakano, T. et al. Cell Stem Cell 2012, 10(6), 771-785) were cultured according to the methods described in "Ueno, M. et al. PNAS 2006, 103(25), 9554-9559" "Watanabe, K. et al. Nat Biotech 2007, 25, 681-686". As a medium for culturing human ES cells, DMEM/F12 medium (Sigma) supplemented with 20% KSR (KnockOut™ Serum Replacement; Invitrogen), 0.1 mM 2-mercaptoethanol, 2 mM L-glutamine, 1× non-essential amino acid, 7.5 ng/mL bFGF was used.

A cell aggregate containing a retinal tissue was prepared by the method described in "Kuwahara et al. Nat Commun 2015, 19(6), 6286" after modification in part. That is, the aforementioned cultured ES cells were individually dispersed using TrypLE Express (Invitrogen), and the individually dispersed human ES cells were suspended in 100 µL of a serum-free medium in a cell non-adhesive 96 well culture plate (SUMILON spheroid plate, SUMITOMO BAKELITE CO., LTD.) at $9 \times 10^3$ cells per well to allow rapid formation of aggregates, after which they were cultured at 37° C., 5% $CO_2$. As the serum-free medium therefor, a serum-free medium obtained by adding 10% KSR, 450 µM 1-monothioglycerol, 1× Chemically defined lipid concentrate, 5 mg/mL BSA, 20 µM Y27632 to a 1:1 mixture of F-12 medium and IMDM medium was used. At 6 days after the start of suspension culture, BMP4 at a final concentration of 1.5 nM was added and suspension culture was continued. A half amount of the culture medium in the well was exchanged with the above-mentioned medium not supplemented with a BMP signal transduction pathway agonist every 3 or 4 days. A cell aggregate containing a retinal tissue at day 18 from the start of suspension culture was cultured in suspension in a serum-free medium containing 3 µM CHIR99021 and 5 µM SU5402 (DMEM/F12 medium supplemented with 1% N2 supplement) for 4 days, namely, until day 22 from the start of suspension culture. Thereafter, suspension culture was continued using the serum-containing medium. The serum-containing medium used then and the culture method are shown in the following [A] to [C]. The suspension culture of the cell aggregate containing the retinal tissue was continued until it was appropriately used for analysis and the like.

[A] From day 22 to day 56 from the start of suspension culture, suspension culture was performed using a medium obtained by adding 10% bovine calf serum, 1% N2 supplement, and 100 µM taurine to the DMEM/F12 medium.

[B] From day 22 to day 38 from the start of suspension culture, suspension culture was performed using a medium obtained by adding 10% bovine calf serum, 1% N2 supplement, and 100 µM taurine to the DMEM/F12 medium; and from day 38 to day 56 from the start of suspension culture, suspension culture was performed using a 1:3 mixed medium of a medium obtained by adding 10% bovine calf serum, 1% N2 supplement, and 100 µM taurine to the DMEM/F12 medium and a medium obtained by adding 10% bovine calf serum, 2% B27 supplement, and 100 µM taurine to the Neurobasal medium.

[C] From day 22 to day 56 from the start of suspension culture, suspension culture was performed using a medium obtained by adding 10% bovine calf serum, 2% B27 supplement, and 100 µM taurine to the Neurobasal medium (manufactured by Thermo Scientific, 21103049).

It is possible to confirm parts other than the retinal tissue in a cell aggregate by visual observation, excise the parts with tweezers as appropriate, and cut out the retinal tissue from the cell aggregate containing the retinal tissue. In any of the above-mentioned culture methods [A], [B], and [C], the retinal tissue was cut out from the cell aggregate containing the retinal tissue by day 30 to 40 from the start of suspension culture. An example in which a retinal tissue was cut out from a cell aggregate containing the retinal tissue on day 35 from the start of suspension culture is shown in FIG. 1-1 a, b. Thereafter, a cell aggregate containing a retinal tissue cultured according to the culture method of the above-mentioned [B] was observed under a fluorescence microscope (Biorevo BZ-9000, Keyence). As a result, by day 42 after the start of suspension culture, green fluorescence exhibited by knock-in CRX::Venus could be observed in almost all retinal tissues (FIG. 1-1 c, d).

Figures 1, 2:
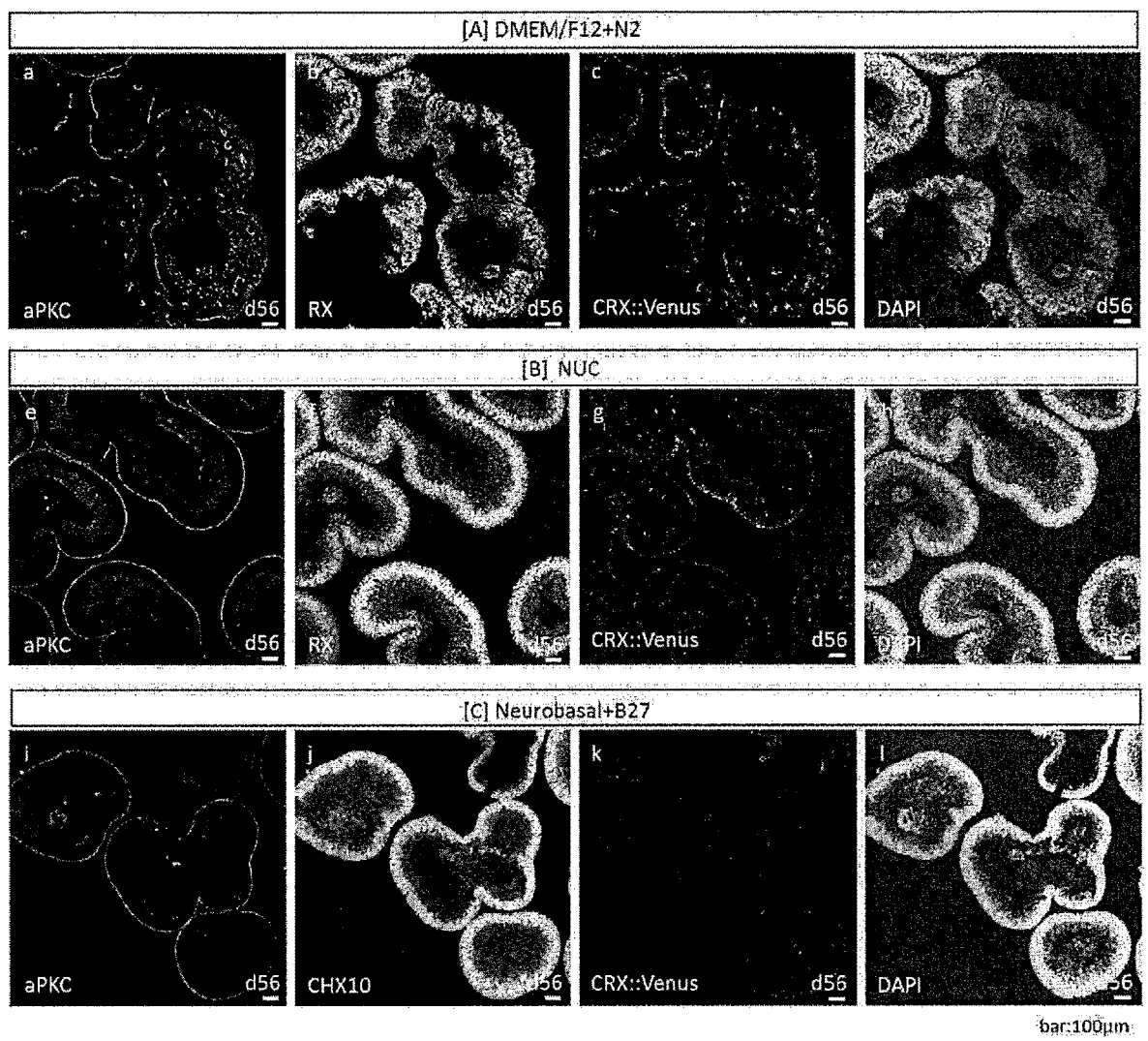
Figure 2:
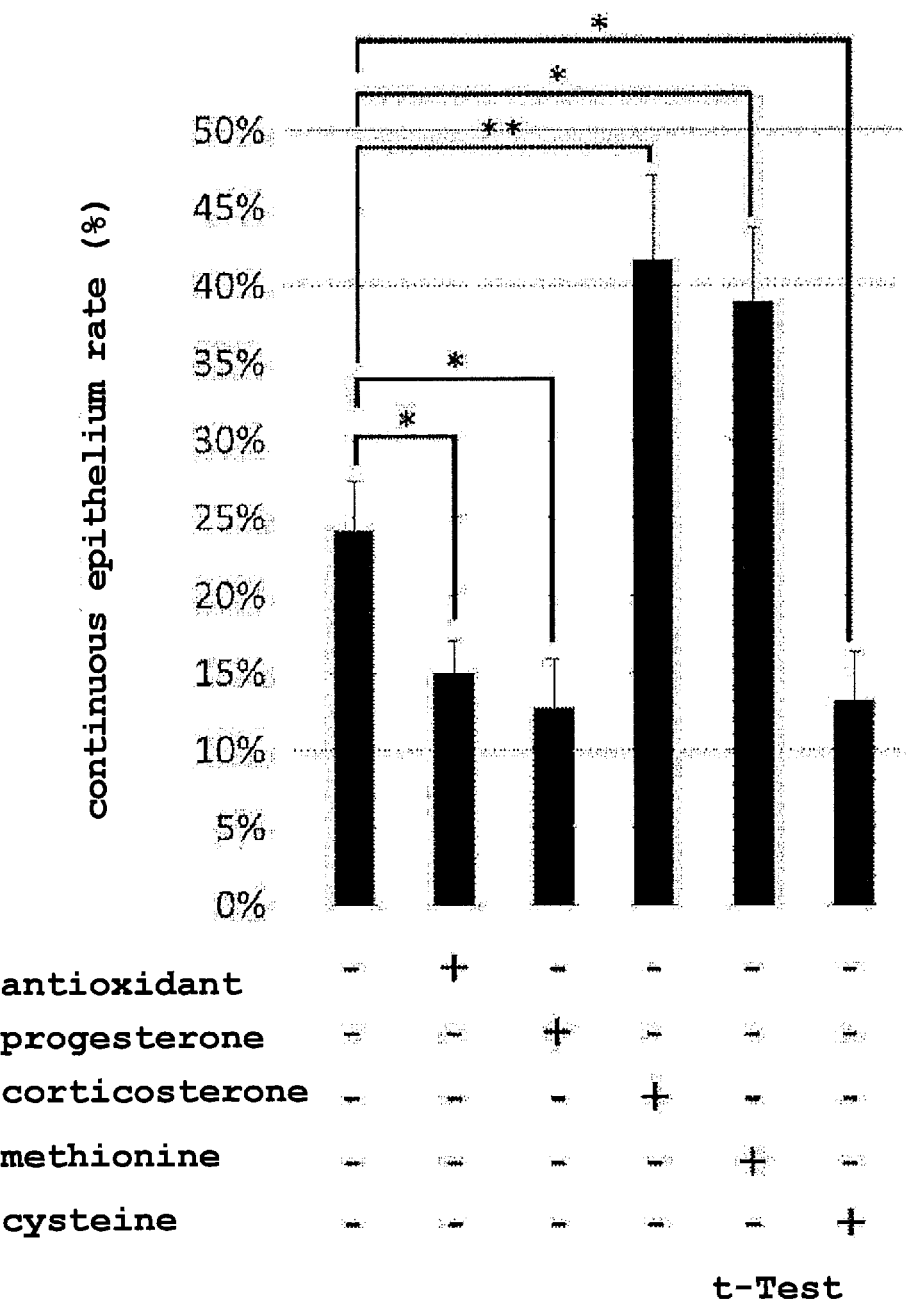

A cell aggregate containing a retinal tissue cultured under the above conditions was fixed with 4% para-formaldehyde, frozen sections were prepared and subjected to immunostaining using anti-aPKC antibody, anti-RX antibody, anti- CHX10 antibody, or anti-GFP antibody, or DAPI staining for staining cell nucleus. Here, aPKC, which is expressed on the apical surface of normal retinal tissue and is known to be involved in the maintenance of normal epithelial structure, is used as a marker indicating the apical surface of a cell aggregate containing a retinal tissue. Anti-RX and anti-CHX10 antibodies were used as markers for retinal tissue, and anti-GFP antibody was used to detect Venus knocked into the CRX locus. As a result of observation with a fluorescence microscope, in the culture method [A], aPKC was not found on the surface of a cell aggregate containing a retinal tissue, but was enwound inside the cell aggregate (FIG. 1-2a). In addition, the stained images with anti-RX antibody or DAPI revealed that the retinal tissue cultured by the culture method [A] formed a so-called rosette-like structure (FIGS. 1-2b and d). At this time, GFP-positive photoreceptor progenitor cells emerged along the enwound aPKC positive apical surface (FIG. 1-2c). On the other hand, in the culture methods [B] and [C], aPKC was found on the surface of the cell aggregate, and it was found from the stained images with anti-RX antibody or anti-CHX10 antibody and DAPI, these retinal tissues do not form a rosette-like structure, but maintain a morphology similar to that of normal living retina (FIGS. 1-2e, f, h, i, j, l). In addition, the number of photoreceptor precursor cells was clearly smaller in the culture method [C] than in the culture method [B] (FIG. 1-2 g, k).

From these results, it was found that the retinal tissue can be cultured for a long time while maintaining continuous epithelium by the culture methods [B] and [C]. In addition, it was found that the culture method [B] can maintain continuous epithelium without reducing the number of photoreceptor progenitor cells that emerge compared to the culture method [C]. Furthermore, it was suggested that, compared to the medium used in the culture method [A], the medium used in the culture methods [B] and [C] contained (many) substances that promote continuous epithelial formation, or less (or no) substances that inhibit continuous epithelial formation.

Example 2

From the results of Example 1, it was suggested that, compared to the medium used in the culture method [A], the medium used in the culture method [B] from day 38 to day 56 from the start of suspension culture in the culturing method [B] shown in Example 1 contained (many) substances that promote continuous epithelial formation (or a substance that maintains continuous epithelium), or less (or no) substances that inhibit continuous epithelial formation. Thus, among the substances contained in the medium used in the culture method [B] from day 38 to day 56 from the start of suspension culture in the culturing method [B], a substance that may greatly affect cell differentiation, cell protection, and cell death of retinal tissues was added to the medium used in the culture method [A], and whether it contributes to the improvement of continuous epithelium rate was studied. Specifically, as antioxidants that are considered to suppress cell death of ganglion cell and the like, final concentration 100 U/mL of Superoxide dismutase, 100 U/mL of catalase, 50 nM of alpha-tocopherol, and 100 ng/mL of glutathione (collectively described as "antioxidants" in FIG. 2) were added to the medium used in the culture method [A] from day 38 to day 54, 55 or 56 from the start of suspension culture and suspension culture was performed. In addition, progesterone (final concentration 100 nM) known as a protective agent for retinal neuron such as photoreceptor progenitor cell and ganglion cell, corticosterone (final concentration 100 nM) known as a neurite extension inhibitor for ganglion cell and the like were added to the medium used in the culture method [A] from day 38 to day 54, 55 or 56 from the start of suspension culture and suspension culture was performed. In addition, methionine as a substance known to be involved in maintenance of the undifferentiated potency of pluripotent stem cells and which may suppress cell differentiation of undifferentiated cells such as neural retinal progenitor and the like, or cysteine which is an amino acid having an antioxidant action was each added to the same final conditions as in the medium used in the culture method [B] from day 38 to day 56 from the start of suspension culture, and cultured in suspension until day 38 to day 54, 55 or 56 from the start of suspension culture. Specific final concentration was 26.81 mg/L for methionine and 0.22 mM for cysteine before addition of 10% bovine calf serum, 1% N2 supplement, 2% B27 supplement, 100 µM taurine and the like. A cell aggregate containing a cultured retinal tissue was fixed with 4% paraformaldehyde, frozen sections were prepared and subjected to immunostaining using anti-aPKC antibody, anti-RX antibody, or anti-CHX10 antibody, or DAPI staining for staining cell nucleus. Using a fluorescence microscope, a retinal tissue image of the section prepared by the above-mentioned method was photographed and an image was obtained. For the obtained image of the retinal tissue, using Image J, the longest length of continuous connection between aPKC that indicates the apical surface of RX or CHX10 positive retinal tissue and the surface of the cell aggregate containing the retinal tissue, and the length of the outer circumference of the cell aggregate were measured. By dividing the longest length of continuous connection of aPKC by the length of the outer circumference of the cell aggregate, the proportion of maintenance of continuous epithelial structure, namely, continuous epithelium rate, was determined. As a result, the continuous epithelium rate decreased when the antioxidant was added compared to when nothing was added. Moreover, when progesterone was added, the continuous epithelium rate similarly decreased. On the other hand, when corticosterone or methionine was added, the continuous epithelium rate increased. For cysteine, which has an antioxidant effect, the continuous epithelium rate decreased similar to the case of antioxidants (FIG. 2). The significant difference test was performed using the t test as described.

From these results, it was found that all substances that protect ganglion cells such as antioxidants, progesterone, and amino acids having an antioxidative action (cysteine) contribute to the reduction of the continuous epithelium rate, and conversely, substances that suppress neurite extension of ganglion cell and the like such as corticosterone and the like contribute to the improvement of continuous epithelium rate. In addition, it was found that methionine which is said to be involved in the maintenance of undifferentiation potency of pluripotent stem cells also contributes to the improvement of continuous epithelium rate.

Example 3

Then, among the substances contained in the medium used in the culture method [A], a substance that may greatly affect cell differentiation, cell protection, and cell death of retinal tissues was added to the medium used from day 38 to day 56 from the start of suspension culture in the culturing method [B], and whether it contributes to the reduction of continuous epithelium rate was studied. Specifically, hypoxanthine or thymidine, which is known as a nucleic acid or a substrate thereof whose synthesis is promoted during cell proliferation and expected to increase cell proliferation when added; or vitamin B12 that acts as a coenzyme and promotes nucleic acid synthesis during cell proliferation were added to the medium to the same final concentrations as in the medium described in culture method [A], and cultured in suspension until day 38 to day 54, 55 or 56 from the start of suspension culture. Specific final concentration was 15 μM for hypoxanthine, 1.5 μM for thymidine, and 0.68 mg/L for vitamin B12 before addition of 10% bovine calf serum, 1% N2 supplement, 2% B27 supplement, 100 μM taurine and the like. In addition, L-glutamic acid as an acidic amino acid known to promote cell differentiation from neural retinal progenitor cells in a retinal tissue, and L-aspartic acid also as an acidic amino acid were each added alone or in combination to the medium to the same final concentrations as in the medium described in culture method [A], and cultured in suspension until day 38 to day 54, 55 or 56 from the start of suspension culture. Specific final concentration was 50 μM for L-glutamic acid and 50 μM for L-aspartic acid before addition of 10% bovine calf serum, 1% N2 supplement, 2% B27 supplement, 100 μM taurine and the like.

Figures 1, 3:
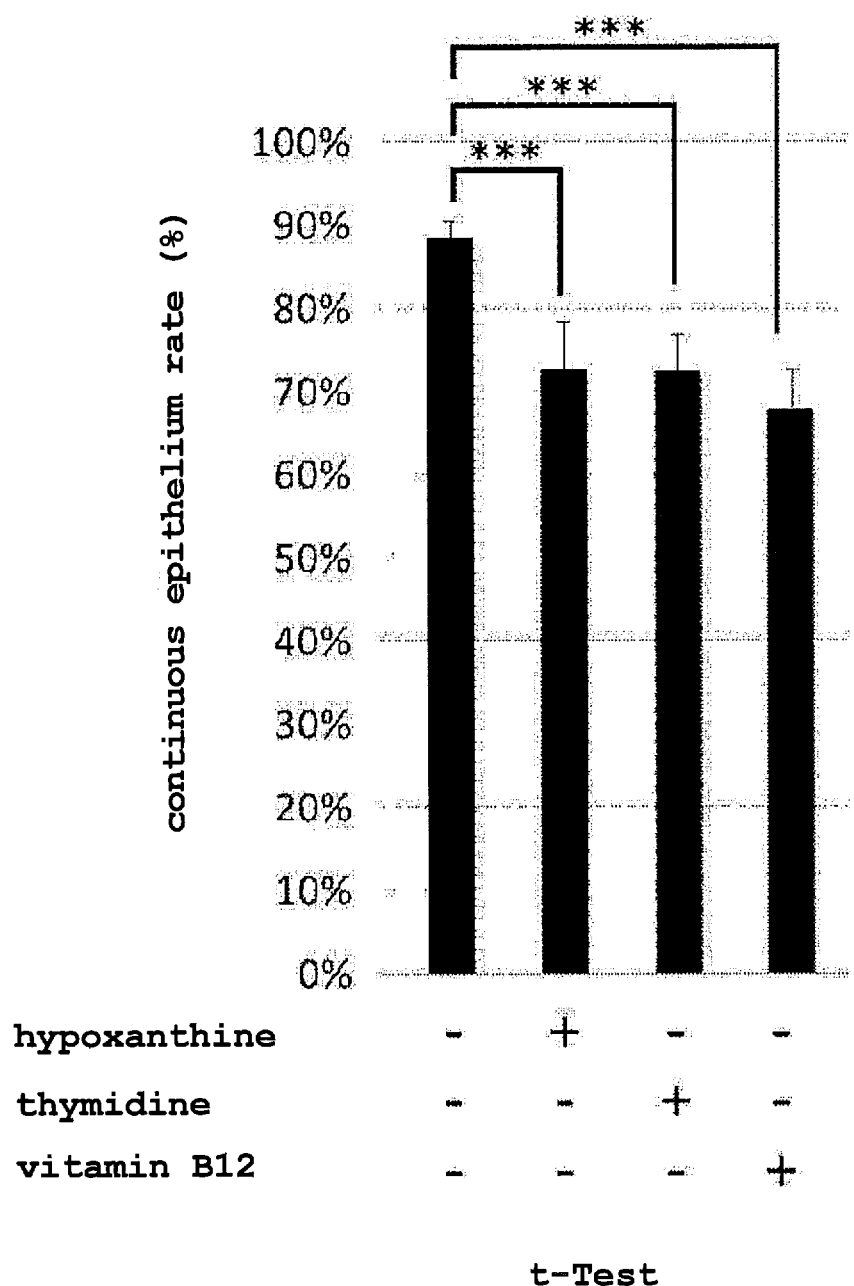
Figures 2, 3:
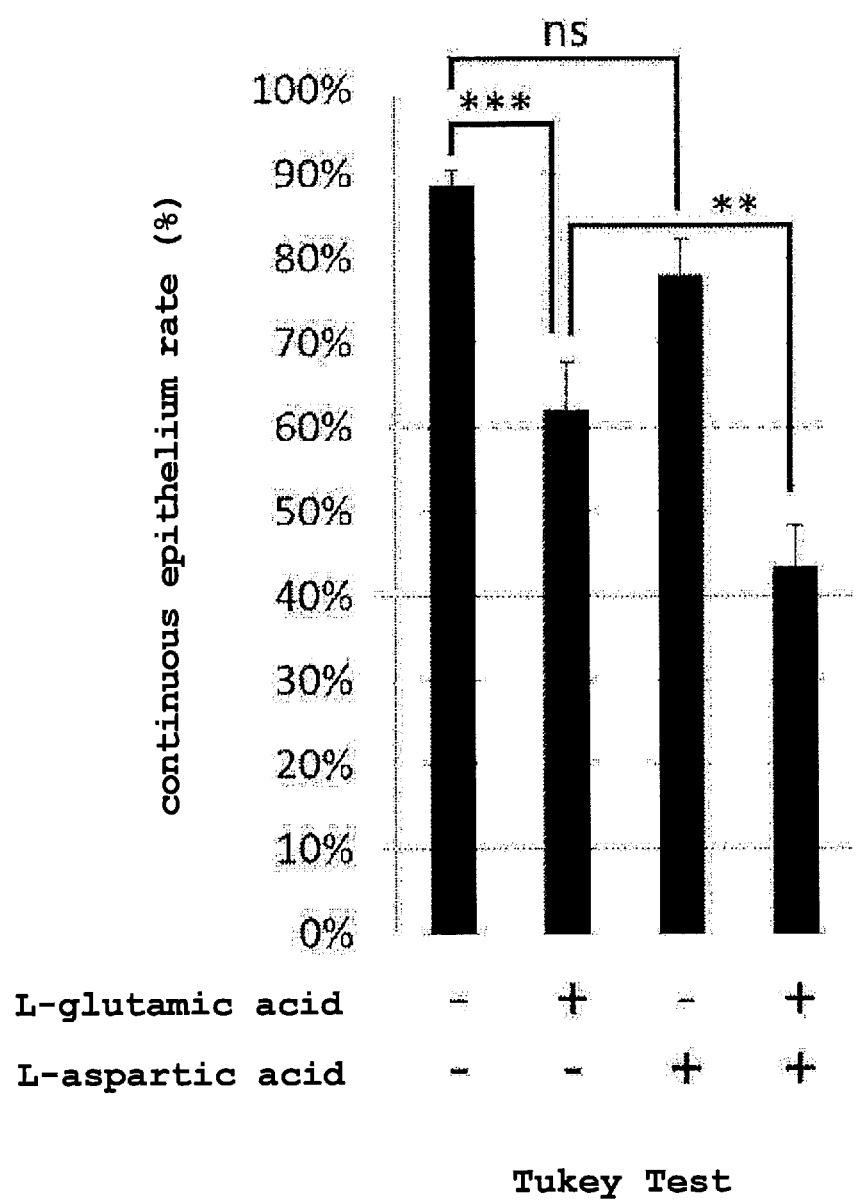

As a result of analysis by a method similar to the method described in Example 2, hypoxanthine, thymidine, and vitamin B12 all contributed to a decrease in the continuous epithelium rate of retinal tissue (FIG. 3-1). L-glutamic acid alone contributed to the decrease in continuous epithelium rate, whereas L-aspartic acid alone decreased the continuous epithelium rate slightly, but the difference was not significant. However, when L-aspartic acid was added in combination with L-glutamic acid, the continuous epithelium rate of retinal tissue was further decreased than when L-glutamic acid was added alone. The significant difference test was performed using the t-test or Tukey test as described (FIG. 3-1 or FIG. 3-2).

From these results, it was found that nucleic acid and a substrate for nucleic acid synthesis that are considered to be involved in the proliferation of neural retinal progenitor cell, and vitamin B12 that promotes nucleic acid synthesis contribute to a decrease in the continuous epithelium rate. It was also found that L-glutamic acid that promotes cell differentiation contributes to a decrease in the continuous epithelium rate, contrary to methionine which is involved in the maintenance of undifferentiated cells. Furthermore, while the mechanism is unknown, L-aspartic acid, which is the same acidic amino acid, was found to contribute to a decrease in the continuous epithelium rate in cooperation with L-glutamic acid.

Example 4

A cell aggregate containing a retinal tissue cultured until day 22 from the start of suspension culture by the method described in Example 1 was prepared and cultured using the serum-containing media shown in the following [1] to [3] under 5% $CO_2$ conditions.

[1] From day 22 to day 38 from the start of suspension culture: a medium obtained by adding 10% bovine calf serum, 1% N2 supplement, and 100 μM taurine to the DMEM/F12 medium.

[2] From day 38 to day 60 from the start of suspension culture: a 1:3 mixed medium of a medium obtained by adding 10% bovine calf serum, 1% N2 supplement, and 100 μM taurine to the DMEM/F12 medium and a medium obtained by adding 10% bovine calf serum, 2% B27 supplement, and 100 μM taurine to the Neurobasal medium.

[3] From day 60 to day 192 from the start of suspension culture: a medium obtained by adding 10% bovine calf serum, 2% B27 supplement, and 100 μM taurine to the Neurobasal medium.

Figure 4:
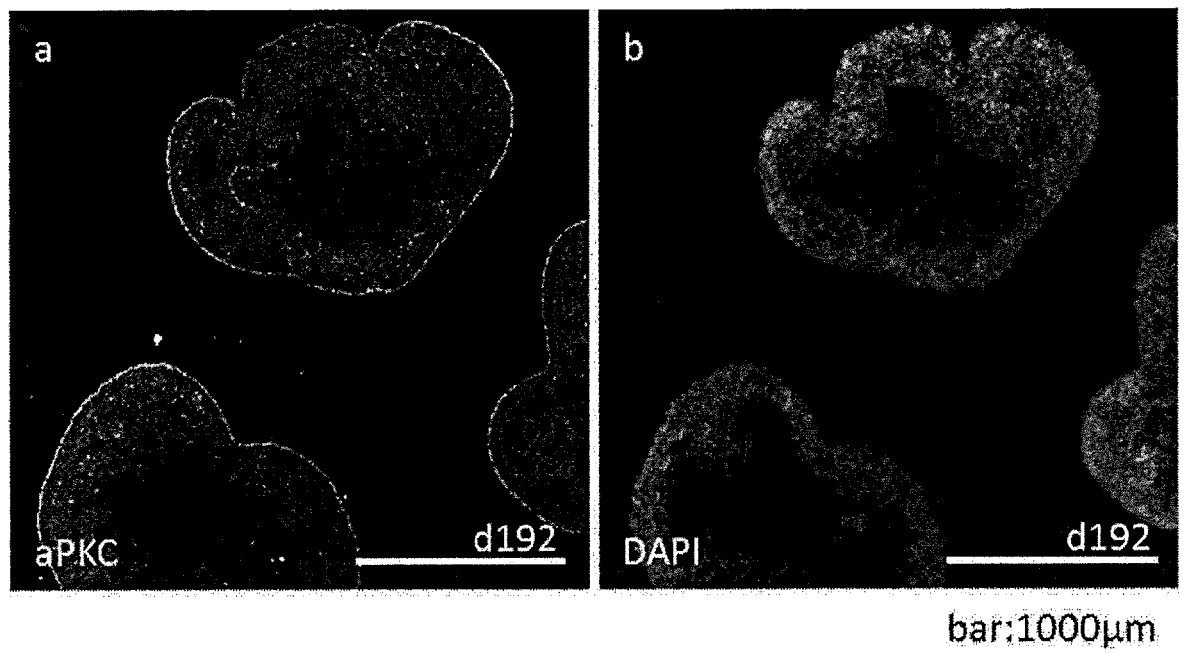
FIG. 4 shows a continuous epithelial structure in a retinal tissue that has been suspension cultured by a maturation culture method of a retinal tissue including a continuous epithelium and maintained until day 192 after the start of the suspension culture.

A cell aggregate containing retinal tissue cultured under the above-mentioned conditions was fixed with 4% paraformaldehyde, frozen sections were prepared, and immunostaining using an antibody against aPKC or DAPI staining for staining the cell nucleus was performed. As a result, it was found that expression of aPKC on the surface of the retinal tissue was continuously observed in almost all the retinal tissues, and a continuous epithelial structure could be maintained (FIG. 4a, FIG. 4b).

From these, it was found that long-term culture of a retinal tissue maintaining a continuous epithelial structure is possible by adjusting the components in the medium components. It was also found that the retinal tissue that maintains a continuous epithelial structure has a diameter in the major axis direction of at least not less than 1.3 mm.

Example 5

Figures 1, 5:
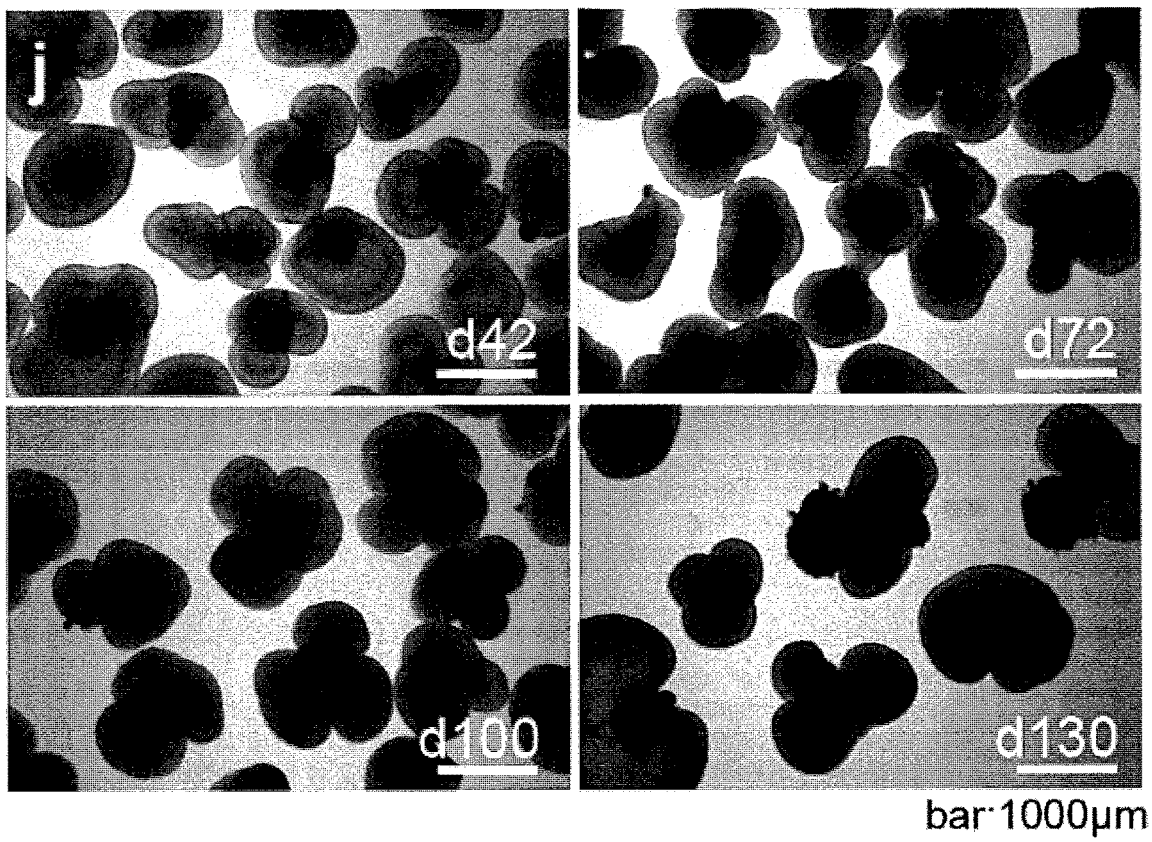
Figures 2, 5:
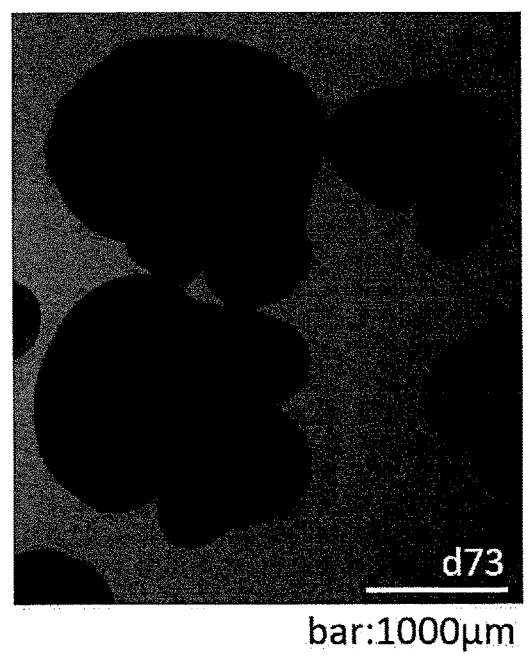
Figures 3, 5:
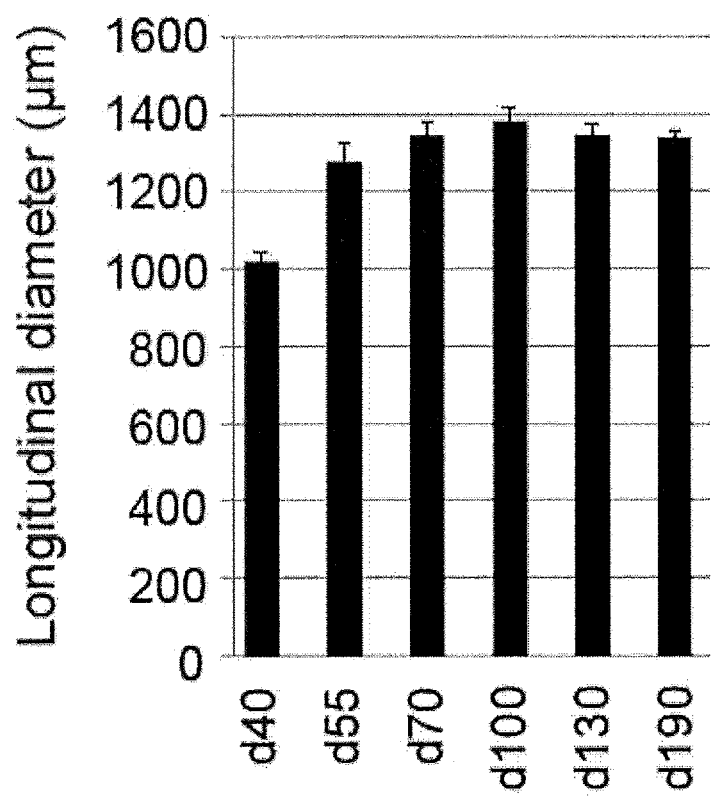

A cell aggregate containing a retinal tissue in the culture prepared by the method described in Example 4 was observed using a fluorescence microscope (Biorevo BZ-9000, Keyence), and an image was obtained (FIG. 5-1, FIG. 5-2). In addition, the obtained image of the retinal tissue was measured using Image J, and the diameter of the retinal tissue in the major axis direction was calculated (FIG. 5-3). As a result, the diameter in the major axis direction tended to increase from the start of culture until around day 100 (d100), and it was found that the diameter in the major axis direction was above 1 mm, above 1.2 mm, above 1.3 mm, a slightly shorter than about 1.4 mm, on average from the start of culture until around day 40 (d40), around day 55 (d55), around day 70 (d70), around day 100 (d100) (FIG. 5-3). The diameter of the retinal tissue in the major axis direction was found to exceed 2 mm in some cases (FIG. 5-1, FIG. 5-2).

INDUSTRIAL APPLICABILITY

The present invention is useful for producing a retinal tissue section that maintains a continuous epithelial structure of a retinal tissue and is suitable for transplantation.

This application is based on a patent application No. 2017-141381 filed in Japan (filing date: Jul. 20, 2017), the contents of which are incorporated in full herein.

The invention claimed is:

1. A method for maintaining a continuous epithelial structure of a human retinal tissue comprising culturing the human retinal tissue in a medium comprising (a) methionine at a concentration not less than 25 mg/L and not more than 75 mg/L, (b) corticosterone at a concentration of not less than 1 nM and not more than 1 μM, and (c) L-glutamic acid at a concentration of not more than 25 μM, wherein the human retinal tissue is derived from pluripotent stem cells, wherein the human retinal tissue is in a differentiation stage from an early developmental stage until a developmental stage when the proportion of NRL positive cells to the number of photoreceptor progenitor cells present in the human retinal tissue reaches 1-3%, and wherein the human retinal tissue does not have a rosette structure.

2. The method according to claim 1, wherein the medium comprises L-aspartic acid, and wherein the concentration of the L-aspartic acid in the medium is less than 50 µM.

3. The method according to claim 1, wherein the medium comprises at least one kind of antioxidant selected from the group consisting of glutathione, catalase, Superoxide dismutase, alpha-tocopherol, and L-cysteine at a concentration within the following concentration ranges:
glutathione: not more than 100 ng/ml,
catalase: not more than 100 U/mL,
Superoxide dismutase: not more than 100 U/mL,
alpha-tocopherol: not more than 50 nM,
cysteine: not more than 0.26 mM.

4. The method according to claim 1, wherein the medium comprises progesterone at a concentration of not more than 100 nM.

5. The method according to claim 1, wherein the medium comprises at least one kind of nucleic acid synthesis promoter selected from the group consisting of hypoxanthine, thymidine and vitamin B12 at the following concentration range:
hypoxanthine: less than 15 µM,
thymidine: less than 1.5 µM,
vitamin B12: less than 0.68 mg/L (0.5 µM).

6. The method according to claim 1, wherein the medium comprises (a) a medium comprising 30 mg/L glycine, 2 mg/L L-alanine, 84 mg/L L-arginine hydrochloride, 0.83 mg/L L-asparagine·$H_2O$, 31.5 mg/L L-cysteine, 42 mg/L L-histidine hydrochloride·$H_2O$, 105 mg/L L-isoleucine, 105 mg/L L-leucine, 146 mg/L L-lysine hydrochloride, 30 mg/L L-methionine, 66 mg/L L-phenylalanine, 7.76 mg/L L-proline, 42 mg/L L-serine, 95 mg/L L-threonine, 16 mg/L L-tryptophan, 72 mg/L L-tyrosine, 94 mg/L L-valine, 4 mg/L choline chloride, 4 mg/L D-calcium pantothenate, 4 mg/L folic acid, 4 mg/L niacinamide, 4 mg/L pyridoxal hydrochloride, 0.4 mg/L riboflavin, 4 mg/L thiamine hydrochloride, 0.0068 mg/L vitamin B12, 7.2 mg/L i-inositol, 200 mg/L calcium chloride (anhydrous), 0.1 mg/L ferric nitrate ($Fe(NO_3)_3 \cdot 9H_2O$), 77.3 mg/L magnesium chloride (anhydrous), 400 mg/L potassium chloride, 2200 mg/L sodium bicarbonate, 3000 mg/L sodium chloride, 125 mg/L sodium phosphate monobasic ($NaH_2PO_4 \cdot H_2O$), 0.194 mg/L zinc sulfate ($ZnSO_4 \cdot 7H_2O$), 4500 mg/L D-glucose (dextrose), 2600 mg/L HEPES, 8.1 mg/L phenol red, and 25 mg/L sodium pyruvate blended with (b) supplement comprising biotin, DL alpha tocopherol acetate, DL alpha-tocopherol, BSA (fatty acid free fraction V), catalase, insulin, transferrin, superoxide dismutase, corticosterone, D-galactose, ethanolamine, glutathione (reduced), L-carnitine, linoleic acid, progesterone, putrescine, sodium selenite, and T3 (triodo-L-thryonine) at a volume ratio of not less than 50%.

7. The method according to claim 1, wherein the human retinal tissue is in an initial state of development at the time of start of culture.

8. The method according to claim 7, wherein the human retinal tissue is cultured for a period up to emergence of a rod photoreceptor progenitor cell.

9. The method according to claim 1, wherein the early developmental stage is a stage where retinal progenitor cells have emerged but ganglion cells have not emerged.

10. The method according to claim 1, wherein the early developmental stage is a stage where RX positive and PAX6 positive cells are present, and TUJ1 positive cells and BRN3 positive cells are not present.

11. The method according to claim 1, wherein the human retinal tissue in an early developmental stage is produced according to the following steps:
(1) the first step of forming a cell aggregate by culturing pluripotent stem cells in suspension in a serum-free medium, and
(2) the second step of obtaining an aggregate containing a retinal progenitor cell or a neural retinal progenitor by culturing in suspension the aggregate formed in the first step in a serum-free medium or serum-containing medium not containing an SHH signal transduction pathway agonist and containing a BMP signal transduction pathway agonist.

12. The method according to claim 1, wherein L-glutamic acid is present in the medium at a concentration of not more than 12.5 µM.

* * * * *